United States Patent [19]

Matsuda et al.

[11] Patent Number: 4,912,379

[45] Date of Patent: Mar. 27, 1990

[54] MULTI-PHASE BRUSHLESS MOTOR WITH INCREASED STARTING TORQUE AND REDUCED TORQUE RIPPLE

[75] Inventors: Minoru Matsuda; Hiroshi Iwai, both of Fujieda, Japan

[73] Assignee: Victor Company of Japan, Ltd., Japan

[21] Appl. No.: 196,626

[22] Filed: May 19, 1988

[30] Foreign Application Priority Data

May 21, 1987 [JP] Japan .................. 62-124419
Jul. 16, 1987 [JP] Japan .................. 62-178080

[51] Int. Cl.$^4$ ............................................. H02P 6/02
[52] U.S. Cl. ........................................ 318/254; 318/138
[58] Field of Search ........................ 318/138, 254, 439

[56] References Cited

U.S. PATENT DOCUMENTS

| | | | |
|---|---|---|---|
| 3,909,690 | 9/1975 | Sugiura | 318/138 |
| 3,916,272 | 10/1975 | Grunleitner et al. | 318/138 |
| 4,097,788 | 6/1978 | Nygaard et al. | 318/138 X |
| 4,454,458 | 6/1984 | Holland | 318/254 |
| 4,455,513 | 6/1984 | Fulton et al. | 318/138 |
| 4,631,459 | 12/1986 | Fujioka et al. | 318/254 |
| 4,641,066 | 2/1987 | Nagata et al. | 318/254 |
| 4,763,347 | 8/1988 | Erdman | 318/254 |

FOREIGN PATENT DOCUMENTS

| | | | |
|---|---|---|---|
| 52-29917 | 7/1977 | Japan | 318/254 |
| 57-68679 | 4/1982 | Japan | 318/254 |
| 60-141184 | 7/1985 | Japan | 318/254 |
| 60-237881 | 11/1985 | Japan | 318/254 |

Primary Examiner—Bentsu Ro
Attorney, Agent, or Firm—Lowe, Price, Leblanc, Becker & Shur

[57] ABSTRACT

A multi-phase brushless motor including a stator having a plurality of drive coils each corresponding to a specific phase and a rotor having a plurality of field magnet poles of successively alternating polarity. The stator further has a plurality of Hall generators for detecting the positions of the rotor and a speed sensor for detecting the rotational speed of the rotor. The brushless motor is driven by a drive circuit which supplies drive currents to the drive coils of the stator so as to generate torques. The drive circuit is operated under control of a control circuit which comprises a first processing circuit responsive to position signals from the Hall generators to output exciting signals to the drive circuit so that the drive circuit supplies the drive currents to the drive coils thereof and a second processing circuit responsive to the speed signal from the speed sensor and the position signal to output exciting signals to the drive circuit which in turn supplies the drive currents thereto. The first and second processing circuits are selectively operated such that the first processing circuit outputs the exciting signals to the drive circuit at startup of the motor and the second processing circuit outputs the exciting signals thereto after the startup.

24 Claims, 93 Drawing Sheets

FIG. 28
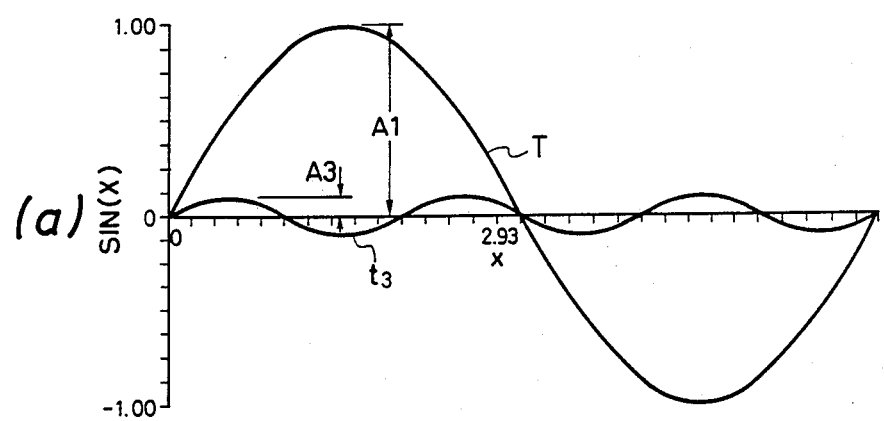
(a)
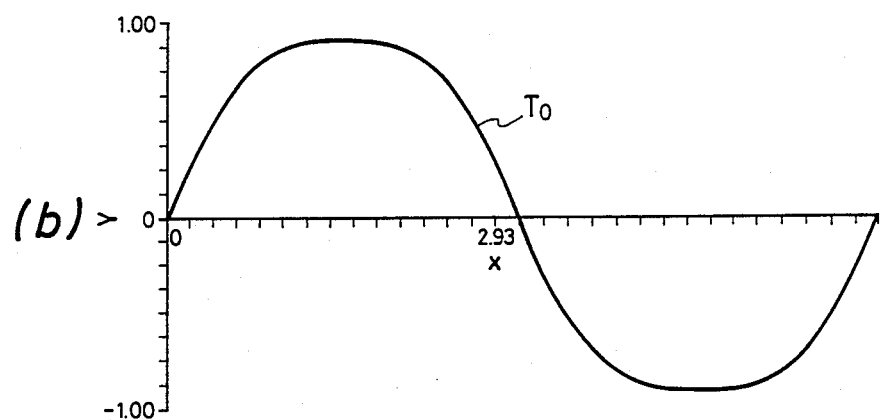
(b)

FIG. 33
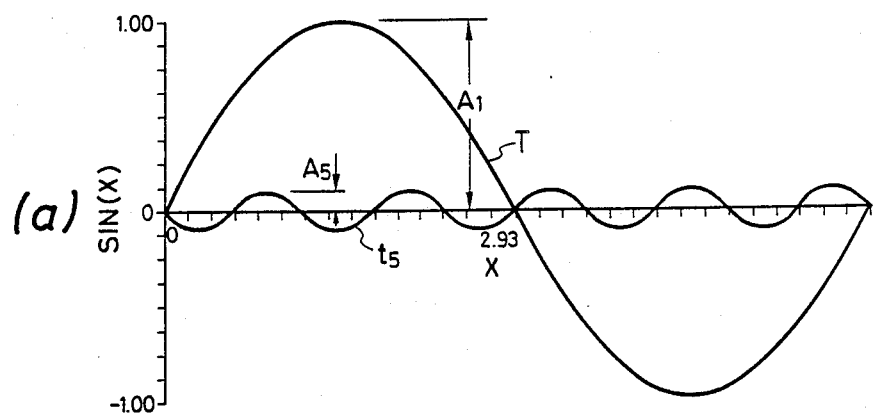
(a)
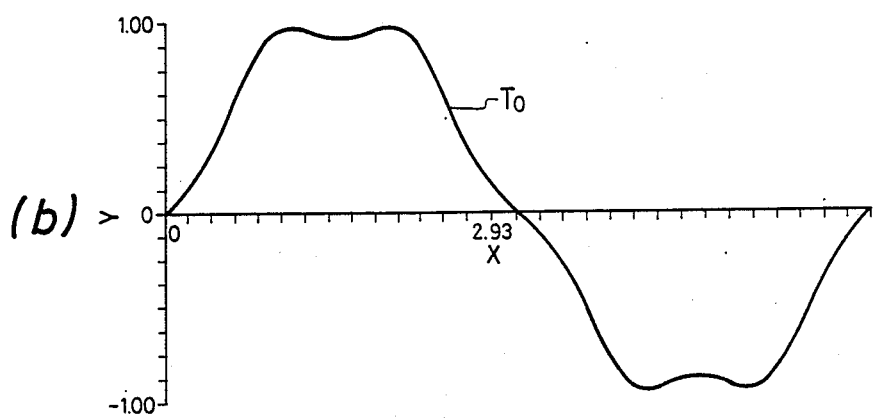
(b)

FIG. 38
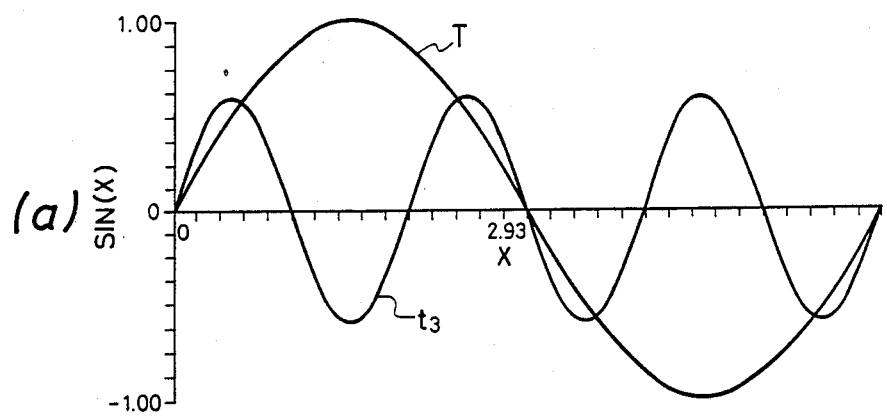
(a)
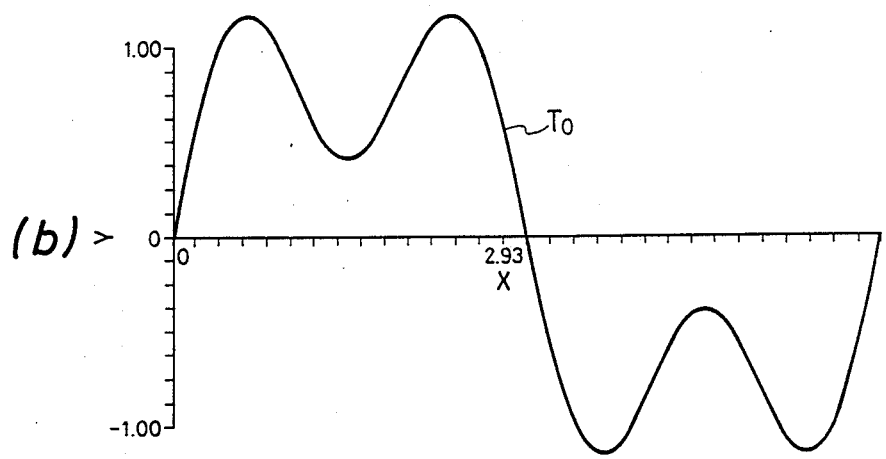
(b)

FIG. 66
(A)
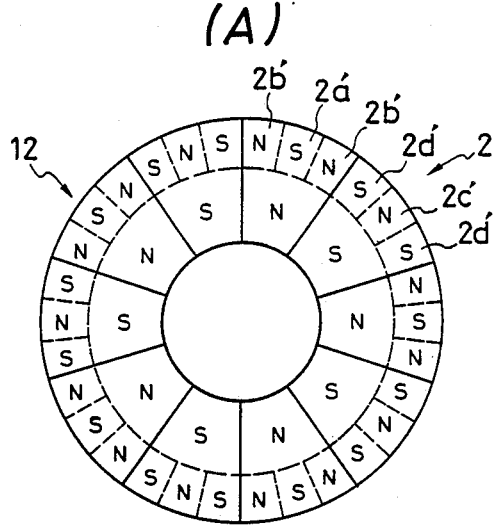
(C)
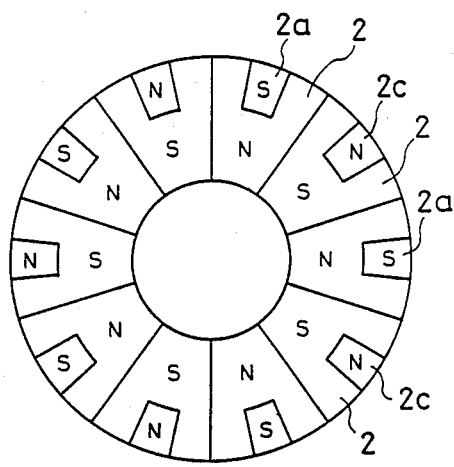
(B)
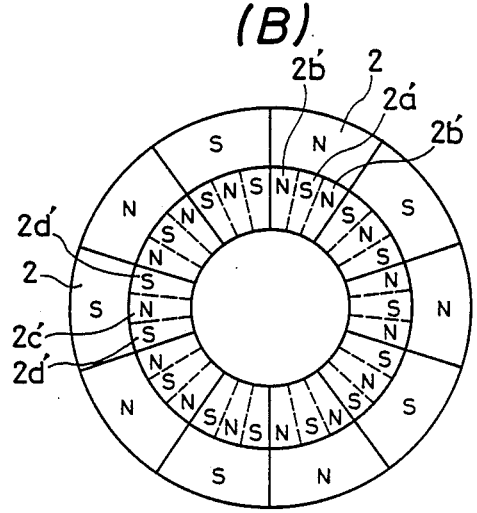
(D)
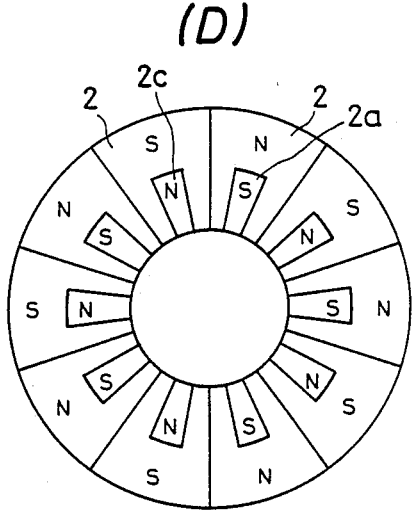

MULTI-PHASE BRUSHLESS MOTOR WITH INCREASED STARTING TORQUE AND REDUCED TORQUE RIPPLE

BACKGROUND OF THE INVENTION

The present invention relates generally to improvements of multi-phase brushless motors, each of which is applicable particularly, but not exclusively, to a drive system of a capstan and so on of a video tape recorder.

Recently, brushless motors are being increasingly miniaturized in order to meet the requirement of size-reduction for video tape recorders, for example. The miniaturization of the brushless motor causes decrease in the inertia force of a rotor thereof which in turn results in occurrance of considerable irregularity of rotation due to torque ripple. One current technique for resolution of this problem involves constructing a brushless motor with multi-phase drive coils to lower the torque ripple, the torque ripple decreasing with increase in the phase number as shown in FIG. 1. However, an extreme increase in the phase number causes a complex drive circuit arrangement and hence increase in production cost of the brushless motor. More specifically, Hall generators are provided in the brushless motor in order to detect the rotational position of the rotor and the number of the Hall generators depends upon the number of phases. Furthermore, the increase in the number of the Hall generators results in increase in the number of lead wires and so on, connected thereto, so as to make difficult the size-reduction and assembly of the brushless motor.

Thus, a brushless motor has been recently developed such as disclosed in Japanese Patent Provisional Publication No. 61-66586 and illustrated in FIG. 2, the arrangement of which is made so as to effect the supply of drive currents to drive coils on the basis of FG signals. In FIG. 2, the brushless motor includes a detection signal processing circuit 12 which is coupled to a magnetic sensor 6 to count speed-detection pulses from the magnetic sensor 6. The detection signal processing circuit 12 successively supplies exciting signals to transistors TR1 to TR10 to supply a drive current to phase coils U to Y. The magnetic sensor 6 is also coupled to a speed control circuit 11 which in turn determines the drive current in correspondance with the speed of a rotor 1. There is a problem which arises with this type of brushless motor, however, in that its operation becomes unstable because difficulty is encountered to sufficiently obtain the FG signal at startup and low-speed rotation, and particularly the self-starting becomes impossible in the case of a large load being applied to an output shaft.

SUMMARY OF THE INVENTION

The present invention has been developed in order to remove the above-mentioned drawbacks inherent to the conventional brushless motors.

It is therefore an object of the present invention to provide a brushless motor which can be started surely irrespective of a large load being applied to the output shaft thereof and which can be operated stably after starting.

Another object of the present invention is to provide a brushless motor which can be size-reduced and easily assembled to be manufactured at a low cost and which is capable of minimizing the occurrence of a torque ripple.

For achieving the first purpose, a multi-phase brushless motor, including a stator having a plurality of drive coils each corresponding to a specific phase and a rotor having a plurality of field magnet poles of successively alternating polarity, comprises a first processing circuit which is responsive to position signals from position detecting means magnetically coupled to the field magnet poles of the rotor and a second processing circuit which is responsive to a speed signal from a speed sensor adapted to detect the rotational speed of the rotor and to at least one of the position signals therefrom. The first processing circuit outputs first exciting signals to a drive circuit on the basis of the position signals, which drive circuit in turn supplies drive currents to the drive coils of the stator to produce torques causing rotation of the rotor. Similarly, the second processing circuit outputs second exciting signals to the drive circuit on the basis of the speed signal so that the drive circuit supplies the drive currents thereto. Also included in the multi-phase motor is a switching circuit coupled to a startup detecting means for detecting the driving condition of the motor. The switching circuit, in response to a detection signal from the startup detecting means, performs a switching operation between the first and second processing circuits so that the first processing circuit outputs the first exciting signals to the drive circuit at startup of the motor and the second processing circuit outputs the second exciting signals thereto after the startup.

Furthermore, a multi-phase brushless motor, similarly including a stator having a plurality of drive coils each corresponding to a specific phase and a rotor having a plurality of field magnet poles of successively alternating polarity, comprises a first processing circuit which is responsive to position signals from position detecting means magnetically coupled to the field magnet poles of the rotor and a second processing circuit a second processing circuit coupled to the drive coils of the stator so as to be responsive to voltages induced in the drive coils thereof. The first processing circuit outputs first exciting signals to a drive circuit on the basis of the position signals therefrom, so that in response to the first exciting signals the drive circuit supplies the drive currents to the drive coils of the stator. The second processing circuit outputs second exciting signals to the drive circuit on the basis of the induced voltages so as to cause the drive circuit to supply the drive currents to the drive coils thereof. Also included in the motor is a switching circuit coupled to startup detecting means for detecting the drive condition of the motor. The switching circuit, in response to a detection signal from the startup detecting means, performs a switching operation between the first and second processing circuits so that the first processing circuit outputs the first exciting signals to the drive circuit at startup of the motor and the second processing circuit outputs the second exciting signals thereto after the startup.

For achieving the second purpose, the magnetic flux interlinking each drive coil is arranged so as to include a predetermined harmonic by a predetermined amount under the condition that the electrical angle between the drive currents to the drive coils is set to a predetermined value. For example, in order to include the predetermined harmonic, each of the drive coils comprises at least one main coil and at least one auxiliary coil, as described hereinafter in detail.

BRIEF DESCRIPTION OF THE DRAWINGS

The object and features of the present invention will become more readily apparent from the following detailed description of the preferred embodiments taken in conjunction with the accompanying drawings in which:

FIG. 28 shows magnetic flux interlinking drive coils of a stator of FIG. 23 motor;

FIG. 33 shows magnetic flux interlinking the drive coils;

FIG. 38 shows magnetic flux interlinking the drive coils;

FIG. 66 shows examples of magnetization of the rotor magnet;

The same or corresponding elements and parts are substantially designated at like reference numerals throughout the drawings.

DETAILED DESCRIPTION OF THE INVENTION

Figure 3:
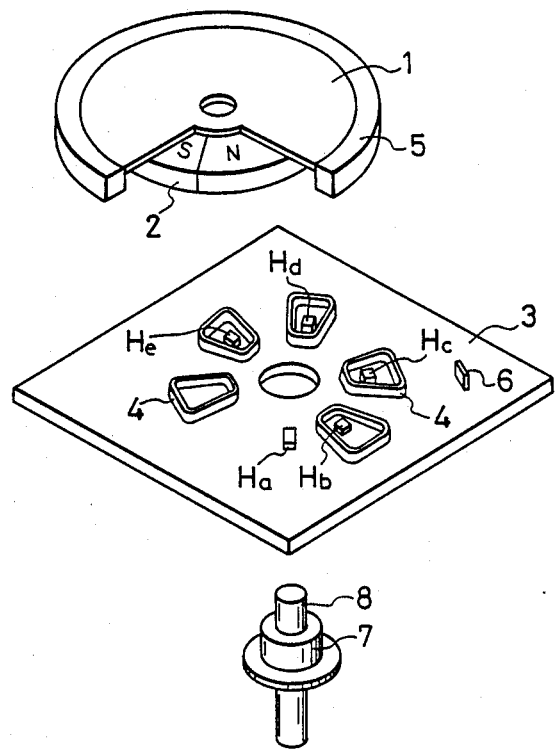
FIG. 3 is an exploded view showing an arrangement of a conventional five-phase brushless motor.

Prior to describing the embodiments of the present invention, a brief description of a conventional brushless motor (for example, a five-phase brushless motor) will be made with reference to FIGS. 3, 4A, 4B and 5A to 5C for a better understanding of the present invention by comparison therewith. FIG. 3 is an exploded view showing an arrangement of the prior art five-phase brushless motor comprising a rotor 1 having on its lower surface a rotor magnet 2 which is permanently magnetized with magnetic fields in the direction of the axis thereof so as to form 8 poles indicated alternately by N and S. Also included in the five-phase brushless motor is a stator 3 on which five drive coils (stator coils) 4 are provided to be in opposed relation to the rotor magnet 2 and successively arranged at angular intervals, or pitch, of 63 degrees (mechanical angle) so as to have an electrical angle of 252 degrees (72°+180°). At substantial center portions of the four of the five drive coils are placed four Hall generators Hb to He. On the other hand, another Hall generator Ha is placed between the two drive coils 4 of both the ends of the successively arrayed five drive coils 4. The respective Hall generators Ha to He, acting as means for detecting the position of the rotor magnet 2, are also arranged to have an electrical angle of 252 degrees. Furthermore, on the circumference of the rotor 1 is provided a FG magnet 5 which is disposed so as to be in opposed relation to a magnetic sensor 6, including a MR element and so on, which is located on the stator 3. Illustrated at numeral 8 is an output shaft which is fitted into a cylindrically shaped bearing 7. In assembling, the bearing 7 is inserted into a hole defined in a center portion of the stator 3 and the output shaft 8 is inserted into a hole defined in a center portion of the rotor 1.

Figure 4A:
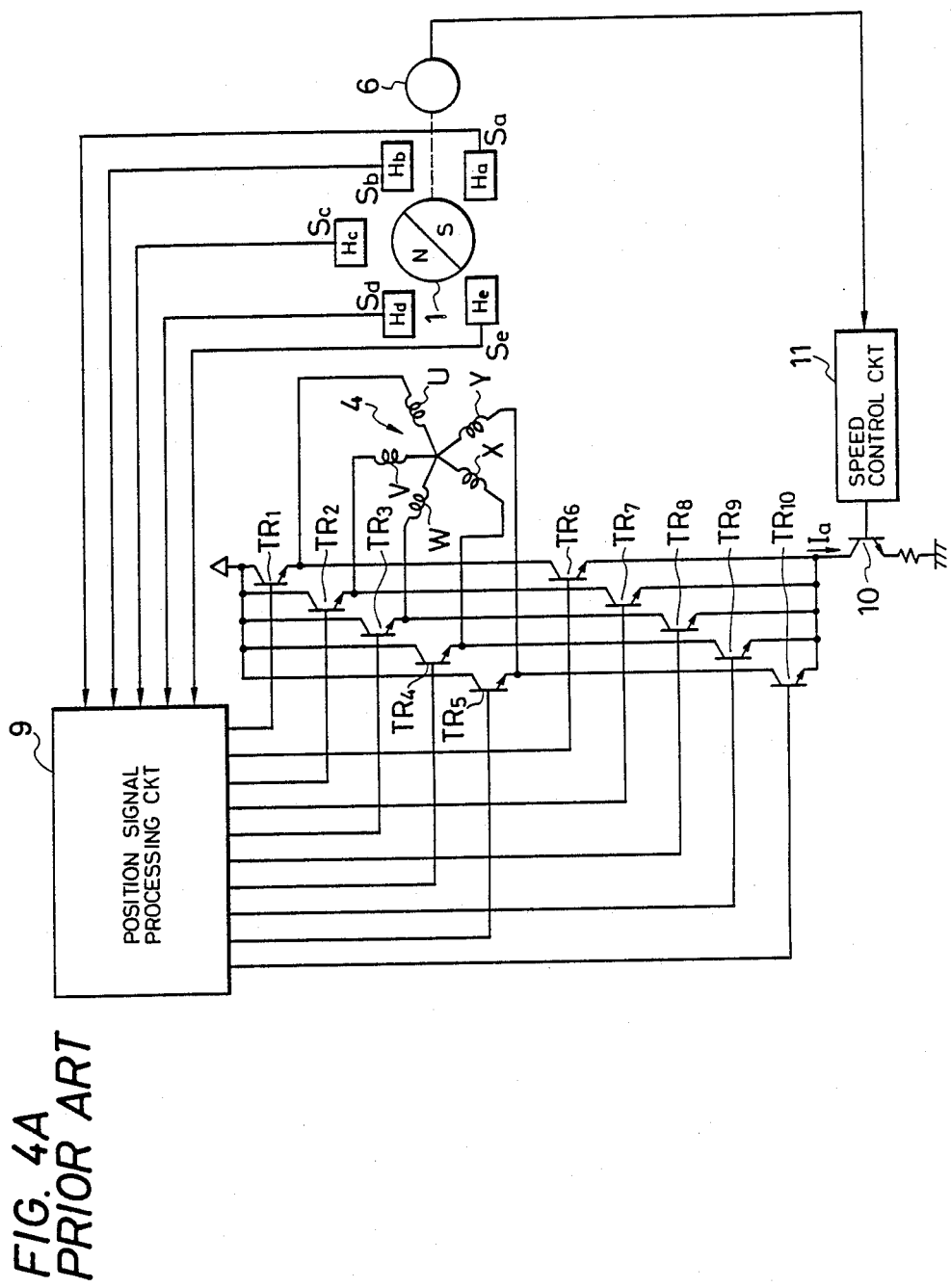
FIGS. 4A and 4B shows circuit arrangement of the conventional five-phase brushless motor of FIG. 3.
Figure 4B:
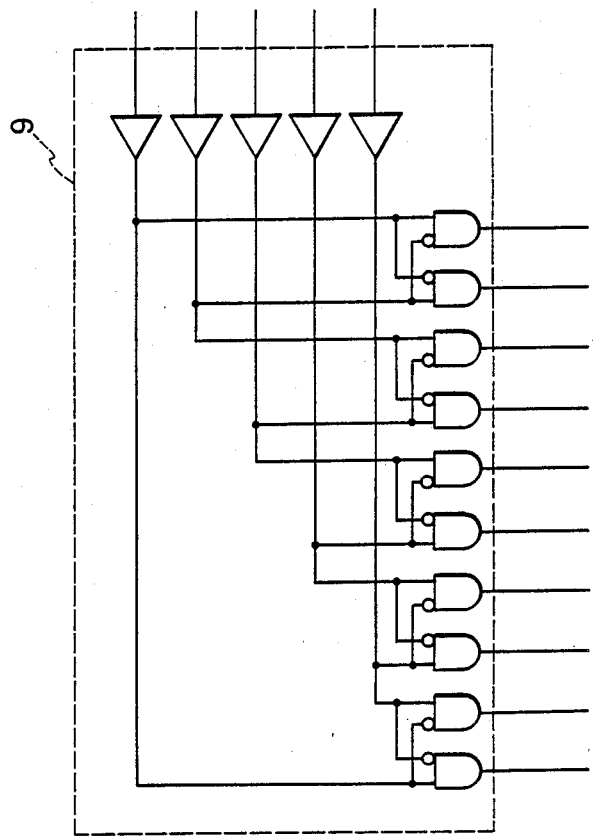

In this conventional brushless motor, the respective Hall generators Ha to He, as shown in FIG. 4A, coupled to the input side of a position signal processing circuit 9 arranged as shown in FIG. 4B to receive position signals Sa to Se therefrom. The output side of the position signal processing circuit 9 is coupled to the bases of transistors TR1 to TR10 which make up a drive circuit. The collectors of the transistors TR1 to TR5 are coupled to a power source, not shown, and the emitters thereof are connected to the collectors of the transistors TR6 to TR10, respectively, and further to star-connected coils U to Y of a drive coil device 4, respectively. The emitters of the transistors TR6 to TR10 are coupled in common to the collector of a control transistor 10, the base of which is connected to the output side of a speed control circuit 11 which outputs a control signal to the base of the control transistor 10 in response to a pulse signal for speed detection from the magnetic sensor 6 so as to set a drive current Ia through the control transistor 10.

Figure 5A:
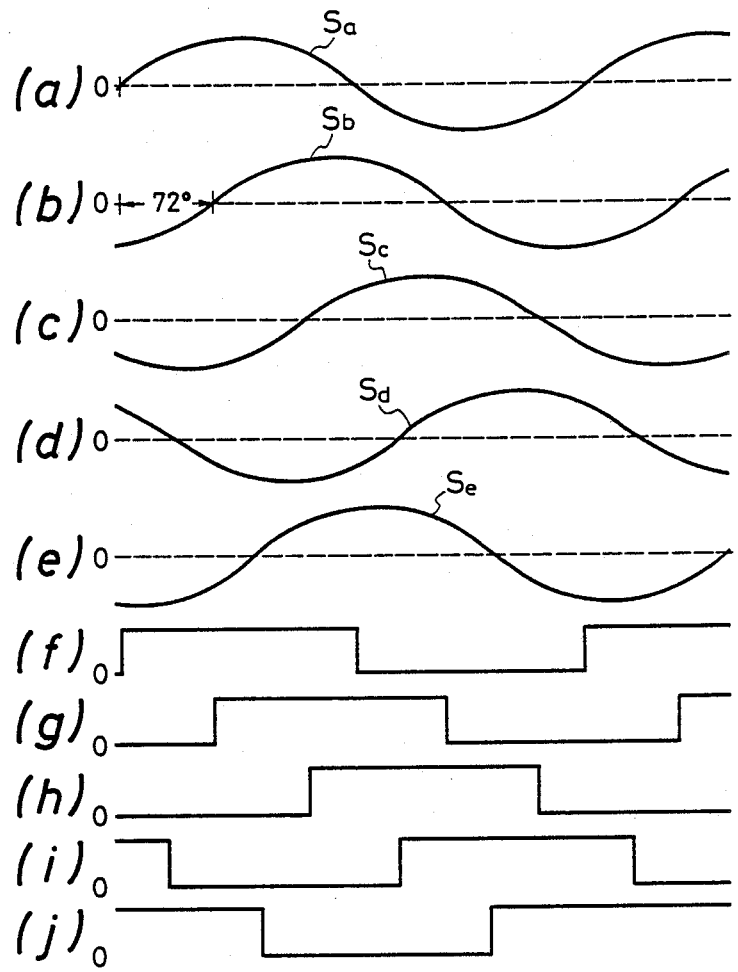
FIGS. 5A, 5B and 5C are graphic illustrations of signals generated in operation of the FIG. 3 brushless motor.
Figure 5B:
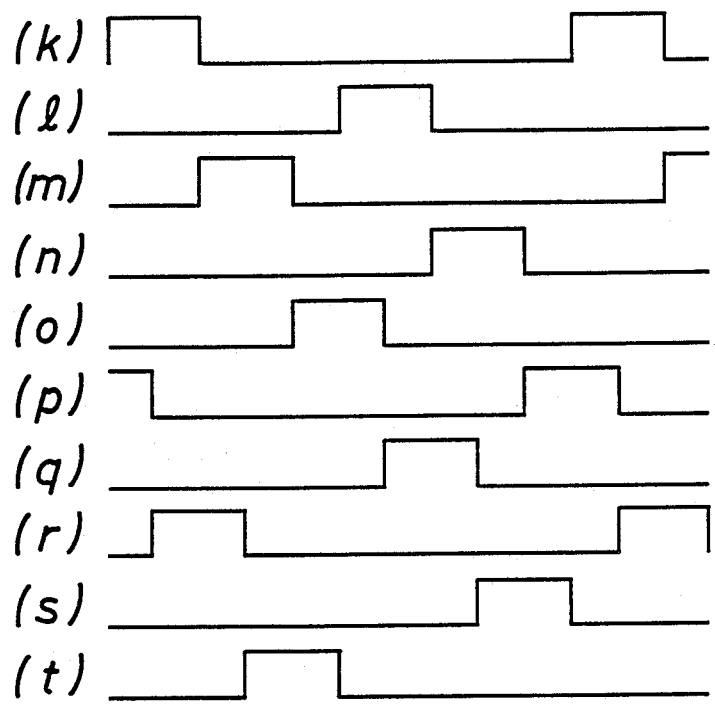

In the five-phase brushless motor thus arranged, since the respective Hall generators Ha to He are disposed to be mutually separated by an electrical angle of 72° in equivalent relation to each other, in response to the detection of the rotor magnet 2, they generate the position signals Sa to Se whose phase difference is 72 degrees as shown in (a) to (e) of FIG. 5A. These position signals Sa to Se are respectively amplified and shaped by operational amplifiers in the position signal processing circuit 9 so as to produce rectangular-wave signals as shown in (f) to (j) of FIG. 5A. Furthermore, these rectangular-wave signals are respectively processed by a logical circuit so as to produce exciting signals, as shown in (k) to (t), which are in turn supplied to the transistors TR1 to TR10, respectively. That is, since the exciting signals (p) and (k) are supplied to the transistors TR8 and TR1, as shown in (u) and (w) of FIG. 5C, a drive current flows through the coil U in the positive direction and a drive current passes through the coil W in the negative direction so that, as shown in (z) of FIG. 5C, a combined torque is applied to the rotor 1, the rotation of which is in turn started.

Figure 5C:
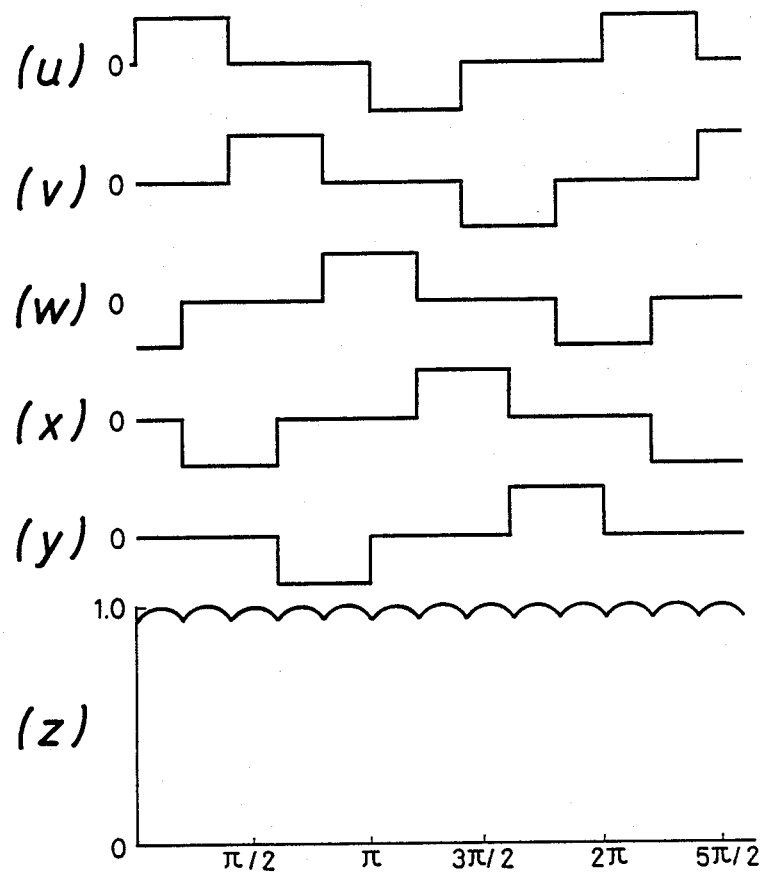

Furthermore, since the exciting signals indicated by (k) and (r) are respectively supplied to the transistors TR1 and TR9, as shown in (u) and (x) of FIG. 5C, the drive current flows through the coil U in the positive direction as it is and passes through the coil X in the negative direction, whereby a torque is generated so as to continuously rotate the rotor 1. Similarly, the exciting signals (l), (m), (n), (o), (q), (s) and (t) are supplied to the transistors TR6, TR2, TR7, TR3, TR4, TR5 and TR10, respectively, so that drive currents are supplied to the respective coils U to Y as shown in (u) to (y) of FIG. 5C resulting in continuous generation of torque and continuous impartment of rotation to the rotor 1.

Figure 6:
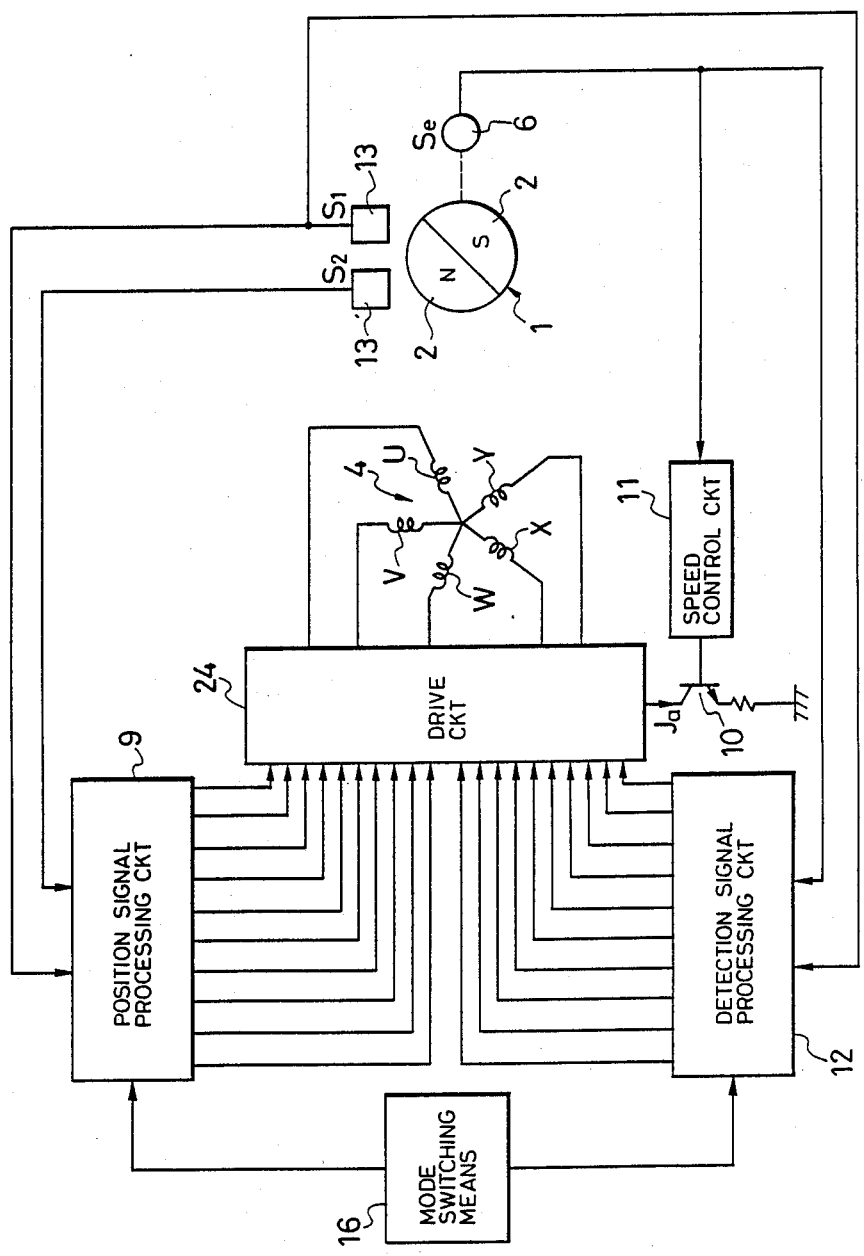
FIG. 6 is a block diagram schematically showing a first embodiment of a brushless motor according to the present invention.
Figure 7:
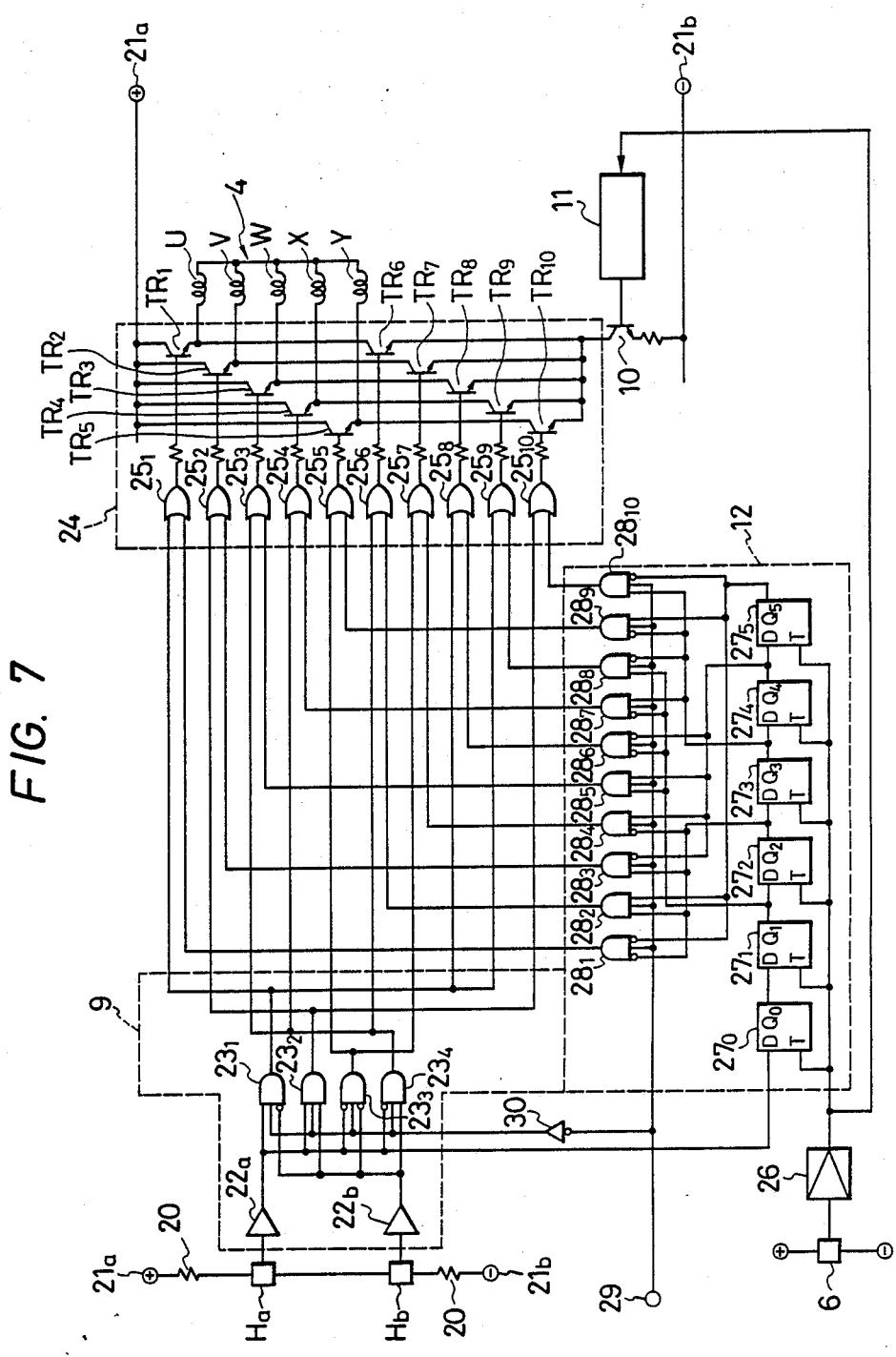
FIG. 7 is a wiring diagram of a circuit for operation of the FIG. 6 brushless motor.

Referring now to FIGS. 6 and 7, there is illustrated an arrangement of a brushless motor according to a first embodiment of the present invention which includes a position signal processing circuit 9 which is coupled to position sensors 13 for detecting the position of a rotor magnet 2 of a rotor 1. In response to position signals S1 and S2 from the position sensors 13, the position signal processing circuit 9 selectively outputs exciting signals to transistors TR1 to TR10 of a drive circuit 24 so that drive currents are supplied to star-connected phase coils U to Y a drive coil device 4 to allow rotation of the rotor 1.

The rotational speed of the rotor 1 is detected by a speed sensor 6 and the detection signal S; of the speed sensor 6, is supplied to a speed control circuit 11, which, per se is well known. In response to input of the detection signal Sl, the speed control circuit 11 controls a control transistor 10 so as to obtain a drive current Ia corresponding to the rotor speed. The detection signal Sl is further coupled to a detection signal processing circuit 12 which is in turn connected to the drive circuit 24 for the selective outputs of exciting signals to the transistors TR1 to TR10.

Further provided is a mode switching means 16 to effect the switching operation between the position signal processing circuit 9 and the detection signal processing circuit 12. In operation, at startup of the brushless motor, the mode switching means 16 causes the position signal processing circuit 9 to operate so that exciting signals are produced on the basis of the position signals S1 and S2 and supplied to the transistors TR1 to TR10 of the drive circuit 24 so as to supply drive currents to the phase coils U to Y. This allows a larger torque to be applied to the rotor 1 which in turn rotates surely irrespective of a large load being applied to the output shaft of the rotor 1. On the other hand, after startup, the mode switching means performs the switching operation from the position signal processing circuit 9 to the detection signal processing circuit 12 so that exciting signals are produced on the basis of the detection signal S; from the speed sensor 6 and the position signals, and supplied to the transistors TR1 to TR10 thereof. This allows stable rotation of the rotor 1 after starting.

Figure 8:
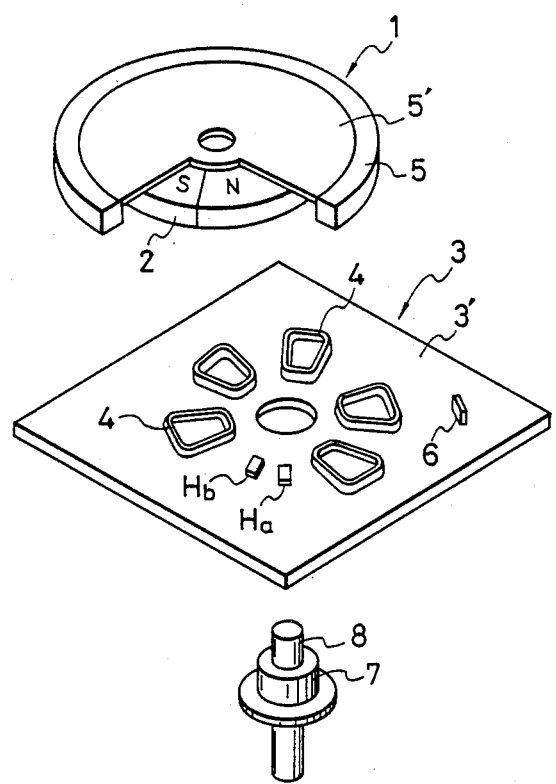
FIG. 8 is an exploded view showing parts of the embodiment according to the present invention.
Figure 9A:
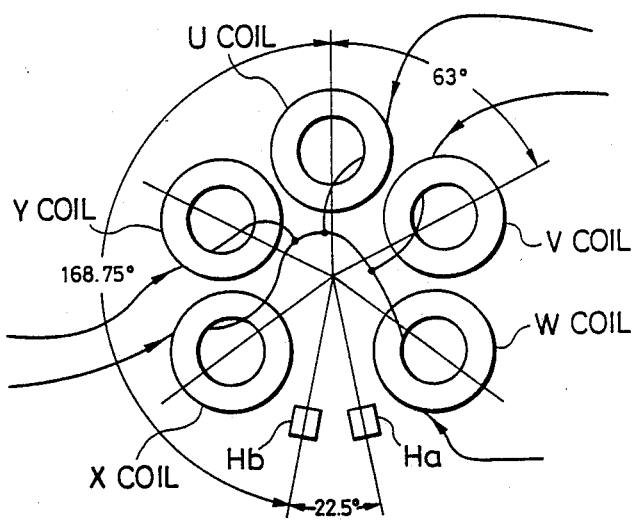
FIGS. 9A and 9B are illustrations for describing the relationship in position between drive coils and the corresponding electrical angles.
Figure 9B:
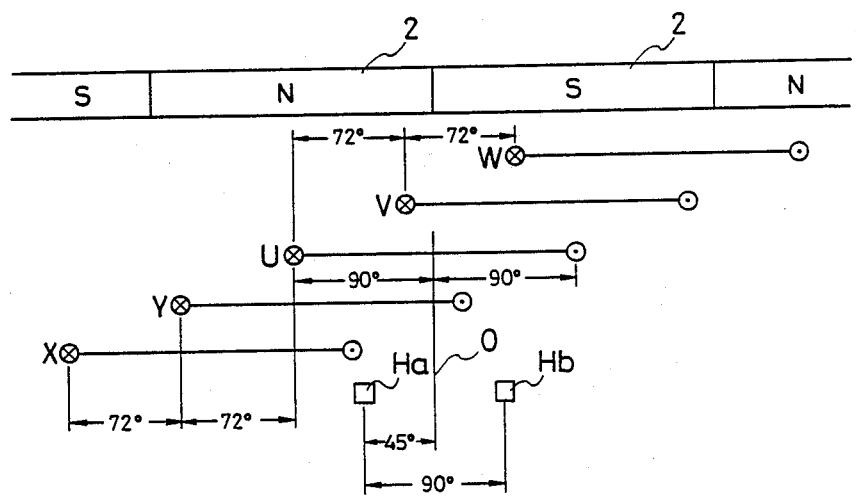

A detailed description of the embodiment of this invention will further be given with reference to the other drawings. FIG. 8 an illustration for describing an arrangement of the five-phase brushless motor according to the present invention. In FIG. 8, the brushless motor comprises an annular rotor 1 having on its outer circumference a FG magnet 5 and at the inner portion a rotor yoke 5', and a stator 3 having on one surface of a magnetic base 3' drive assembly 4. To the undersurface of the rotor yoke 5' is attached a rotor magnet 2 which is permanently magnetized in the direction of the axis of the motor 1 so as to have 8-poles indicated alternately by N and S. The drive coil assembly 4 is composed of five drive coils (phase coils U to Y) which are positioned on the stator 3 so as to be in opposed relation to the rotor magnet 2 and successively arranged at intervals of 63° in terms of the mechanical angle as shown in FIG. 9A so as to have an electrical angle of 252° (72°+180°) as shown in FIG. 9B. Between the two drive coils 4 (X-phase coil, and W-phase coil) at both ends of the drive coil assembly 4 are disposed two Hall generators Ha and Hb which are angularly separated by a mechanical angle of 22.5° from each other and each of which are angularly separated by a mechanical angle of 168.75° clockwise or counterclockwise from the center line of the U-phase coil 4 of the drive coil assemblage 4. Thus, the Hall generators Ha and Hb, as shown in FIG. 9B, are mutually separated by an electrical angle of 90° and disposed at the positions of an electrical angle of 765° with respect to the center O of the U-phase coil 4, resulting in being equivalent to an electrical angle of 45°.

In assembling, the FG magnet 5 provided on the outer circumference of the rotor 1 is positioned to be in opposed relation to a magnetic sensor 6, including a MR element and so on, which is installed on the surface of the stator 3 as clearly seen from FIG. 8. The FG magnet 5 is magnetized so that the signal induced by the magnet sensor 6 has a frequency of ten times (two times the phase number of the motor) the frequency of the signal generated by the Hall generator Ha or Hb. The rotor 1 has at its center portion a hole into which an output shaft 8 is inserted and fixedly secured thereto and the stator 3 also has at its center portion a hole in which a bearing 7 is fitted, the bearing 7 being shaped cylindrically and the output shaft 8 being coaxially inserted into the cylindrically shaped bearing 7 and supported so as to be rotatable with respect thereto.

Here, while the time period for allowing a pair of drive coils to produce a torque in the same direction without switching the direction of the drive current is below a value corresponding to an electrical angle of 180°, the electrical angle for producing a torque with an efficiency required in practice is about 120°. Therefore, in order to sufficiently generate a starting torque regardless of the position of the rotor 1, whenever the rotor 1 rotates by an electrical angle of 360°, it may be necessary that the drive current is switched to be supplied to the drive coil at least three times. In addition, one Hall generator outputs a position signal whose phase is different by 180°, and therefore, it is required that, for switching the drive current at least three times, at least two Hall generators are employed therefor. Thus, in the case that as in this embodiment the number of Hall generators is the minimum (two), the Hall generators Ha and Hb are provided with an electrical angle of 90°.

Figure 10A:
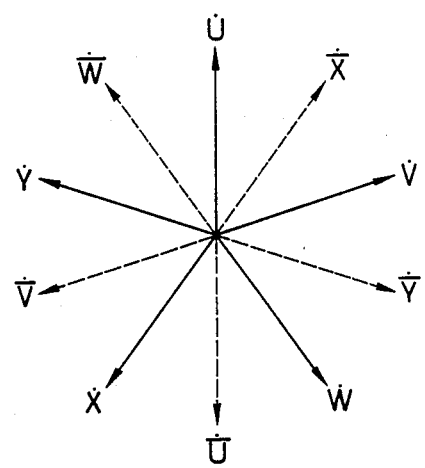
FIGS. 10A and 10B are illustrations for describing torque vectors produced by of drive current to drive coils.
Figure 10B:
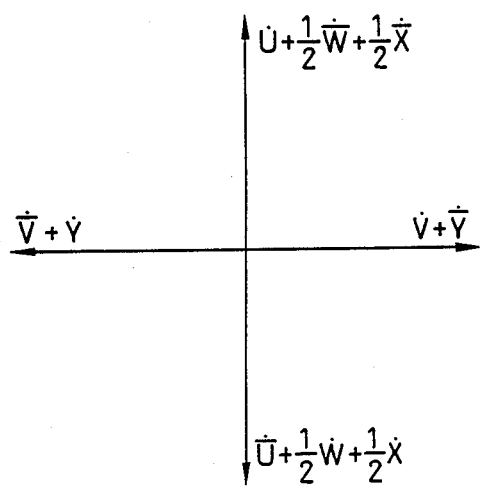

On the other hand, in the case that the interval of the drive current flows is set to an electrical angle of 90° so as to allow a torque to be produced with highest efficiency, on supply of the drive current to the five phase coils U to Y, it is possible to obtain sets of two torque vectors U and U, V and V, W and W, X and X, Y and Y each having the phase difference of 180° in directions opposite to each other, as shown in FIG. 10A. Therefore, by a combination of these torque vectors, four torque vectors U+ W/2+X/2, V+Y, U+W/2+X/2, V=Y can be obtained, each being produced at every an electrical angle of 90°. Thus, when the exciting signals are supplied to the drive circuit 24 in response to the position signals of the Hall generators Ha and Hb, a larger self-starting torque can be generated through the phase coils U to Y of the drive coil assembly 4.

Here, if the drive phase number is set to 2N+1 (N represents an integer not less than 1) and the drive coils are engaged with a star-connection, torque vectors whose number is 2(2N+1) can be obtained at every 180°/(2N+1). With these torque vectors being combined appropriately, the starting torque and torque ripple to be obtained corresponds to that of the two-phase drive of a two-phase motor, as will be described hereinafter.

As shown in FIG. 7, the Hall generators Ha and Hb are respectively coupled through bias resistors 20 to terminals 21a (+) and 21b (−) of a power source, not shown. The Hall generators Ha and Hb are further coupled to the inverting and non-inverting input terminals of operational amplifiers 22a and 22b of the position signal processing circuit 9. The output side of the operational amplifier 22a is connected to the input terminals AND gates 23$_1$ and 23$_2$ and further to the inverting input terminals of AND gates 23$_3$ and 23$_4$. On the other hand, the output side of the operational amplifier 22b is connected to the input terminals of the AND gates 23$_2$ and 23$_4$ and further to the non-inverting input terminals of the AND gates 23$_1$ and 23$_3$. The output side of the AND gate 23$_1$ is coupled to one input terminal of each of OR gates 25$_1$, 25$_8$ and 25$_9$ of the drive circuit 24. The output side of the AND gate 23$_2$ is coupled to one input terminal of each of OR gates 25$_2$ and 25$_{10}$. The output side of the AND gate 23$_4$ is connected to one input terminal of each of OR gates 25$_3$, 25$_4$ and 25$_6$. Furthermore, the output side of the AND gate 23$_3$ is connected to one input terminal of each of OR gates 25$_5$ and 25$_7$.

The respective output sides of the OR gates $25_1$ through $25_{10}$ are coupled to the bases of the transistors TR1 through TR10 of the drive circuit 24, respectively. The respective collectors of the transistors TR1 to TR5 are respectively coupled to the terminal 21a of the power source, not shown, and the respective emitters of the transistors TR6 to TR10 are respectively coupled to the collector of a control transistor 10. The emitters of the transistors TR1 to TR5 are connected to the phase coils U to Y of the drive coil assemblage 4 which are star-connected. The base of the control transistor 10 is coupled to the speed control circuit 11 which is in turn coupled to the magnetic sensor 6 to receive a pulse detection signal for speed detection therefrom.

The output side of the magnetic sensor 6 is further coupled through an amplifier 31 to the detection signal processing circuit 12. The detection signal processing circuit 12 includes shift register portions $27_0$ through $27_5$, each being made up of a D-flip-flop, the clock input T of each of which is coupled to the amplifier 31. To the D input of the shift register portion $27_0$ is coupled the output side of the operational amplifier 22a and to the D inputs of the other shift registers portions $27_1$ to $27_5$ is coupled successively to the Q outputs ($Q_0$ to $Q_5$) of the shift register portions $27_0$ to $27_4$. The $Q_1$ output of the shift register portion $27_1$ is further coupled to input terminals of AND gates $28_5$ and $28_8$ and further to inverting input terminals of AND gates $28_6$ and $28_7$. The $Q_2$ output of the shift register portion $27_2$ is coupled to input terminals of AND gates $28_2$ and $28_3$ and further to inverting input terminals of AND gates $28_1$ and $28_4$. The $Q_3$ output of the shift register portion $27_3$ is coupled to input terminals of AND gates $28_7$ and $28_{10}$ and further to inverting input terminals of AND gates $28_8$ and $28_9$. In addition, the $Q_4$ output of the shift register portion $27_4$ is coupled to input terminals of AND gates $28_4$ and $28_5$ and further to inverting input terminals of AND gates $28_3$ and $28_6$. The $Q_5$ output of the shift register portion $27_5$ is coupled to input terminals of AND gates $28_2$ and $28_9$ and further to inverting input terminals of AND gates $28_1$ and $28_{10}$. The output sides of the AND gates $28_1$ to $28_{10}$ are connected to the other input terminals of the OR gates $25_1$ to $25_{10}$ of the drive circuit 24. Input terminals of the AND gates $28_1$ to $28_{10}$ are connected in common to a mode terminal 29 of the mode switching means 16 which is in turn coupled through an inverter 30 to input terminals of the AND gates $23_1$ to $23_4$.

A description of operation of the five-phase brushless motor according to this invention will be made hereinbelow.

At startup the mode terminal 29 is set to the low level "L", and therefore, the AND gates $28_1$ to $28_{10}$ of the detection signal processing circuit 12 are in the non-operable states, respectively. On the other hand, the AND gates $23_1$ to $23_4$ of the position signal processing circuit 9 are set to the operable state with high level "H" signals being inputted to the input terminals thereof through the inverter 30. On starting, in response to detection of N-pole and S-pole of the rotor magnet 2, as shown in (a) and (b) of FIG. 11A, the Hall generators Ha and Hb generate sine-wave position signals Va and Vb between which the phase difference is 90°. These position signals Va and Vb are amplified and shaped in the operational amplifiers 22a and 22b, respectively, so as to obtain rectangular-wave signals Va' and Vb', as shown in (c) and (d) of FIG. 11A, which are in turn inputted to the AND gates $23_1$ to $23_4$. Thus, when the rectangular-wave signal Va' is in the high level "H" state and the rectangular-wave signal Vb' is in the low level "L" state, an exciting signal shown in (e) of the same drawing is outputted from the AND gate $23_1$. This exciting signal is supplied through the OR gates $25_1$, $25_8$ and $25_9$ to the transistors TR1, TR8 and TR9 so that a drive current Ia is allowed to pass through the phase coil U in the positive direction and drive currents of Ia/2 are carried to flow through phase coils W and X in the negative directions, as shown in (i), (k) and (l) of FIG. 11B. FIG. 12 shows at (A) the states of these drive current flows. Due to shunting of the drive current Ia as shown in (n) of FIG. 11B, a combined torque of 95% of a combined torque on non-shunting is produced with respect to the rotor 1, resulting in start of rotation of the rotor 1.

Subsequently, when both the rectangular-wave signals Va' and Vb' are changed to the high level "H", the AND gate $23_2$ outputs an exciting signal as shown in (f) of FIG. 11A. This exciting signal is supplied through the OR gates $25_2$ and $25_{10}$ to the transistors TR2 and TR10, and therefore, a drive current Ia goes through the phase coil V in the positive direction and a drive current Ia runs through the phase coil Y in the negative direction as shown in (j) and (m) of FIG. 11B. FIG. 12 illustrates at (B) the drive current flow states. Here, a combined torque of 100% is produced for the rotor 1 which is in turn rotated further.

Figure 11A:
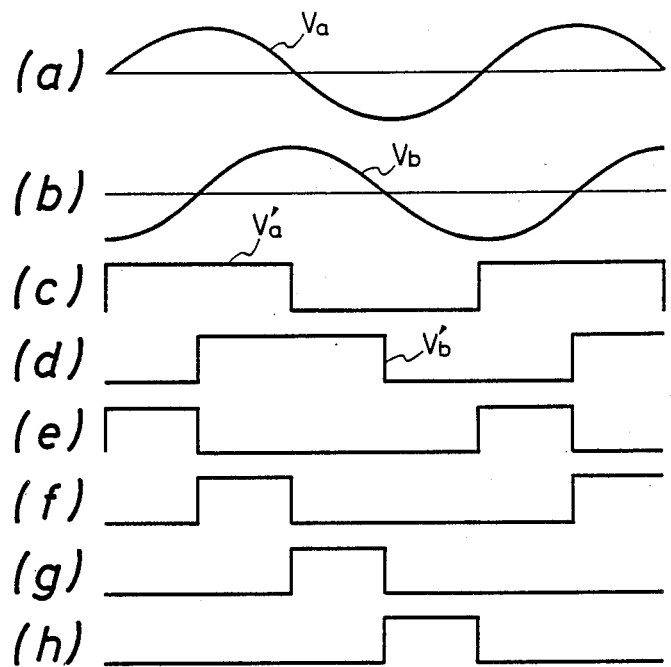
FIGS. 11A and 11B are illustrations for describing operation of the FIG. 6 brushless motor at startup.
Figure 11B:
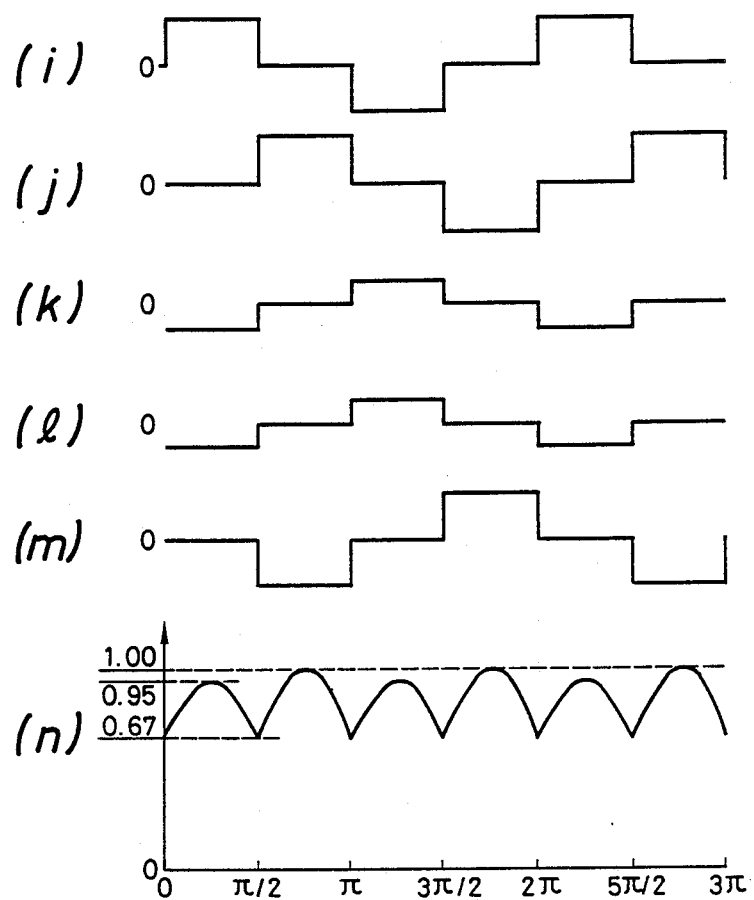
Figure 12:
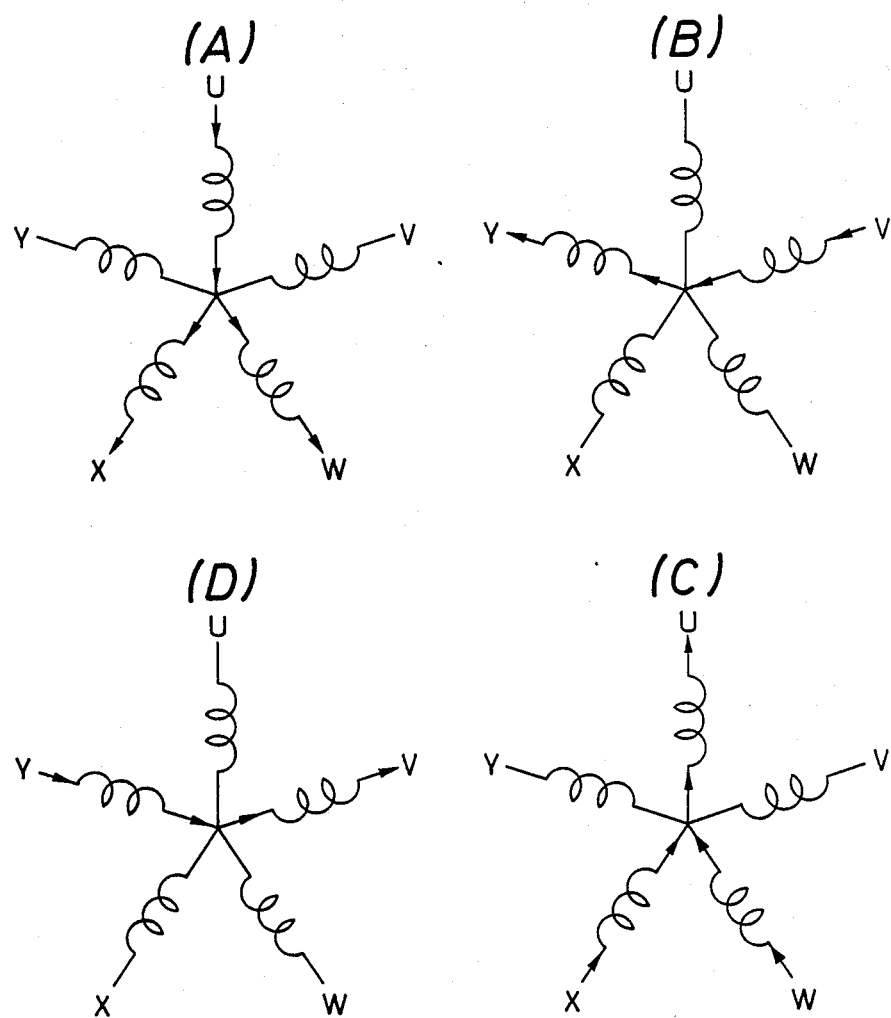
FIG. 12 shows the states of supply of drive currents to drive coils.

Furthermore, when the rectangular-wave signal Va' is changed to the low level "L" and the rectangular-wave signal Vb' is changed to the high level "H", the AND gate $23_4$ generates an exciting signal as shown in (g) of FIG. 11A. This exciting signal is supplied through the OR gates $25_3$, $25_4$ and $25_6$ to the transistors TR3, TR4 and TR6, whereby drive currents of Ia/2 of the positive directions flow through the phase coils W and X and a drive current Ia of the negative direction passes through the phase coil U as shown in (i), (k) and (;) of FIG. 11B. FIG. 12 shows at (C) the drive current flow states. Thus, a combined torque of 95% is generated in terms of the rotor 1, resulting in continuous rotation of the rotor 1. In addition, in response to both the rectangular-wave signals Va' and Vb' being changed to the low level "L", an exciting signal is outputted from the AND gate $23_3$ as shown in (h) of FIG. 11A and supplied through the OR gates $25_5$ and $25_7$ to the transistors TR5 and TR7. As a result, a positive-direction drive current Ia is supplied to the phase coil Y and a negative-direction drive current Ia is introduced into the phase coil V. FIG. 12 illustrates at (D) the drive current flow states. Thus, a 100% combined torque is generated with respect to the rotor 1 to be rotated as it is.

The above-mentioned operations are similarly repeated so as to continuously rotate the rotor 1. In this case, although the torque ripple of the combined torque increases as well as in the two-phase drive of a two-phase motor, the level of the combined torque becomes sufficiently greater. Therefore, the rotor 1 can be rotated surely regardless of a large load being applied to the output shaft 8 of this brushless motor.

Figure 13A:
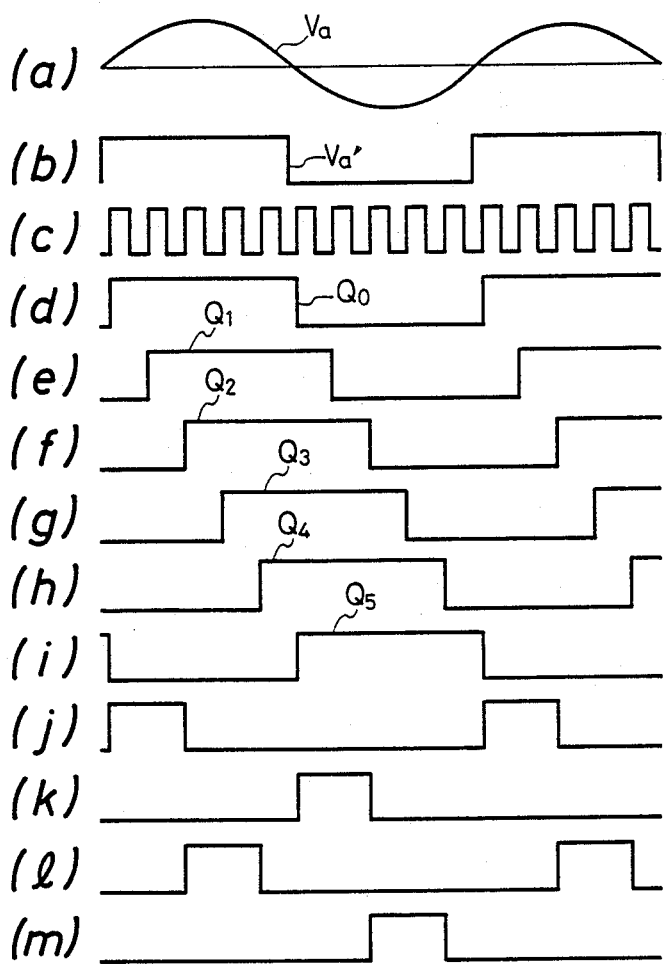
FIGS. 13A and 13B are illustrations for describing operation of the FIG. 6 brushless motor after starting.

As described above, since the mode terminal 29 is switched to the high level state after startup of the brushless motor, the AND gates $23_1$ to $23_4$ of the position signal processing circuit 9 are respectively placed in the non-operable states and the AND gates $28_1$ to $28_{10}$ of the detection signal processing circuit 12 are respectively kept in the operable states. In such operating states, when the rotational speed of the rotor 1 is detected by means of the magnetic sensor 6, a detection pulse signal as shown in (c) of FIG. 13A is outputted from the magnetic sensor 6. This detection pulse signal is inputted through the amplifier 31 to the clock inputs T of the shift register portions $27_0$ to $27_5$. On the other hand, as shown in (a) and (b) of FIG. 13A, the position signal Va of the Hall generator Ha is amplified and shaped in the operational amplifier 22a so as to produce a rectangular-wave signal Va' which is in turn inputted to the D input of the shift register portion $27_0$. Thus, when the detection pulse signal is inputted at the rising-point of the rectangular-wave signal Va', the $Q_0$ output of this shift register portion $27_0$ assumes the high level "H" as indicated in (d) of FIG. 13A. On the other hand, when it is inputted at the falling-point of the rectangular-wave signal Va', the Qo output thereof assumes the low level "L". Furthermore, when the detection pulse signal is inputted at the rising-point of the $Q_0$ output, the $Q_1$ output of the next shift register portion $27_1$ assumes the height level "H" as indicated by (e) of FIG. 13A, and when inputted at the falling-point thereof, the $Q_1$ output thereof becomes "L". Similarly, the $Q_2$ to $Q_5$ outputs of the other shift register portions $27_2$ to $27_5$ repeatedly assume "H" and "L" as indicated by (f) to (i) of FIG. 13A, resulting in the rectangular-wave signal Va' being successively shifted.

With the $Q_2$ and $Q_5$ of the shift register portions $27_2$ and $27_5$ being kept to "L", as shown in (j) of FIG. 13A, an exciting signal is outputted from the AND gate $28_1$ and at the same time the Q1 output of the shift register portion $27_1$ is varied to "H", and with the $Q_3$ output of the shift register portion $27_3$ being kept to "L", as indicated by (q) of FIG. 13A, an exciting signal is generated from the AND gate $28_8$. Therefore, these exciting signals are supplied through the OR gates $25_1$ and $25_9$ to the transistors TR1 and TR9 so that, as shown in (t) and (w) of FIG. 13B, a drive current Ia flows through the phase coil U in the positive direction and a drive current Ia passes through the phase coil X in the negative direction. This causes generation of a torque with a small torque ripple as shown in (y) of FIG. 13B.

In the case that the $Q_2$ output of the shift register portion $27_2$ is varied to "H", while the $Q_4$ output of the shift register portion $27_4$ is maintained to "L", an exciting signal is outputted from the AND gate $28_3$ as shown in (l) of FIG. 13A. As a result, the exciting signal is supplied through the OR gates $25_2$ and $25_9$ to the transistors TRa and TR9 so that, as shown in (u) and (w) of FIG. 13B, a drive current Ia is supplied in the positive direction to the phase coil V and a drive current Ia is supplied in the negative direction to the phase coil X, similarly resulting in generation of a torque with a small torque ripple.

Figure 13B:
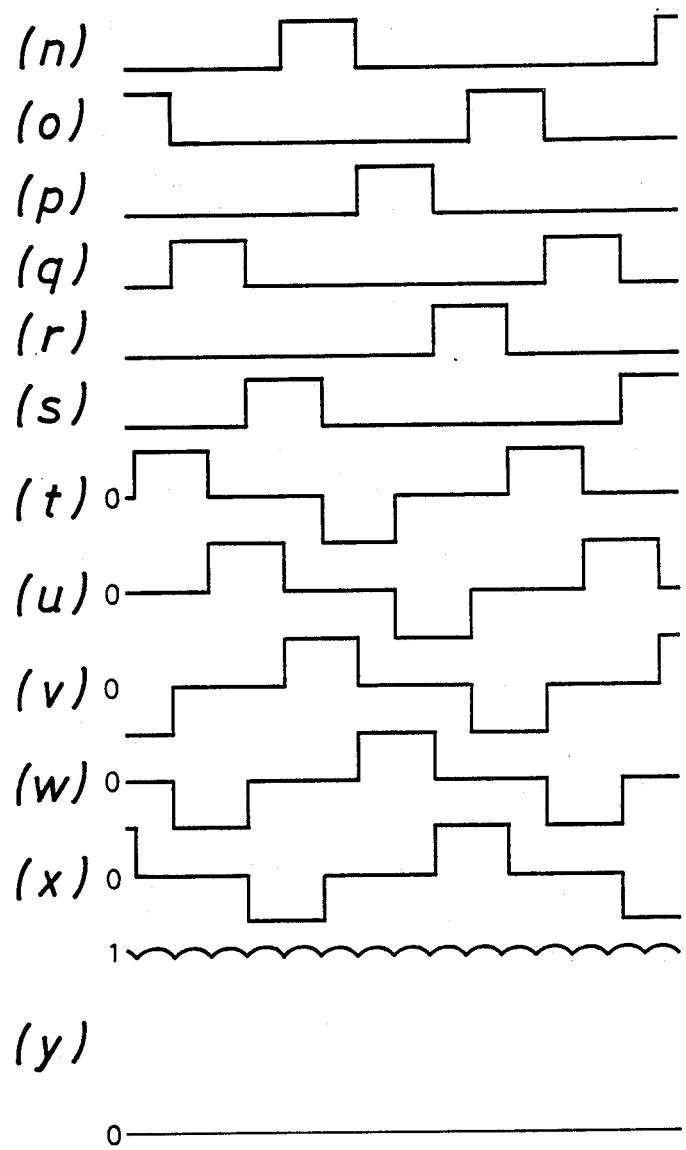

In response to the Q3 output of the shift register portion $27_3$ being changed to "H", while the $Q_5$ output is kept to "L", the AND gate $28_{10}$ generates an exciting signal as shown in (s) of FIG. 13B. Since the exciting signal is supplied through the OR gate $25_2$ and $25_{10}$ to the transistors TR2 and TR10, as shown in (u) and (x) of FIG. 13B, a drive current Ia flows through the phase coil V in the positive direction and a drive current Ia runs through the phase coil Y in the negative direction, similarly resulting in generation of a torque for the rotor 1. Furthermore, when the $Q_4$ output of the shift register $27_4$ is changed to "H", the AND gate $28_5$ generates an exciting signal as indicated by (n) of FIG. 13B. Therefore, the exciting signal is supplied through the OR gates $25_3$ and $25_{10}$ to the transistors TR3 and TR10 so that, as shown in (v) and (x) of FIG. 13B, a drive current Ia is supplied to the phase coil W in the positive direction and a drive current Ia is further supplied to the phase coil Y in the negative direction to cause a torque to be generated for the rotor 1.

When the $Q_5$ output of the shift register portion $27_5$ is varied to the high level "H" state, the AND gate $28_2$ generates an exciting signal as indicated by (k) of FIG. 13A. Thus, the exciting signal is supplied through the OR gates $25_3$ and $25_6$ to the transistors TR3 and TR6 so that, as shown in (t) and (v) of FIG. 13B, a drive current Ia flows through the phase coil W in the positive direction and a drive current flows through the phase coil U in the negative direction, resulting in generation of a torque for the rotor 1. Furthermore, In response to the $Q_1$ output of the shift register $27_1$ being changed to the low level "L" state, the AND gate $28_7$ outputs an exciting signal as indicated by (p) of FIG. 13B, which is in turn supplied through the OR gates $25_4$ and $25_6$ to the transistors TR4 and TR6 so that, as shown in (w) and (t), the phase coil X receives a positive-direction drive current Ia and the phase coil U receives a negative-direction drive current Ia, thus resulting in generation of a torque for the rotor 1.

Furthermore, if the $Q_2$ output of the shift register $27_2$ is changed to the low level "L" state, the AND gate $28_4$ outputs an exciting signal as indicated by (m) of FIG. 13A. The exciting signal is supplied through the OR gates $25_4$ and $25_7$ to the transistors TR4 and TR7 such that, as shown in (w) and (u) of FIG. 13A, the phase coil X receives a positive-direction drive current Ia and the phase coil V receives a negative-direction drive current Ia, resulting in generation of a torque for the rotor 1. In response to the $Q_3$ output of the shift register $27_3$ being changed to the low level "L" state, the AND gate $28_9$ generates an exciting signal as shown in (r) of FIG. 13B, which is in turn supplied through the OR gates $25_5$ and $25_7$ to the transistors TR5 and TR7 so that, as indicated by (x) and (u) of FIG. 13B, a positive-direction drive current Ia flows through the phase coil Y and a negative-direction drive current Ia passes through the phase coil V so as to generate a torque with respect to the rotor 1. Furthermore, with the $Q_4$ output of the shift register portion $27_4$ being changed to "L", an exciting signal is outputted from the AND gate $28_6$ as shown in (o) of FIG. 13B. The exciting signal is supplied through OR gates $25_5$ and $25_8$ to the transistors TR5 and TR8 and therefore, as shown in (x) and (v) of FIG. 13B, a positive-direction drive current flows through the phase coil Y and a negative-direction drive current flows through the phase coil W, thus resulting in generation of a torque for the rotor 1. Similar operations are repeatedly effected so that the rotor 1 is successively rotated with a small torque ripple as shown in (y) of FIG. 13B.

In the above-mentioned embodiment, for example, the switching of the mode terminal 29 between "H" and "L" may be performed by a motor-control microcomputer or the like in accordance with a detection signal from the rotational speed detecting device or the like. Furthermore, although in the embodiment the position signals Va and Vb of the Hall generators Ha and Hb are respectively shaped to the rectangular-wave signals Va' and Vb', it is also appropriate to obtain an exciting signal by means of analog processing. In this case, since exciting signals can be supplied to the transistors TR1 to TR10 so as to be gradually varied, it is possible to greatly reduce the vibration noises produced in connection with rotation of the rotor 1. This noise reduction is effective for high-speed drive of a tape in a video tape recorder, for example. In addition, it is also appropriate that the detection signal of the magnetic sensor 6 is divided and then supplied to the shift register portions $27_0$ to $27_5$.

Figure 14:
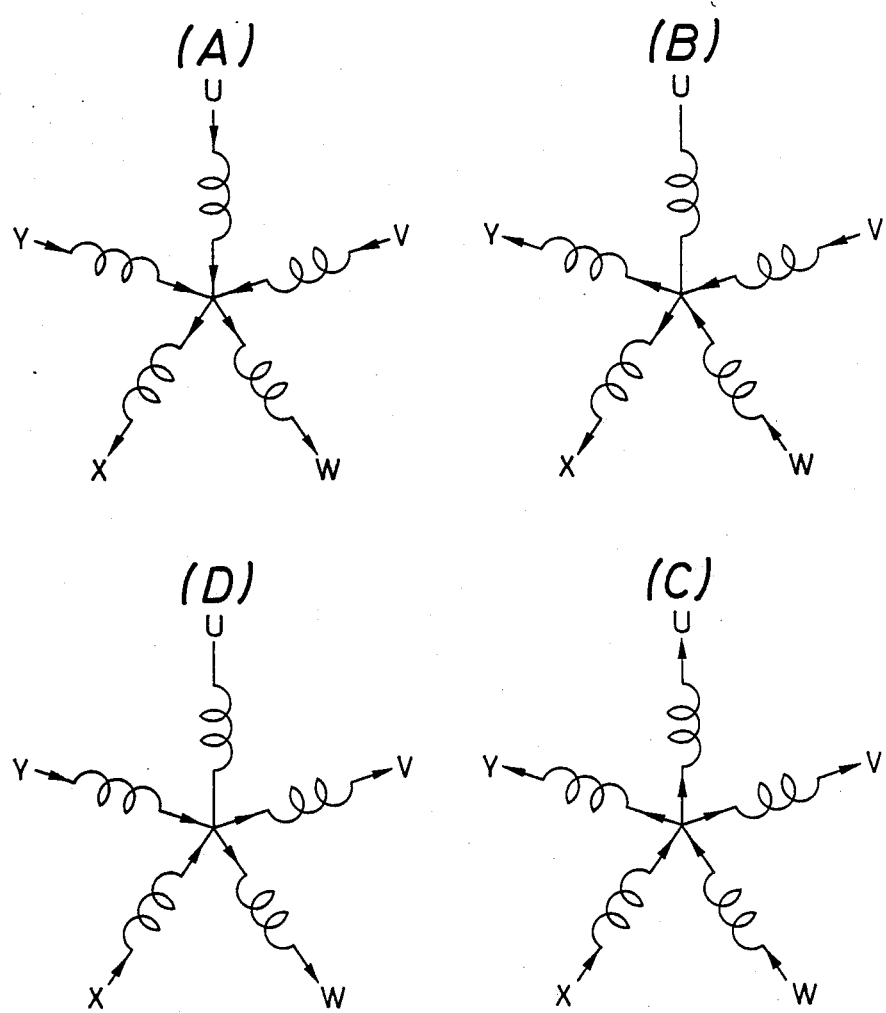
FIGS. 14, 15, 16 and 17 are illustrations for describing the states of supply of drive currents to drive coils whose number is different.

FIG. 14 shows other ways of supply of drive currents to five phase coils U to Y. Initially, positive-direction drive currents are supplied to the coils U, V and Y and negative-direction drive currents are supplied to the coils W and X, as shown in (A) of FIG. 14. Then, as shown in (B) of the same drawing, positive-direction drive currents are introduced into the phase coils V, W and negative-direction drive currents flows through the phase coils X, Y. Subsequently, as indicated by (C) of the same drawing, positive-drive currents passes through the phase coils W, X and negative-direction drive currents are introduced into the phase coils U, V, Y. Furthermore, as indicated by (D), drive currents flow through the phase coils X, Y in the positive directions and runs through the phase coils V, W in the negative directions. These operations for supply of drive currents to the phase coils U to Y may be effected by the incorporation of a logical circuit corresponding to the position signal processing circuit 9.

Figure 15:
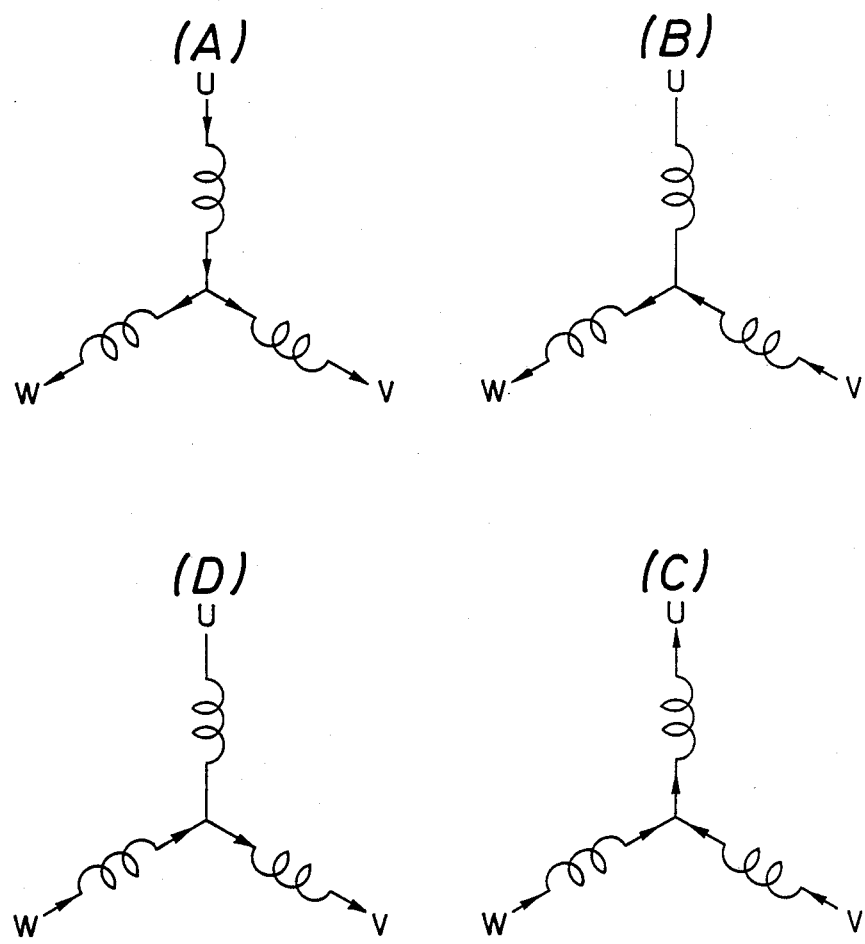

FIG. 15 are illustrations for describing the ways of supplying drive current to three phase coils U to Y. Initially, as shown in (A) of FIG. 15, a positive-direction drive current is supplied to the coil U and negative-direction drive currents are introduced into the coils V, W. Furthermore, as shown in (B) of FIG. 15, a positive-direction drive current flows through the coil V and a negative-direction drive current passes through the coil W. Subsequently, as indicated by (C) of the same drawing, positive-direction drive currents flow through the coils V, W and a negative-direction drive current runs through the coil U. Still further, as indicated by (D), a positive-direction drive current is introduced into the coil W and a negative-direction drive current is supplied to the coil V.

Figure 16:
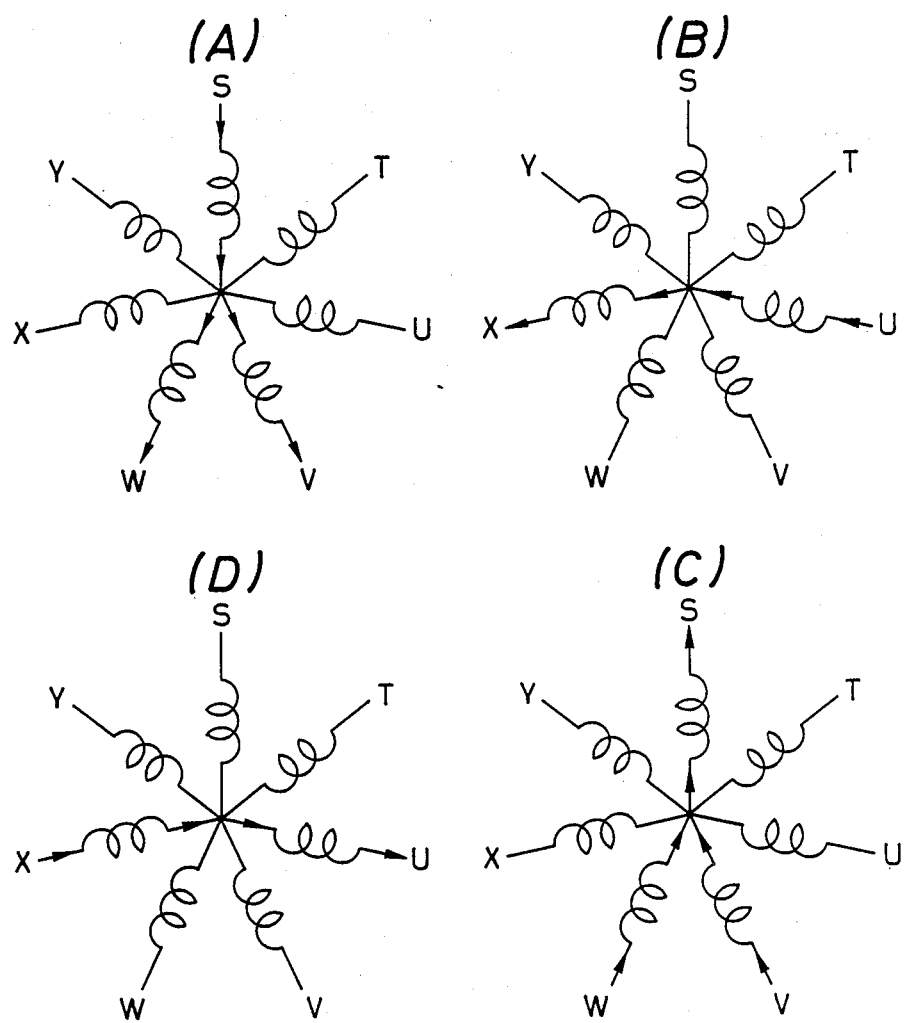

FIG. 16 shows the ways of supplying drive currents to seven coils S through Y in response to the position signals. First, as shown in (A) of FIG. 16, a positive-direction drive current is carried to flow through the coil S and negative-direction drive currents are supplied to flow through the coils V, W, and, as shown in (B), a positive-direction drive current passes through the coil U and a negative-direction drive current flows through the coil X. Subsequently, as shown in (C) of the same drawing, positive-direction drive currents are supplied to the coils V, W and a negative-direction drive current is introduced into the coil S. Furthermore, as indicated by (D), a positive-direction drive current flows through the coil X and a negative-direction passes through the coil U.

Figure 17:
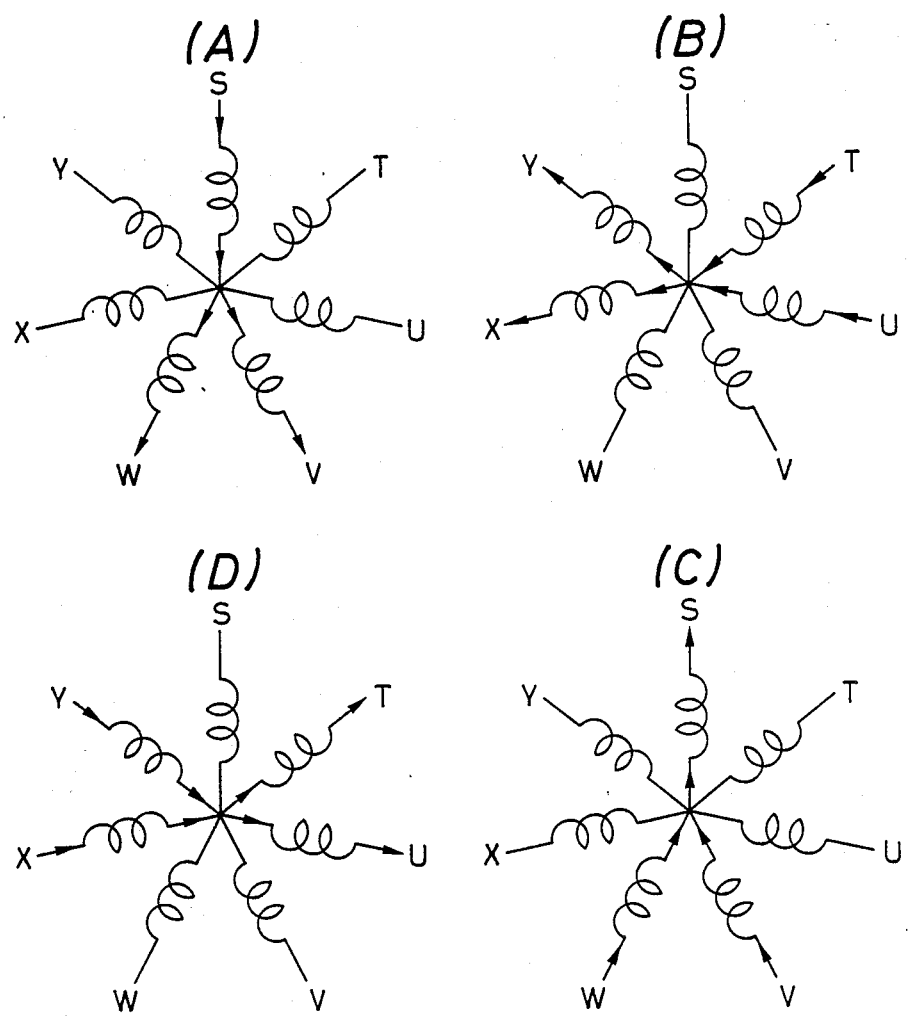

FIG. 17 illustrates other ways of supply of drive currents to the seven coils S through Y. First, as shown in (A) of FIG. 17, a positive-direction drive current flows through the coil S and negative-direction drive currents pass through the coils V, W, and as shown in (B), positive-direction drive currents are supplied to the coils T, U and negative-direction drive currents are introduced into the coils X, Y. Furthermore, as indicated by (C) of the same drawing, positive-direction drive currents flow through the coils V, W and a negative-direction drive current passes through the coil S, and as indicated by (D), positive-direction drive currents flow through the coils X, Y and negative-direction drive currents flow through the coils T, U.

Figure 18:
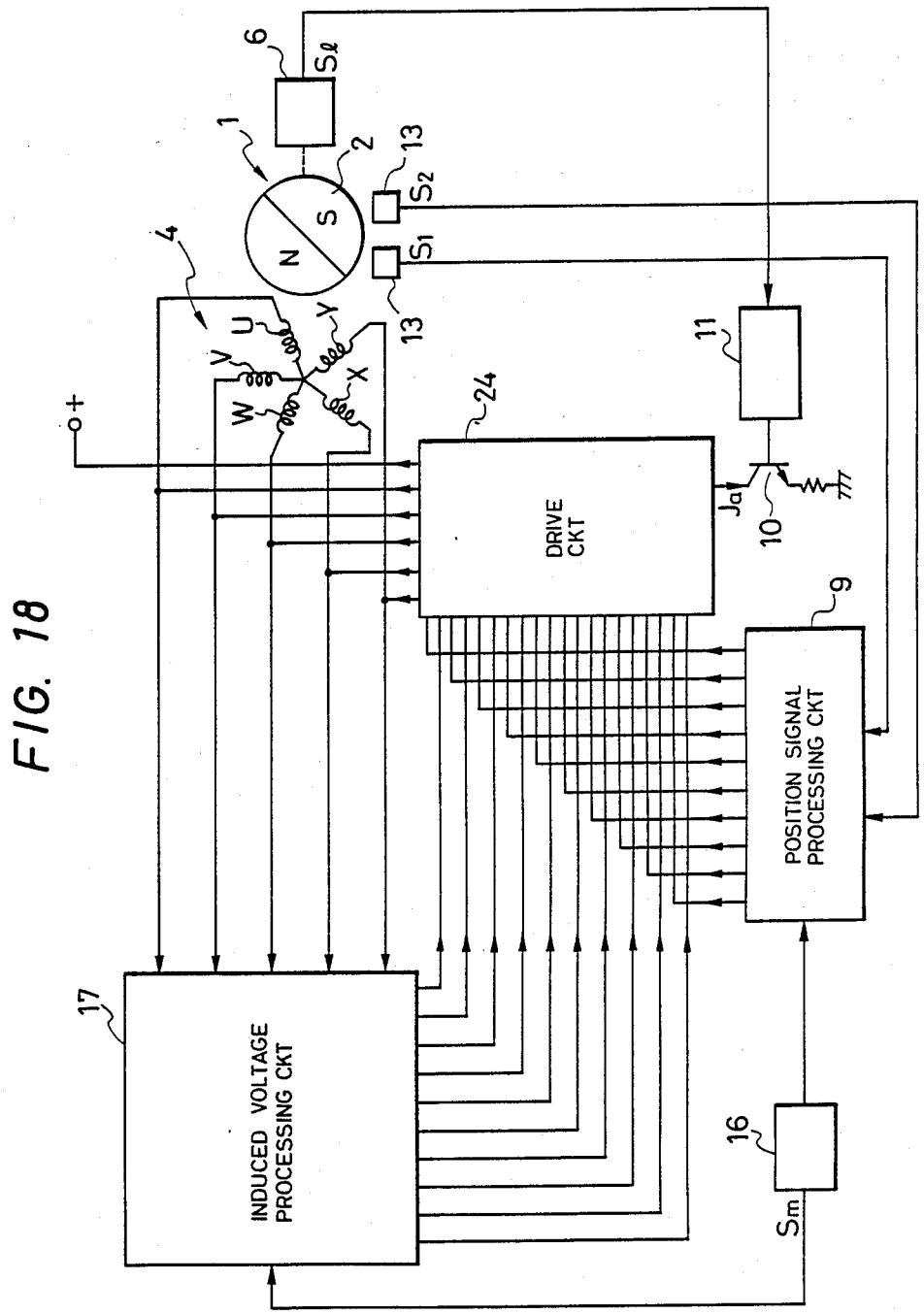
FIG. 18 is a block diagram showing a second embodiment of the present invention.
Figure 19:
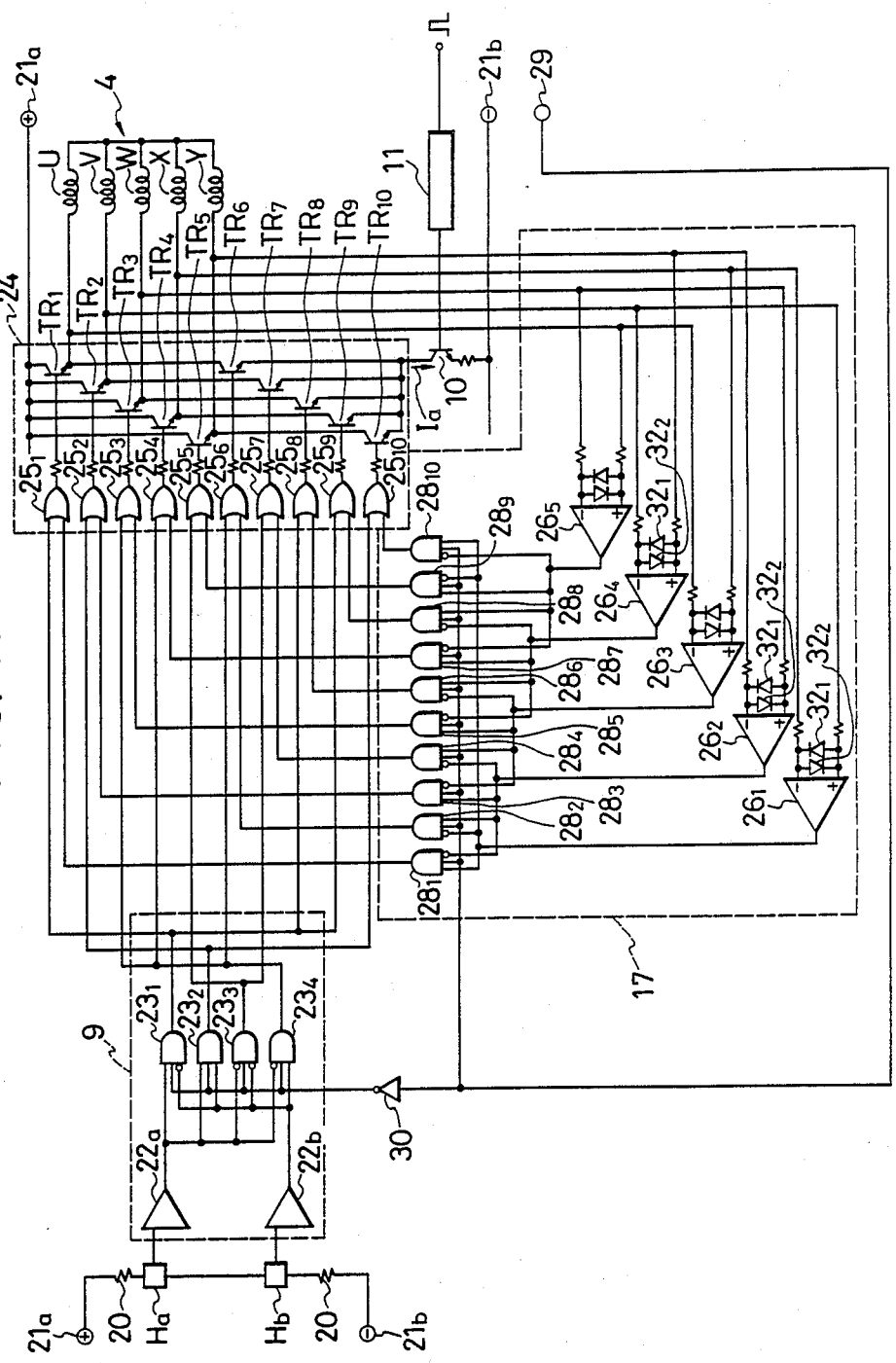
FIG. 19 is an illustration of a circuit arrangement of the FIG. 18 brushless motor.

FIGS. 18 and 19 show a second embodiment of the present invention; FIG. 18 being a block diagram illustrating an arrangement of a multi-phase brushless motor and FIG. 19 illustrating the details of circuits of the FIG. 18 brushless motor. The description of parts corresponding to those of the above-mentioned first embodiment will be omitted for brevity unless difficult to understand in the second embodiment. In FIG. 18, the brushless motor includes a position signal processing circuit 9 which is coupled to position sensors 13 for detecting the position of a rotor magnet 2 of a rotor 1. In response to position signals S1 and S2 from the position sensors 13, the position signal processing circuit 9 selectively outputs exciting signals to transistors TR1 to TR10 of a drive circuit 24 so that drive currents are supplied to star-connected phase coils U to Y of a drive coil assembly 4 to allow rotation of the rotor 1.

The rotational speed of the rotor 1 is detected by a speed sensor 6 and the detection signal Sl of the speed sensor 6 is supplied to a speed control circuit 11. In response to input of the detection signal Sl, the speed control circuit 11 controls a control transistor 10 so as to obtain a drive current Ia corresponding to the rotor speed. Further provided is an induced voltage processing circuit 17 which is coupled to the drive coil assembly 4 and the drive circuit 24 and further coupled through a mode switching means 16 to the position signal processing circuit 9. In response to input of a switching signal Sm from the mode switching means 16, the induced voltage processing circuit 17 selectively outputs exciting signals to transistors TR1 to TR10 on the basis of inducement voltages of phase coils U to Y so as to allow rotation of the rotor 1. In operation, at startup of the brushless motor, the mode switching means 16 causes the position signal processing circuit 9 to operate so that exciting signals are produced on the basis of the position signals S1 and S2 and supplied to the transistors TR1 to TR10 of the drive circuit 24 so as to supply drive currents to the phase coils U to Y. This allows a larger torque to be applied to the rotor 1 which in turn rotates surely irrespective of a large load being applied to the output shaft of the rotor 1. On the other hand, after startup, the mode switching means 16 generates the switching signal to the induced voltage processing circuit 17 which in turn takes the inducement voltages of the phase coils U to Y so that exciting signals are supplied to the transistors TR1 to TR10 thereof. This allows stable rotation of the rotor 1 after starting.

The mechanical arrangement of the second embodiment brushless motor may be similar to that of the first embodiment brushless motor described above with reference to FIGS. 8 to 10B, and thus the description thereof will be omitted.

As shown in FIG. 19, the Hall generators Ha and Hb are respectively coupled through bias resistors 20 to terminals $21a$ (+) and $21b$ (−) of a power source, not shown. The Hall generators Ha and Hb are further coupled to the inverting and non-inverting input terminals of operational amplifiers $22a$ and $22b$ of the position signal processing circuit 9. The output side of the operational amplifier $22a$ is connected to the input terminals of AND gates $23_1$ and $23_2$ and further to the inverting input terminals of AND gates $23_3$ and $23_4$. On the other hand, the output side of the operational amplifier $22b$ is connected to the input terminals of the AND gates $23_2$ and $23_4$ and further to the non-inverting input terminals of the AND gates $23_1$ and $23_3$. The output side of the AND gate $23_1$ is coupled to one input terminal of each of OR gates $25_1$, $25_8$ and $25_9$ of the drive circuit 24. The output side of the AND gate $23_2$ is coupled to one input terminal of each of OR gates $25_2$ and $25_{10}$. The output side of the AND gate $23_4$ is connected to one input terminal of each of OR gates $25_3$, $25_4$ and $25_6$. Furthermore, the output side of the AND gate $23_3$ is connected to one input terminal of each of OR gates $25_5$ and $25_7$. The respective output sides of the OR gates $25_1$ through $25_{10}$ are coupled to the bases of the transistors TR1 through TR10 of the drive circuit 24, respectively. The respective collectors of the transistors TR1 to TR5 are respectively coupled to the terminal 21a of the power source, not shown, and the respective emitters of the transistors TR6 to TR10 are respectively coupled to the collector of a control transistor 10. The emitters of the transistors TR1 to TR5 are connected to the phase coils U to Y of the drive coil assemblage 4 which are star-connected. The base of the control transistor 10 is coupled to the speed control circuit 11 which is in turn coupled to the magnetic sensor 6 to receive a pulse detection signal for speed detection therefrom.

Respective ends of the phase coils U to Y of the drive coil assemblage 4 are coupled to the induced voltage processing circuit 17 which has a plurality of voltage comparators $26_1$ to $26_5$. The inputs of the voltage comparator $26_1$ are connected to the coils V and W, the inputs of the voltage comparator $26_2$ are coupled to the coils W and Y, and the inputs of the voltage comparator $26_3$ are coupled to the coils X and U. Furthermore, the inputs of the voltage comparator $26_4$ are connected to the coils Y and V and the inputs of the voltage comparator $26_5$ are coupled to the coils U and W. Between the inputs of each of the voltage comparators $26_1$ to $26_5$ are provided diodes $32_1$ and $32_2$ which are coupled thereto in parallel in opposite directions so as to make up a limiter. The output of the voltage comparator $26_1$ is coupled to input terminals of AND gates $28_1$ and $28_{10}$ and further to inverting input terminals of AND gates $28_2$ and $28_9$. The output of the voltage comparator $26_2$ is connected to input terminals of AND gates $28_2$ and $28_3$ and further to inverting input terminals of AND gates $28_1$ and $28_4$. The output of the voltage comparator $26_3$ is coupled to input terminals of AND gates $28_4$ and $28_5$ and further to inverting input terminals of AND gates $28_3$ and $28_6$. In addition, the output of the voltage comparator $26_4$ is coupled to input terminals of AND gates $28_6$ and $28_7$ and further to inverting input terminals of AND gates $28_5$ and $28_8$. Still further, the output of the voltage comparator $26_5$ is connected to input terminals of AND gates $28_8$ and $28_9$ and further to inverting input terminals of AND gates $28_7$ and $28_{10}$. The output sides of the AND gates $28_1$ to $28_{10}$ are in turn coupled to the other input terminals of the OR gates $25_1$ through $25_{10}$. A mode terminal 29 is coupled in common to an input terminal of each of the AND gates $28_1$ to $28_{10}$ and further coupled through an inverter 30 in common to an input terminal of each of the AND gates $23_1$ to $23_4$.

A description of operation of the five-phase brushless motor according to the second embodiment of this invention will be made hereinbelow.

At startup the mode terminal 29 is set to the low level "L", and therefore, the AND gates $28_1$ to $28_{10}$ of the induced voltage processing circuit 17 are in the non-operable states, respectively. On the other hand, the AND gates $23_1$ to $23_4$ of the position signal processing circuit 9 are set to the operable state with high level "H" signals being inputted to the input terminals thereof through the inverter 30. On starting, in response to detection of N-pole and S-pole of the rotor magnet 2, as shown in (a) and (b) of FIG. 20A, the Hall generators Ha and Hb generate sine-wave position signals Va and Vb between which the phase difference is 90°. These position signals Va and Vb are amplified and shaped in the operational amplifiers 22a and 22b, respectively, so as to obtain rectangular-wave signals Va' and Vb', as shown in (c) and (d) of FIG. 20A, which are inputted to the AND gates $23_1$ to $23_4$. Thus, when the rectangular-wave signal Va' is in the high level "H" state and the rectangular-wave signal Vb' is in the low level "L" state, an exciting signal shown in (e) of the same drawing is outputted from the AND gate $23_1$. This exciting signal is supplied through the OR gates $25_1$, $25_8$ and $25_9$ to the transistors TR1, TR8 and TR9 so that a drive current Ia passes through the phase coil U in the positive direction and drive currents of Ia/2 flows through phase coils W and X in the negative directions, as shown in (i), (k) and (l) of FIG. 20B. FIG. 21 shows at (A) the states of these drive current flows. Due to shunting of the drive current Ia as shown in (n) of FIG. 20B, a combined torque of 95% of a combined torque on non-shunting is produced with respect to the rotor 1, resulting in start of rotation of the rotor 1.

Subsequently, when both the rectangular-wave signals Va' and Vb' are changed to the high level "H", the AND gate $23_2$ outputs an exciting signal as shown in (f) of FIG. 20A. This exciting signal is supplied through the OR gates $25_2$ and $25_{10}$ to the transistors TR2 and TR10, and therefore, a drive current Ia goes through the phase coil V in the positive direction and a drive current Ia runs through the phase coil Y in the negative direction as shown in (j) and (m) of FIG. 20B. FIG. 21 illustrates at (B) the drive current flow states. Here, a combined torque of 100% is produced for the rotor 1 which is, in turn, rotated further.

Figure 20A:
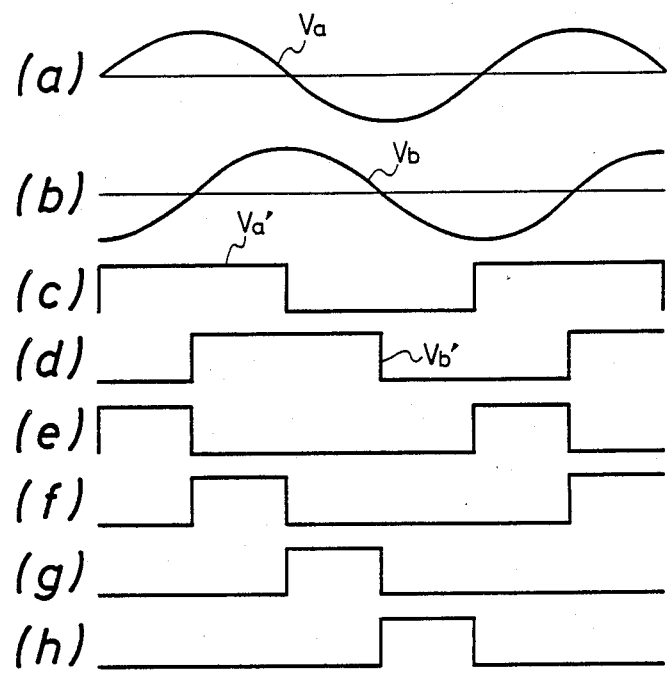
FIGS. 20A and 20B are timing charts for describing operations of the FIG. 18 brushless motor.
Figure 20B:
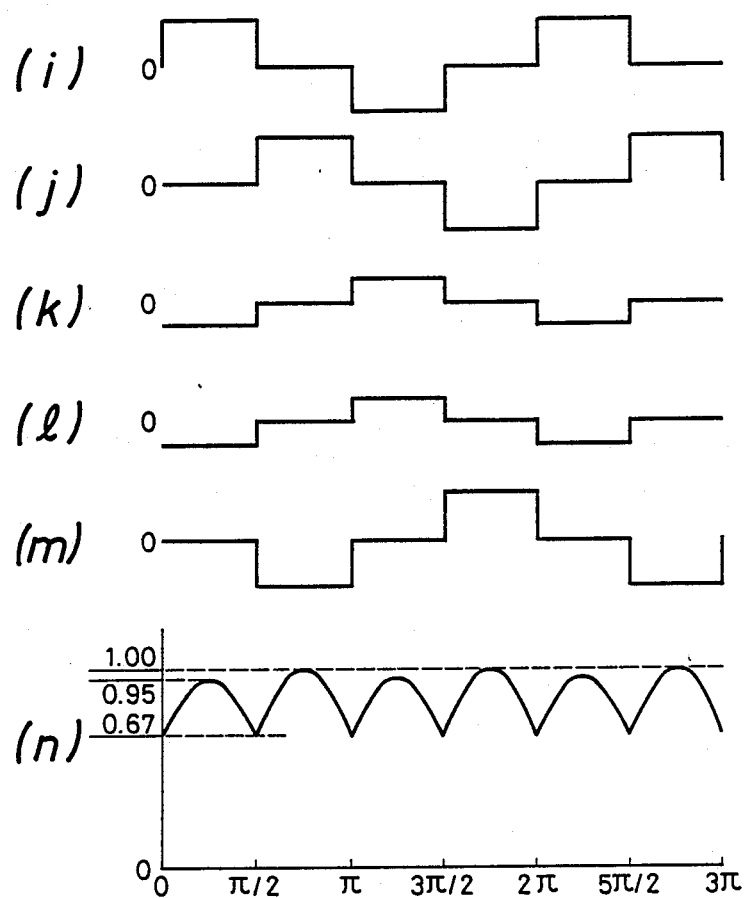
Figure 21:
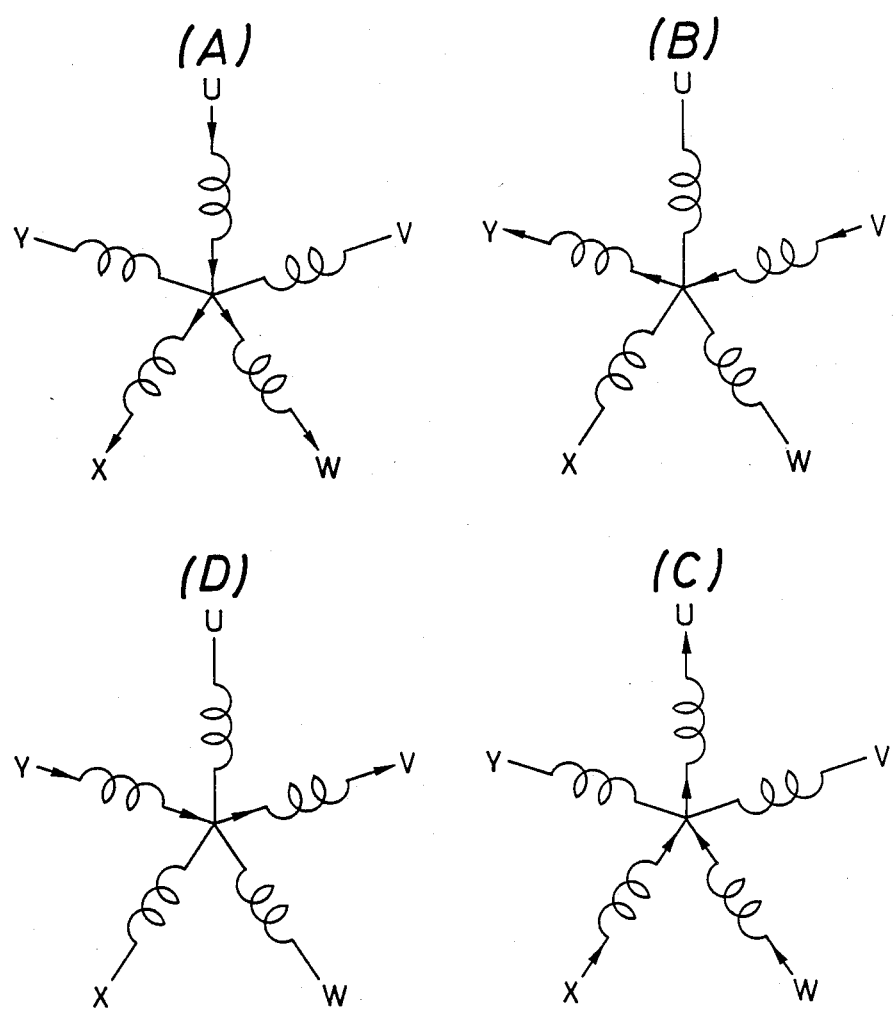
FIG. 21 is a diagram for describing the states of supply of drive currents at startup.

Furthermore, when the rectangular-wave signal Va' is changed to the low level "L" and the rectangular-wave signal Vb' is changed to the high level "H", the AND gate $23_4$ generates an exciting signal as shown in (g) of FIG. 20A. This exciting signal is supplied through the OR gates $25_3$, $25_4$ and $25_6$ to the transistors TR3, TR4 and TR6, whereby drive currents of Ia/2 of the positive directions flow through the phase coils W and X and a drive current Ia of the negative direction passes through the phase coil U as shown in (i), (k) and (l) of FIG. 20B. FIG. 21 shows at (C) the drive current flow states. Thus, a combined torque of 95% is generated in terms of the rotor 1, resulting in continuous rotation of the rotor 1. In addition, in response to both the rectangular-wave signals Va' and Vb' being changed to the low level "L", an exciting signal is outputted from the AND gate $23_3$ as shown in (h) of FIG. 20A and supplied through the OR gates $25_5$ and $25_7$ to the transistors TR5 and TR7. As a result, a positive-direction drive current Ia is supplied to the phase coil Y and a negative-direction drive current Ia is introduced into the phase coil V. FIG. 21 illustrates at (D) the drive current flow states. Thus, a 100% combined torque is generated with respect to the rotor 1 to be rotated as it is.

The above-mentioned operations are similarly repeated so as to continuously rotate the rotor 1. In this case, although the torque ripple of the combined torque increases as well as in the two-phase drive of a two-phase motor, the level of the combined torque sufficiently becomes greater. Therefore, the rotor 1 can be rotated surely regardless of a large load being applied to the output shaft 8 of this brushless motor.

Figure 22A:
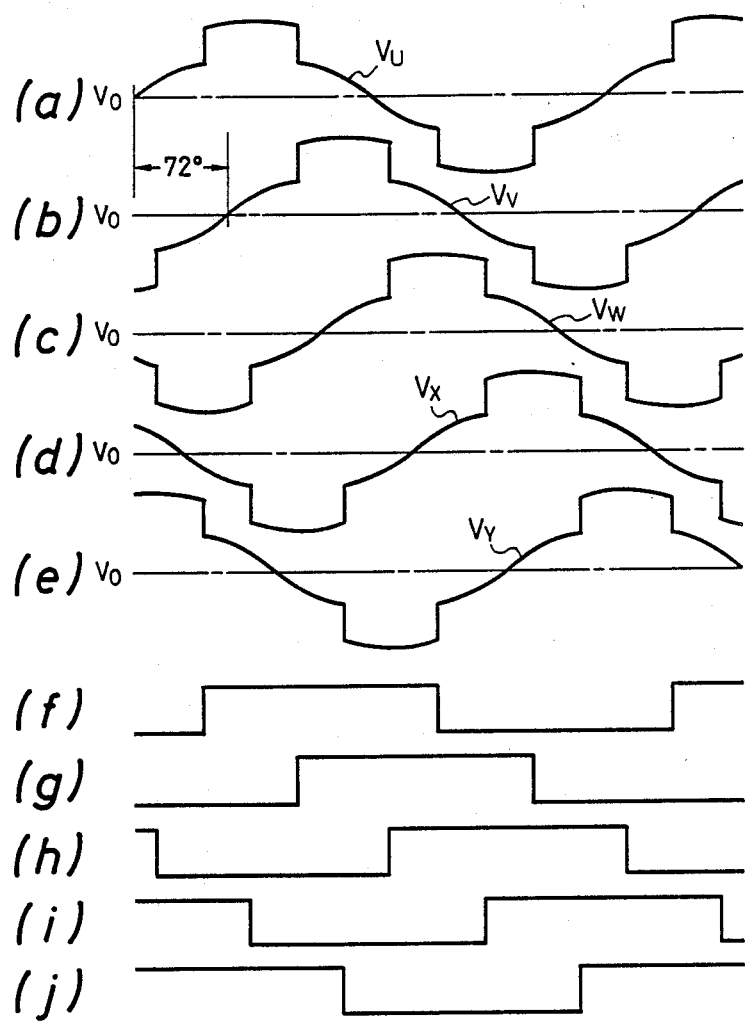
FIGS. 22A, 22B and 22C are illustrations for describing the states of operations of the FIG. 18 brushless motor after starting.

As described above, since the mode terminal 29 is switched to the high level state after startup of the brushless motor, the AND gates $23_1$ to $23_4$ of the position signal processing circuit 9 are respectively placed in the non-operable states and the AND gates $28_1$ to $28_{10}$ of the induced voltage processing circuit 17 are kept in the operable states. Under such operating conditions, as indicated by (a) through (e) of FIG. 22A, inducement voltages Vu to Vy with a phase difference of 72° are produced at the phase coils U to Y. That is, these inducement voltages Vu to Vy have waveforms formed by superimposing falling voltages due to resistance components on counter-electromotive forces of the coils U to Y and are varied with respect to midpoint voltages Vo.

The inducement voltages Vu to Vy are inputted to the voltage comparators $26_1$ to $26_5$, respectively. In response to this, when the inducement voltage Vv is greater than the inducement voltage Vx, as indicated by (f) of FIG. 22A, a high level "H" signal is outputted through diodes $32_1$, $32_2$ from the voltage comparator $26_1$. From the voltage comparator $26_2$ as shown in (g) when Vw is greater than Vy, outputs a "H" signal, and from the voltage comparator $26_3$, as indicated by (h) when Vx is greater than Vu, outputs a "H" signal. Furthermore, as shown in (i), a "H" signal is output from the voltage comparator $26_4$ when Vy is greater than Vv, and, as indicated by (j), a "H" signal is generated from the voltage comparator $26_5$ when Vu is greater than Vw.

Figure 22B:
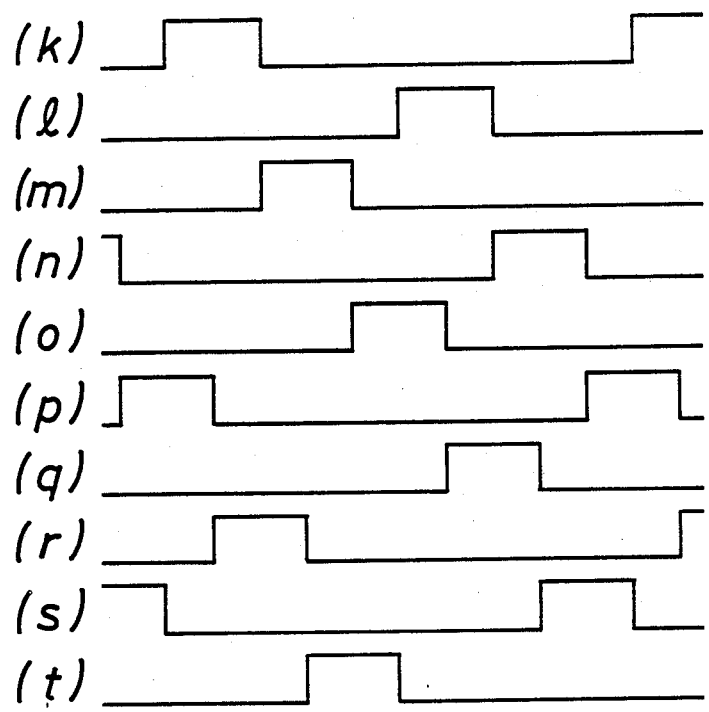

Furthermore, with the voltage comparator $26_1$ being kept to "H" and the voltage comparator $26_2$ being maintained to "L", as shown in (k) of FIG. 22B, an exciting signal is generated from the AND gate $28_1$. Thereafter, with the voltage comparators $26_1$ and $26_2$ being changed to "L" and "H" respectively, as indicated by (l) of FIG. 22B, an exciting signal is output from the AND gate $28_2$. In addition, when the voltage comparator $26_2$ is kept to "H" and the voltage comparator $26_3$ is maintained to "L", the AND gate $28_3$ outputs an exciting signal as shown in (m) of FIG. 22B, and when the voltage comparators $26_2$ and $26_3$ are respectively changed to "L" and "H", the AND gate $28_4$ outputs an exciting signal as indicated by (n) of the same drawing. Similarly, when the voltage comparators $26_3$ and $26_4$ are respectively kept to "H" and "L", the AND gate $28_5$ generates an exciting signal as indicated by (o). In response to the voltage comparators $26_3$ and $26_4$ being respectively changed to "L" and "H", an exciting signal is outputted from the AND gate $28_6$ as shown in (p). Furthermore, when the voltage comparators $26_4$ and $26_5$ are respectively kept to "H" and "L", an exciting signal is generated from the AND gate $28_7$ as indicated by (q), and with the voltage comparators $26_4$ and $26_5$ being respectively changed to "L" and "H", an exciting signal is output from the AND gate $28_8$ as shown in (r). Furthermore, when the voltage comparators $26_5$ and $26_3$ are in "H" and "L" respectively, the AND gate $28_9$ outputs an exciting signal as indicated by (s), and when the voltage comparators $26_5$ and $26_1$ are in "L" and "H", the AND gate $28_{10}$ generates an exciting signal as shown in (t).

Figure 22C:
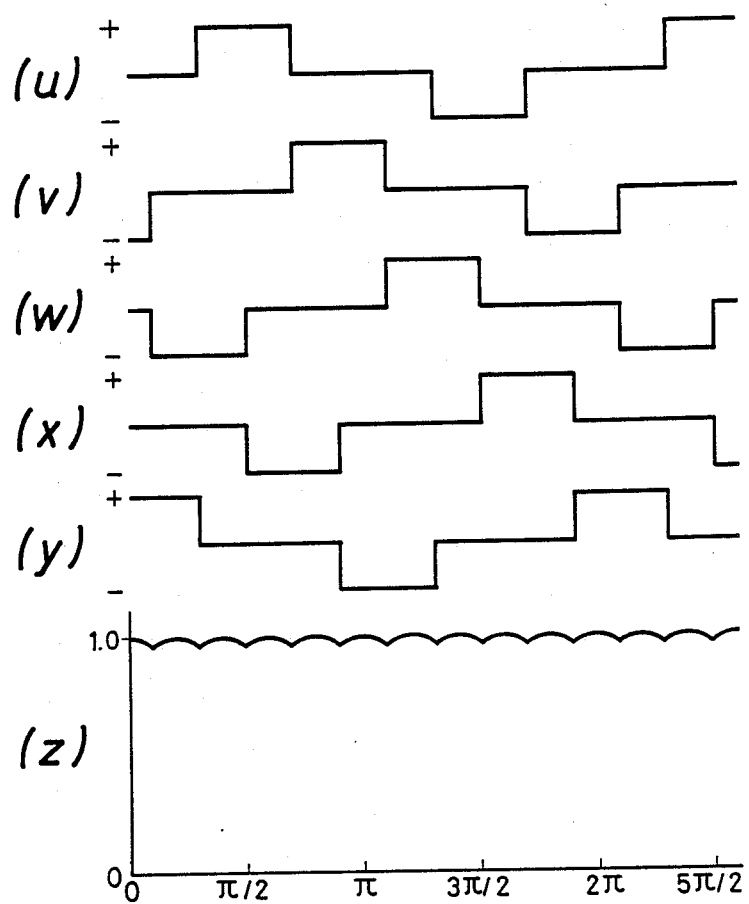

In response to exciting signals being output from the AND gates $28_1$ and $28_8$ (see (k) and (r) of FIG. 22B), the transistors TR1 and TR9 are turned on so that, as shown in (u) and (x) of FIG. 22C, a positive-direction drive current Ia flows through the coil U and a negative-direction drive current Ia passes through the coil X. Therefore, as shown in (z) of FIG. 22C, a torque with a small torque ripple is generated with respect to the rotor 1 which further rotates.

When an exciting signal is outputted from the AND gate $28_3$ during generation of an exciting signal from the AND gate $28_8$ (see (m) of FIG. 22B), the transistors TR9 and TR2 are turned on so that, as shown in (v) and (x), a positive-direction drive current Ia is introduced into the coil V and a negative-direction drive coil Ia is supplied to the coil X. This similarly results in generation of a torque with a small torque ripple with respect to the rotor 1. Furthermore, when an exciting signal is outputted from the AND gate $28_{10}$ as shown in (t) while an exciting signal is generated from the AND gate $28_3$, the transistors TR2 and TR10 are turned on so that, as indicated by (v) and (y), a positive-direction drive current Ia flows through the coil V and a negative-direction drive current, Ia passes through the coil Y so as to similarly result in generation of a torque for the rotor 1. When an exciting signal is outputted as sown in (o) from the AND gate $28_5$ while an exciting signal is outputted from the AND gate $28_{10}$, the transistors TR10 and TR3 are turned on so that, as indicated by (w) and (y), a positive-direction drive current ia introduced into the coil W and a negative-direction drive current is supplied to the coil Y, causing generation of a torque.

When an exciting signal is generated as shown in (l) from AND gate $28_2$ with the AND gate $28_5$ generating an exciting signal, the transistors TR3 and TR6 are turned on so that, as shown in (w) and (u), a positive-direction drive current Ia flows through the coil W and a negative-direction drive current passes through the coil U. Furthermore, an exciting signal is output as shown in (q) from the AND gate $28_7$ with the AND gate $28_2$ outputting an exciting signal, the transistors TR6 and TR4 assume the ON-states and therefore, as shown in (x) and (u), a positive-direction drive current Ia flows through the coil X and a negative-direction drive current passes through the coil U so as to generate a torque. Still further, an exciting signal is output as shown in (n) from the AND gate $28_4$ with the AND gate $28_7$ outputting an exciting signal, the transistors TR4 and TR7 assume the ON-states, and therefore, as shown in (x) and (v), a positive-direction drive current ia is introduced into the coil X and a negative-direction drive current is supplied to the coil V, thus resulting in generation of a torque with respect to the rotor 1.

In addition, when an exciting signal is generated as shown in (s) from the AND gate $28_9$ with the AND gate $28_4$ outputting an exciting signal, the transistors TR7 and TR5 are turned on so that, as shown in (y) and (v), a positive-direction drive current flows through the coil Y and a negative-direction drive current passes through the coil V, thus resulting in generation of a torque. Furthermore, when the AND gate $28_6$ outputs an exciting signal as indicated by (p) with the AND gate $28_9$ generating an exciting signal, the transistors TR5 and TR8 assume the ON-states and therefore, as shown in (y) and (w), a positive-direction drive current Ia flows through the coil Y and a negative-direction drive current Ia flows through the coil W.

In this second embodiment, the switching between "L" and "H" of the mode terminal 29 may be effected as well as in the above-mentioned first embodiment. It is also appropriate that the mode selection is performed by comparing the inducement voltages of the drive coil assemblage 4 with reference voltages at the timing according to the outputs of the Hall generators Ha and Hb or is effected on the basis of the periods of the inducement voltages. Although in the above-mentioned second embodiment the rotor 1 is driven with an angle of 72°, is also appropriate to set the angle to 144°.

Descriptions of various ways of supply of drive currents to the coils of five-phase, three-phase and seven-phase brushless motors on the basis of the position signals will be omitted because of being similar to those described with reference to FIGS. 14 to 17 in the above-mentioned first embodiment.

Figure 1:
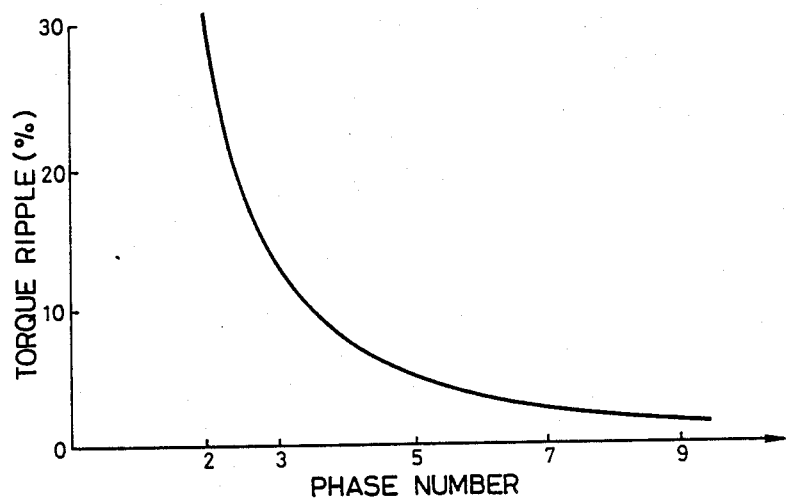
FIG. 1 is an illustration for describing the relation between torque ripple and phase number of a multi-phase brushless motor.
Figure 2:
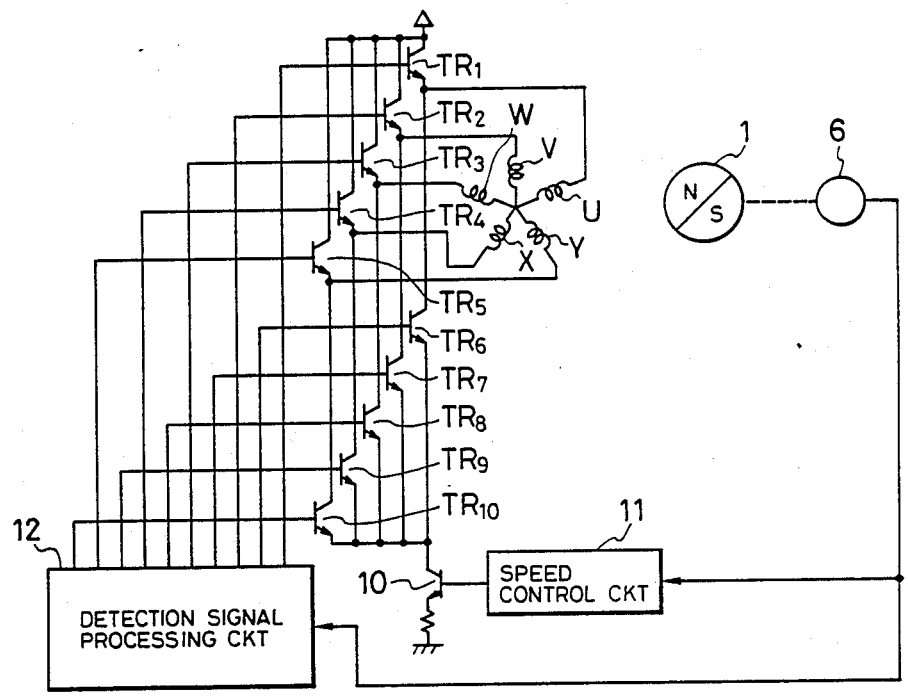
FIG. 2 is a circuit diagram showing a prior art brushless motor of the type of supplying drive currents to drive coils on the basis of FG signals.
Figure 23:
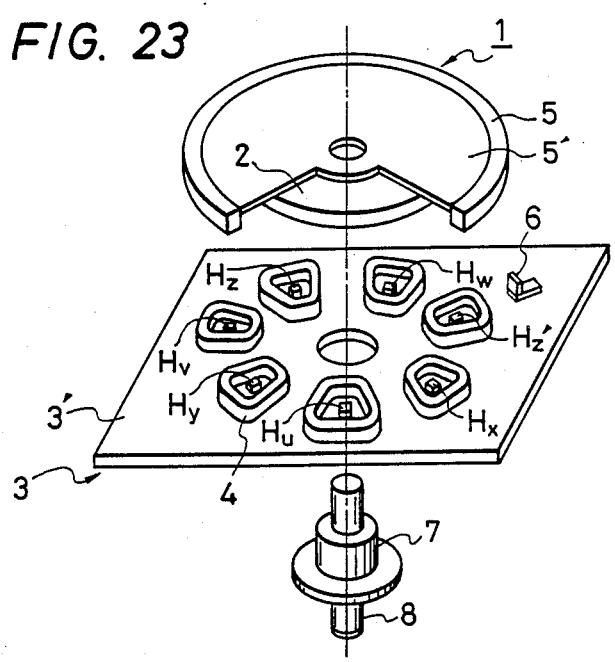
FIGS. 23 and 24 show a basic arrangement of a third embodiment of a multi-phase brushless motor according to the present invention.
Figure 24:
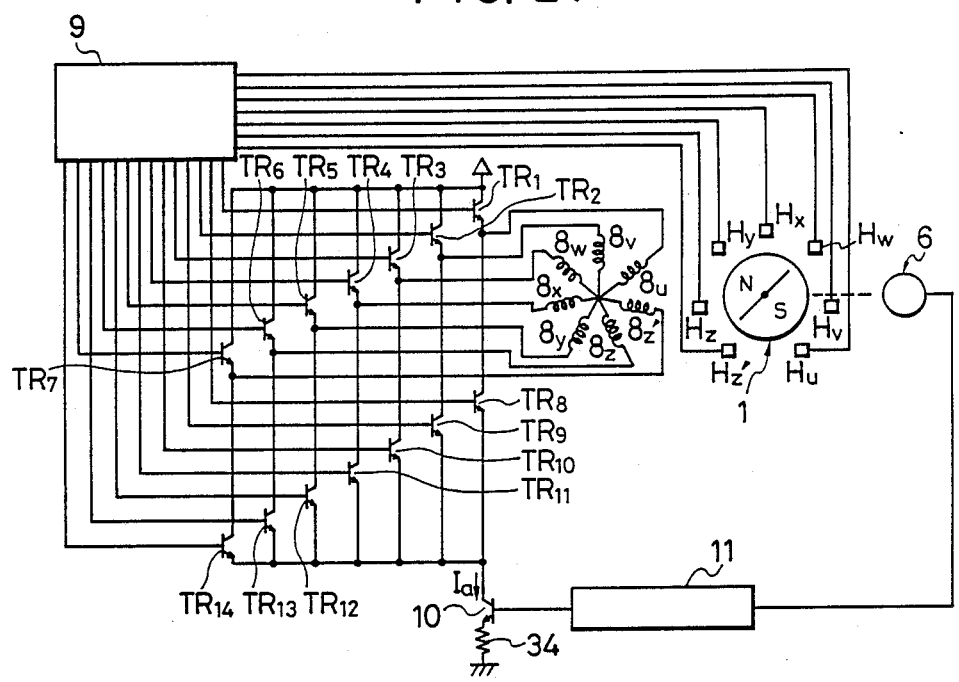
Figure 25A:
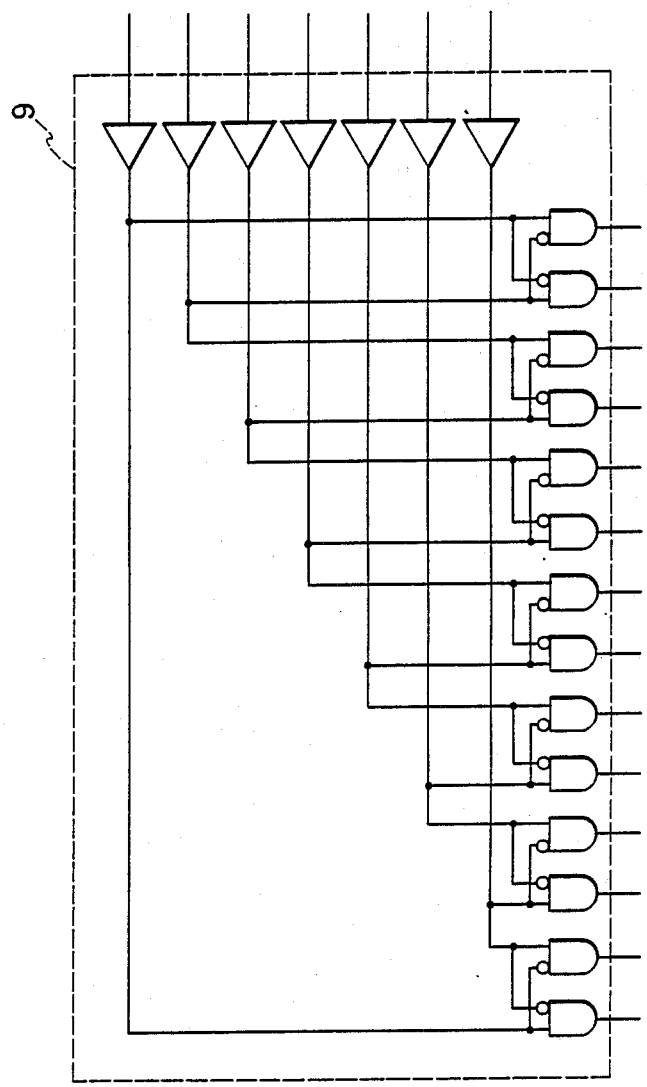
FIGS. 25A, 25B and 25C are illustrations of examples of a position signal processing circuit of FIG. 24 motor.
Figure 25B:
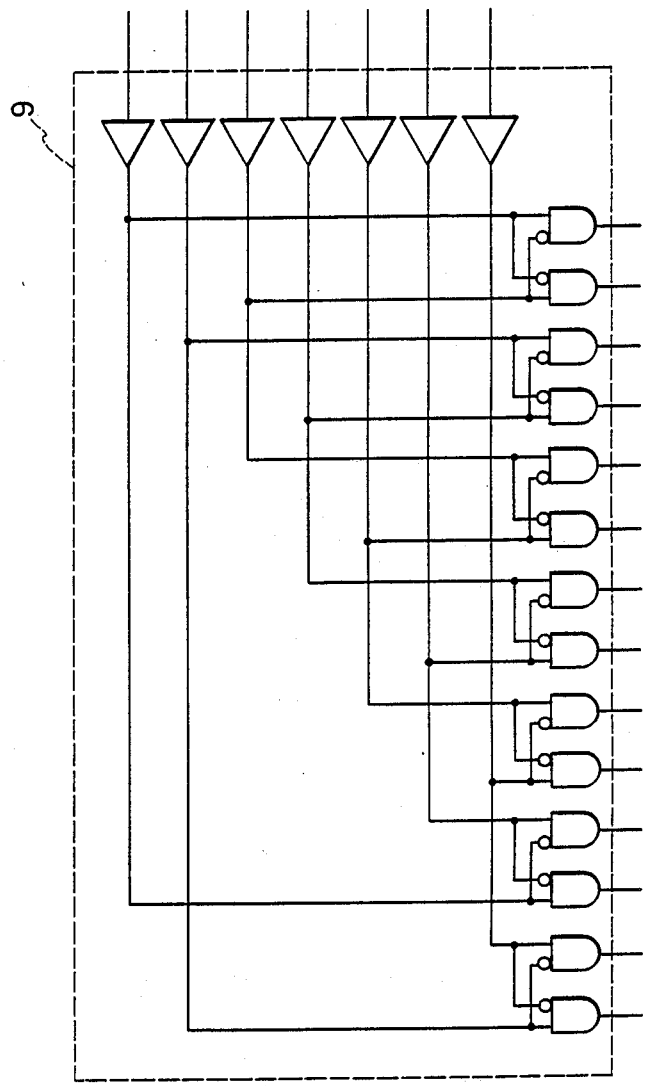
Figure 25C:
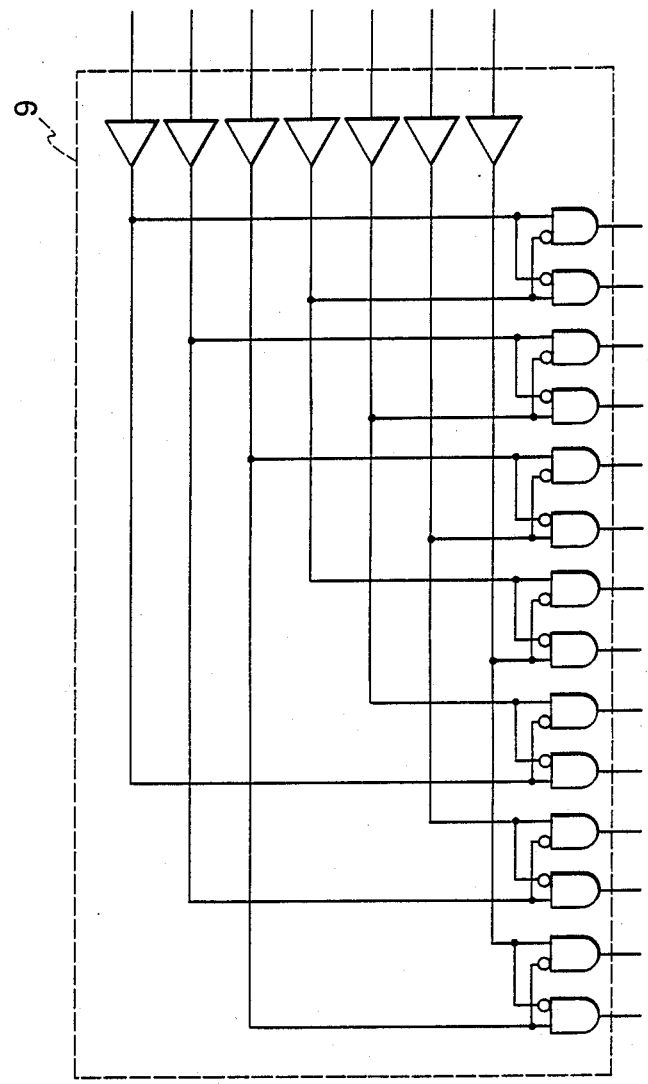

FIGS. 23 and 24 show a third embodiment of a seven-phase brushless motor according to the present invention, FIG. 23 showing an arrangement of the seven-phase brushless motor and FIG. 24 showing a drive circuit thereof. In FIG. 23, the brushless motor includes a rotor 1 constructed to be similar to that of the above-mentioned first embodiment and a stator 3 having, on one surface of a magnetic base 7' drive coil assembly 4 comprising seven drive coils (phase coils) 4u to 4z' which are star-connected and which are positioned in opposed relation to a rotor magnet 2 when assembling with a bearing 7 and an output shaft 8. The seven drive coils 4 are arranged at the pitch of 102.8° in terms of the mechanical angle and 411.4° (51.4°+360°) in terms of the electrical angle. At center portions of the seven drive coils 4 are respectively provided seven Hall generators Hu to Hz' for position detection which are arranged to have the pitch of an electrical angle of 51.4° to be equivalent to each other. On the magnetic base 3' is provided a FG sensor 6 which is positioned to become in opposed relation to the rotor magnet 2. In FIG. 2, the output terminals of the position detection Hall generators Hu to Hz' are coupled to the input side of a position signal processing circuit 9, the Hall generators Hu to Hz' detecting the poles of the rotor magnet 2 to generate position signals which is supplied to the position signal processing circuit 9, which may be constructed as shown in FIGS. 25A to 25C. The output side of the position signal processing circuit 9 is coupled to the bases of fourteen transistors TR1 to TR14 which make up a drive circuit. Of these transistors, the collectors of the transistors TR1 to TR7 are connected to a power source, not shown, and the emitters thereof are respectively connected to the collectors of the other transistors TR8 to TR14 and further to one end of the drive coils 4u to 4z'. Furthermore, the emitters of the transistors TR8 to TR14 are connected in common to the collector of a control transistor 10 and the emitter of this control transistor 10 is grounded through a resistor 34. These transistors TR1 to TR14 are ON/OFF-operated under control of the position signal processing circuit 9 to successively supply drive currents to the drive coils 4u to 4z'.

The base of the control transistor 10 is coupled to a speed control circuit 11, the input side of which is coupled to the output terminal of the FG sensor 6 which is adapted to output a detection pulse signal whose period is proportional to the rotational speed of the rotor 1. The speed control circuit 11 supplies a control current to the base of the control transistor 10 on the basis of the rotational speed of the rotor 1 so as to control drive currents Ia flowing through the drive coils 4u to 4z'.

Figure 26A:
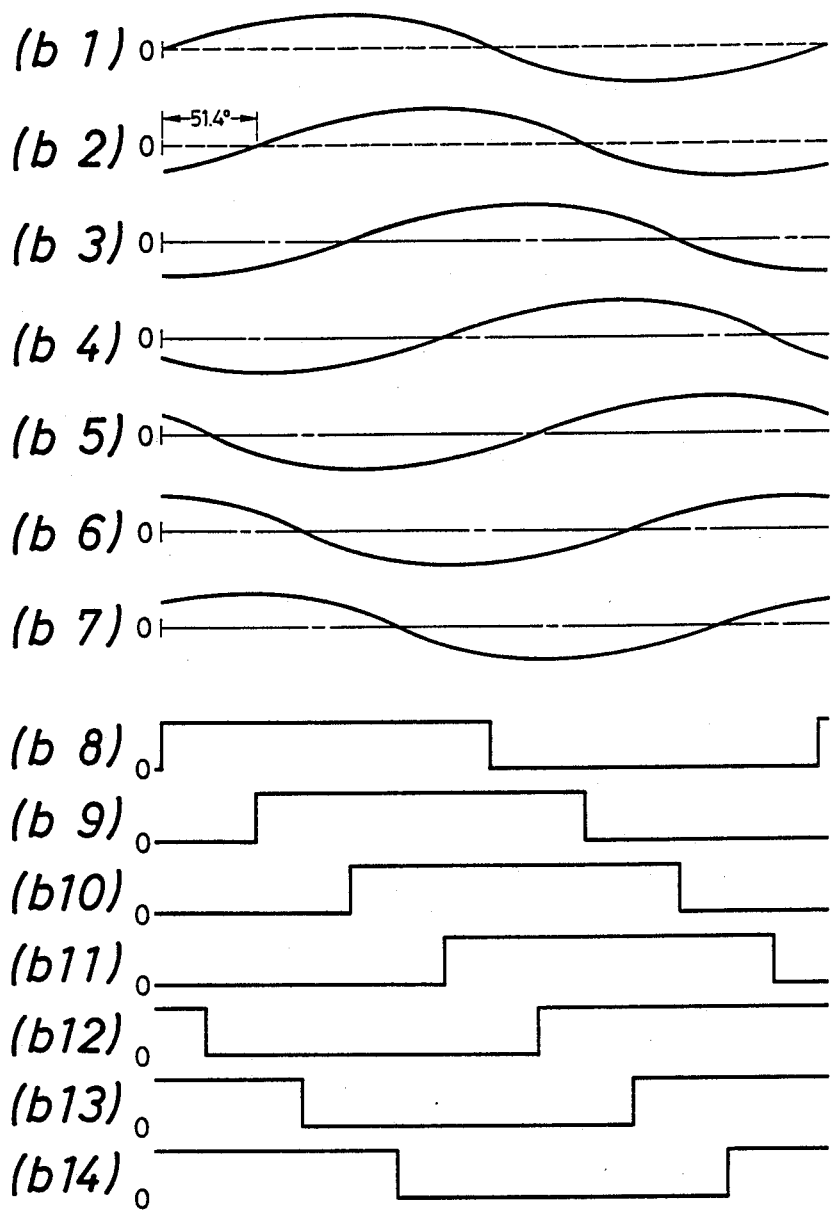
FIGS. 26A, 26B and 26C are illustrations of waveforms for describing the operation of the FIG. 24 motor on the basis of position signals from the position signal processing circuit.
Figure 26B:
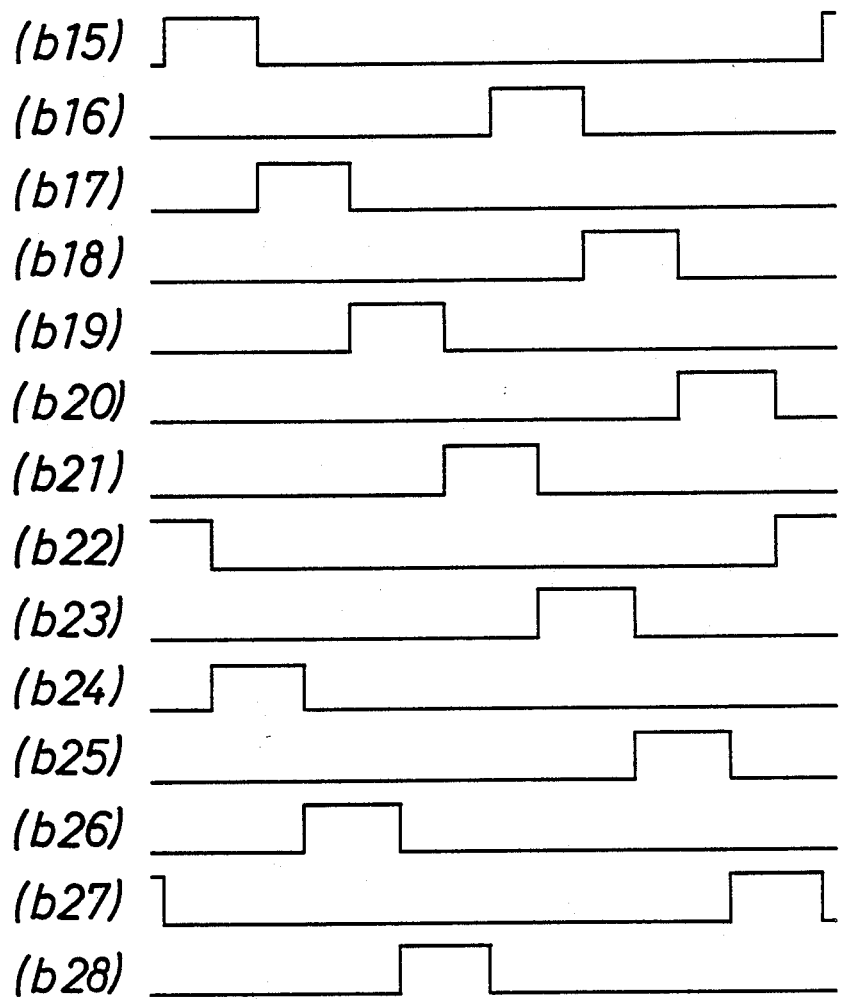
Figure 26C:
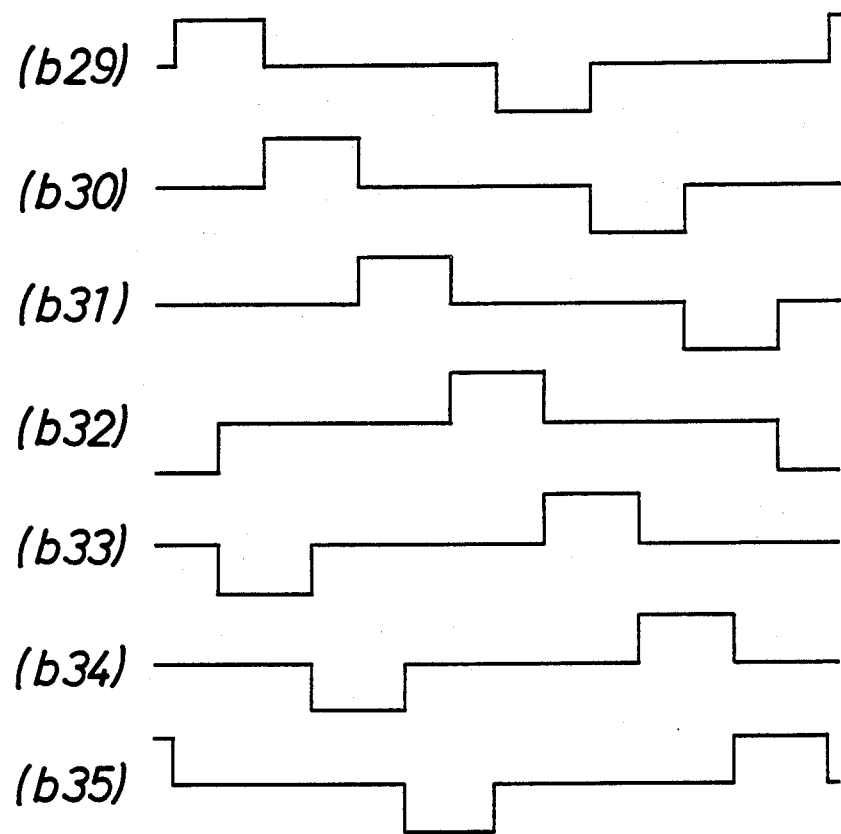

In the seven-phase brushless motor thus arranged, in response to rotation of the rotor 1, the Hall generators Hu to Hz' generate position signals, as indicated by (b1) to (b7) of FIG. 26A, whose phase difference is 72°. These position signals therefrom are supplied to the position signal processing circuit 9 so as to be amplified and shaped by means of operational amplifiers or the like (see FIGS. 25A to 25C) to obtain rectangular-wave signals as indicated by (b8) to b14) of FIG. 26A. The obtained rectangular-wave signals are processed by logic circuits to obtain exciting signals, as indicated by (b15) to (b28) of FIG. 26B, which are in turn supplied to the transistors TR1 to TR14. By the exciting signals, stepwise drive currents as shown in (b29) to (b35) of FIG. 26C are supplied to the drive coils 4u to 4z' to cause rotation of the rotor 1.

Magnetization of Rotor Magnet (Example 1)

Figure 27:
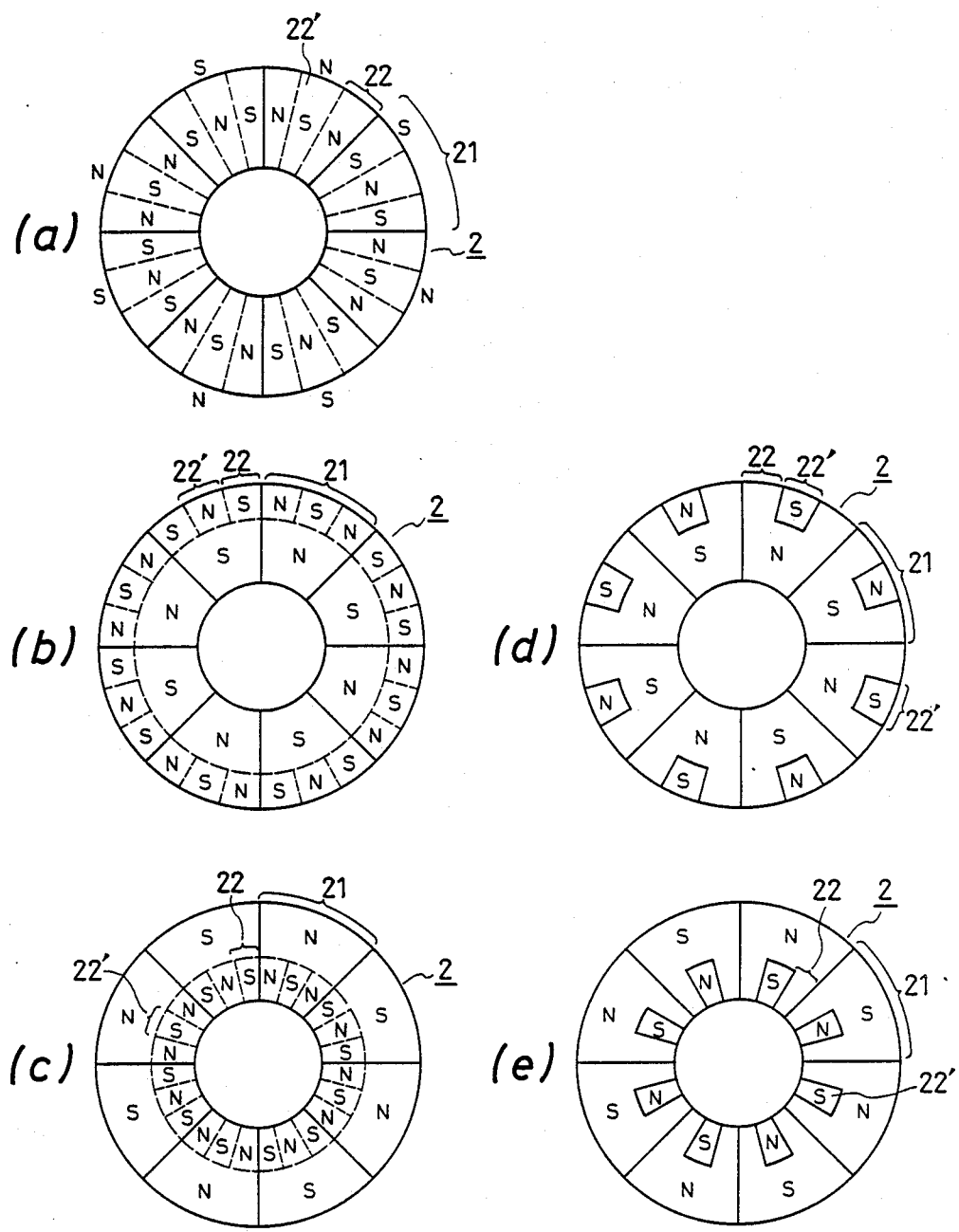
FIG. 27 shows examples of magnetization of a rotor magnet of the FIG. 23 motor.

FIG. 27 shows examples of magnetization of the rotor magnet 2. In the case of (a) of FIG. 27, the rotor magnet 2 is magnetized successively in the circumferential direction so as to have eight sectoral main regions 21 each of which is divided into three sub-regions 22. The main regions 21 are disposed so as to alternately arrange N-poles and S-poles. In each of the main regions 21, one of the sub-regions 22 which is centered is a demagnetization region 22' having a polarity reverse to the entire polarity of the main region 21. That is, taking into account only the main regions, the rotor magnet 2 is arranged to have eight poles and, taking into account the sub-regions 22, it results in having 24 poles which is three times as compared with the main regions. In the cases of rotor magnets 2 shown in (b) and (c) of FIG. 27, similarly, each has 8 main regions each of which is divided into 3 sub-regions the centered one of which is a demagnetization region 22'. Such rotor magnets 2 are arranged as so-called double magnetization. Furthermore, in the cases of rotor magnets 2 shown in (d) and (e) of the same drawing, although each similarly has 8 main regions 21, the demagnetization region 22' is disposed at a center portion of each of the main regions 21.

In the above-mentioned brushless motor, rotation of the rotor magnet 2 cause the magnetic flux to interlink the drive coils 4u to 4z' so as to contain the three-order (third) harmonic t3 of 10 to 20% with respect to the basic (fundamental) wave T as shown in (a) of FIG. 28, the interlinkage being made between the poles of the rotor magnet 2 and the corresponding drive coils and the phase of the harmonic being equal to that of the basic wave T. A combination waveform To of the three-order harmonic t3 and the basic wave T is shown in (b) of FIG. 28. Here, the inclusion rate of the three-order harmonic t3 is defined as follows when the amplitude of the basic wave T is A1 and the amplitude of the three-order harmonic t3 is A3.

inclusion rate=(A3/A1)·100 (%)

Figure 29:
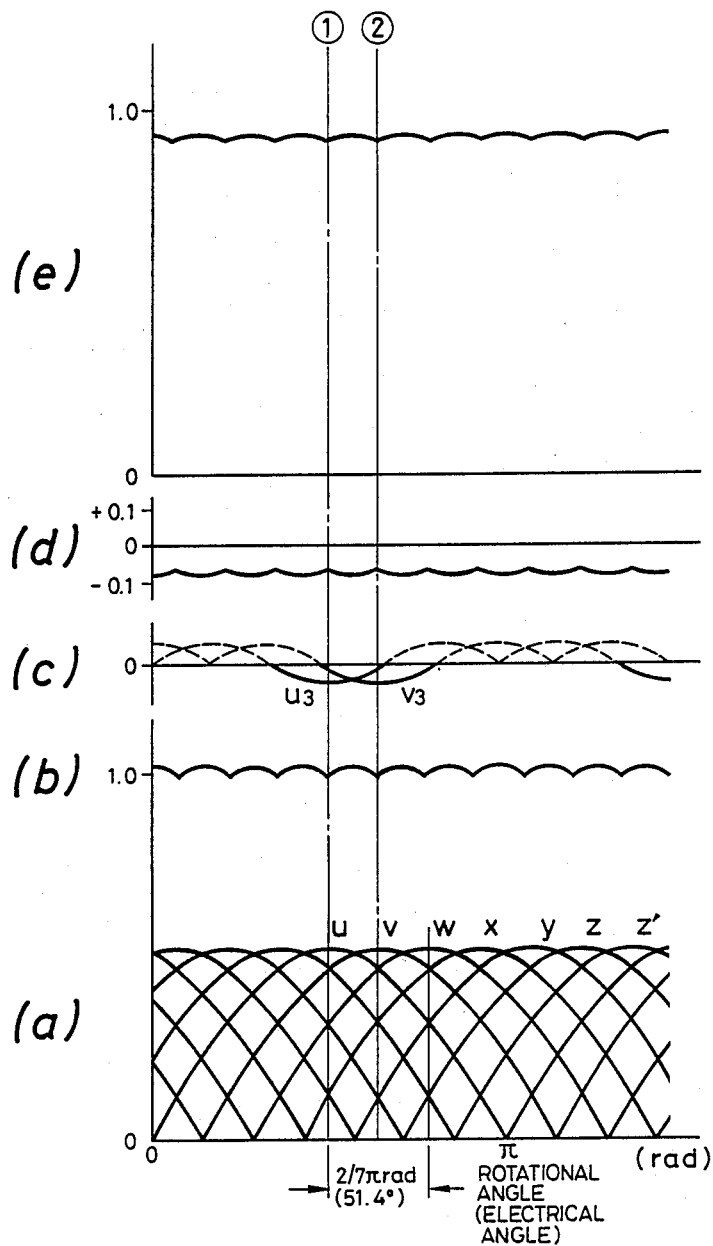
FIG. 29 is a graphic illustration of torque waveforms generated with respect to the FIG. 23 motor.

A description of the principle that such harmonic reduces the torque ripple will be made hereinbelow with reference to FIG. 29 showing torque waveforms generated with respect to the brushless motor. In FIG. 29, (a) shows components of the torque waveforms due to the basic waves in the respective phases u to z' of this motor and the basic-wave components of a combined torque of the respective phase torques has a period of $\pi/7$ radian (51.4°) as shown in (b). Here, in a region between 1-2, the u-phase and v-phase cause generation of torques and at this time the components of u and v phase torques due to the three-order harmonics are obtained as shown in (c) of FIG. 29, (d) showing a combined torque of the phase torques. It will be understood by comparison between (b) and (d) that the basic wave component and the three-order harmonic component of the combined torque waveforms are coincident in repeating period with each other and are reverse in polarity to each other and therefore a combination thereof results in cancelling ripple components each other. On the other hand, an excessive inclusion rate of the three-order harmonic increases the torque ripple.

Figure 30:
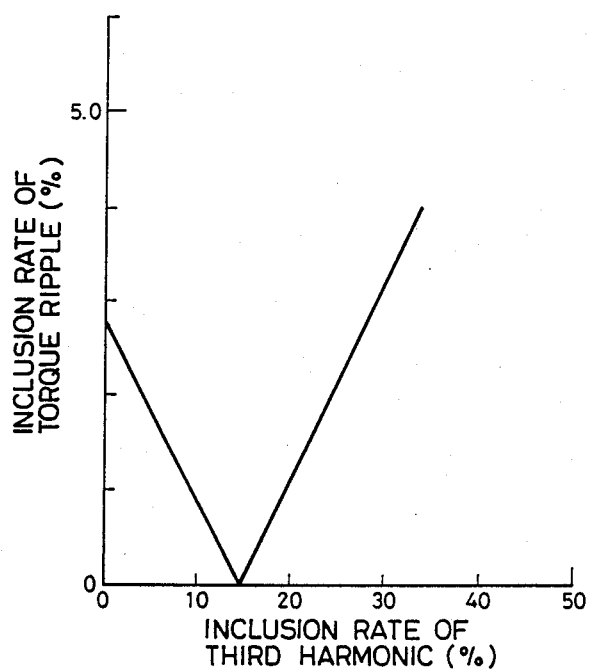
FIG. 30 is a graphic diagram showing the relation between the inclusion rate of torque ripple and the inclusion rate of the third harmonic in the magnetic flux interlinking the drive coils.
Figure 31F:
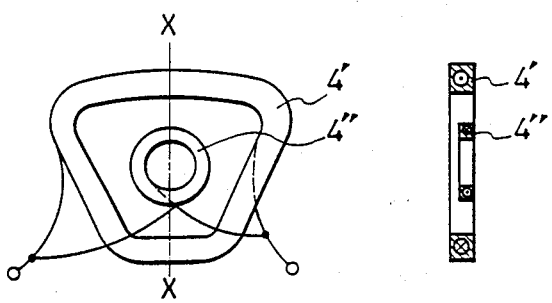
FIG. 31 shows examples of each drive coil for inclusion of the harmonic wave.
Figure 31G:
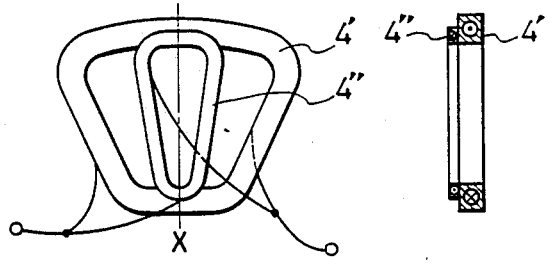
Figure 31H:
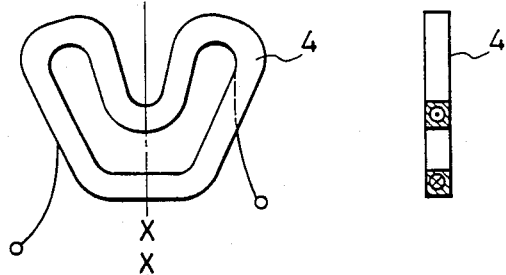
Figure 31I:
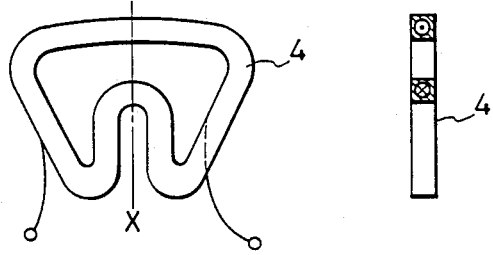

FIG. 30 is an illustration of the relation between the inclusion rate of three-order harmonics and the torque ripple found by an experiment. In the case that an electrical angle between exciting currents to be supplied to drive coils is 51.4°, when the inclusion rate of the three-order harmonic whose phase is equal to that of the basic wave is set to about 10 to 20%, the torque ripple is decreased to about half as compared with the prior cases. Here, although in the above description the demagnetization regions are provided with respect to the rotor magnet in order to substantially include the three-order harmonics in the magnetic flux interlinking each the drive coil 4, it is also appropriate that, as shown in (f) and (g) of FIG. 31, each of the drive coils is arranged to have a principal coil 4' and an auxiliary coil 4", or as shown in (h) and (i) it is partially concaved or recessed. FIG. 31 shows the plan view and cross-sectional view (taken along X—X) of each of the drive coils.

Magnetization of Rotor Magnet (Example 2)

Figure 32:
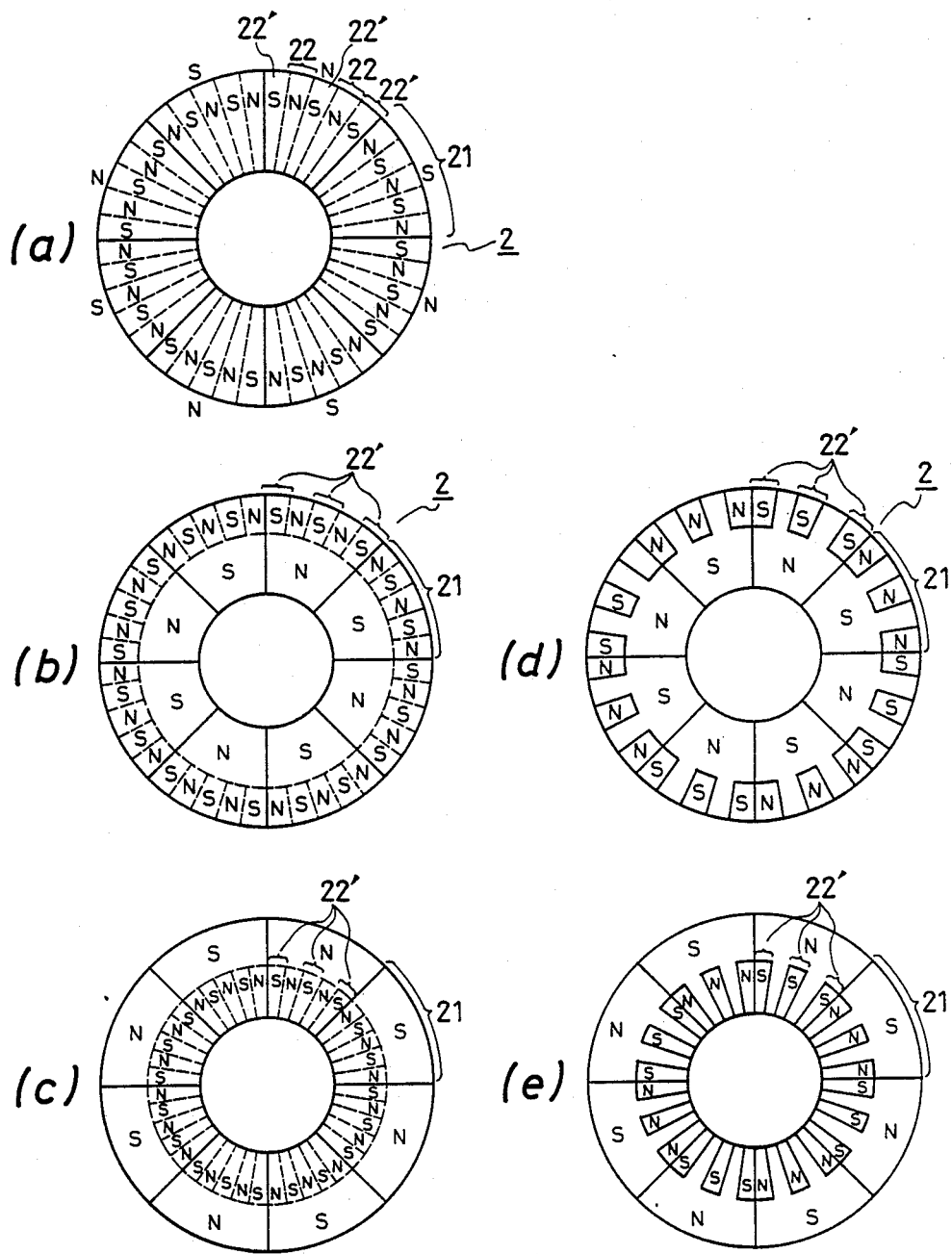
FIG. 32 shows other examples of magnetization of the rotor magnet.

FIG. 32 shows further examples of the magnetization of the rotor magnet 2. In (a) of FIG. 32, the rotor magnet 2 is magnetized to have 8 sectoral main regions 21 in the circumferential direction to alternately arrange the N-poles and S-poles and each of the 8 main regions 21 is divided into 5 sub-regions 22. Three of the sub-regions 22 of each of the main regions 21 are demagnetization regions 22', the polarities of which are reverse to the entire polarity of the main region 21. Taking into account only the main regions 21, the rotor magnet 2 is of the 8-pole type, and taking into account the sub-regions 22, the number of poles of the rotor magnet 2 becomes 40 which is five times the number of the main regions 21.

In the cases of (b) and (c), each of the rotor magnets is double-magnetized so as to have 8 main regions 21 each of which is divided into 5 sub-regions 22, three of the 5 sub-regions being demagnetization regions 22'. Furthermore, in the cases of (d) and (e), each of the rotor magnets 2 is arranged so as to have three demagnetization regions 22' at portions of each of 8 main regions 21.

With this arrangement, the rotation of the rotor magnet 2 causes the magnetic flux to interlink the drive coils 4u to 4z' so as to include a five-order, or fifth, harmonic t5 of about 5 to 15% with respect to the basic wave T as shown in (a) of FIG. 33, the phase of the five-order harmonics being reverse to that of the basic wave T. (b) of the same drawing shows a conbined waveform To thereof. The inclusion rate of the five-order harmonic is defined as $(A5/A1) \cdot 100$ (%) where A1 represents the amplitude of the basic wave T and A5 designates the amplitude of the five-order harmonic.

Figure 34:
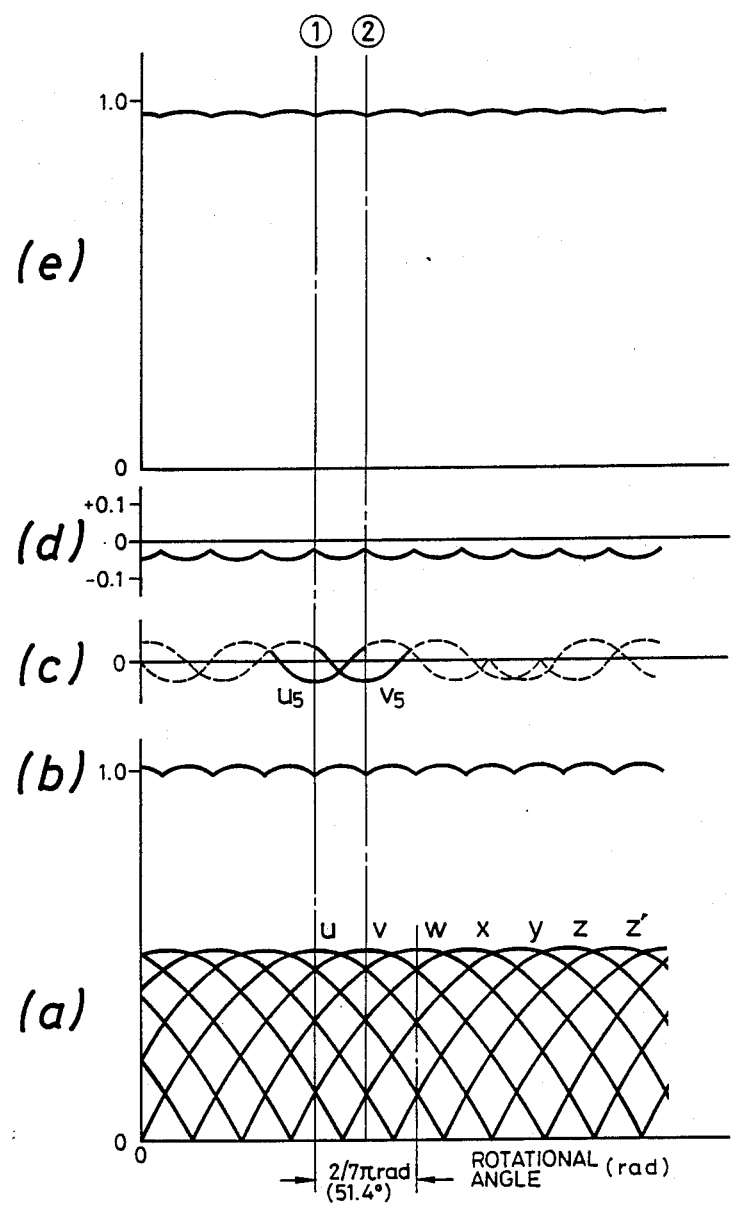
FIG. 34 is a graphic illustration of torque waveforms.

The principle that the harmonics decrease the torque ripple is as follows. In FIG. 34, (a) shows components of the torque waveforms due to the basic waves in the respective phases u to z' and the basic-wave components of a combined torque of the respective phase torques has a period of $\pi/7$ radian (51.4°) as indicated by (b). Here, in a region between 1 and 2, the u-phase and v-phase cause generation of torques and at this time the components of the generated torques due to the five-order harmonics are obtained as shown in (c) of FIG. 34, (d) showing a combined torque thereof. It will be understood by comparison between (b) and (d) that the basic wave component and the five-order harmonic component of the combined torque waveforms are coincident in repeating period with each other and are reverse in polarity to each other and therefore combination thereof results in cancelling the ripple components of each other. On the other hand, an excessive inclusion rate of the five-order harmonic increases the torque ripple.

Figure 35:
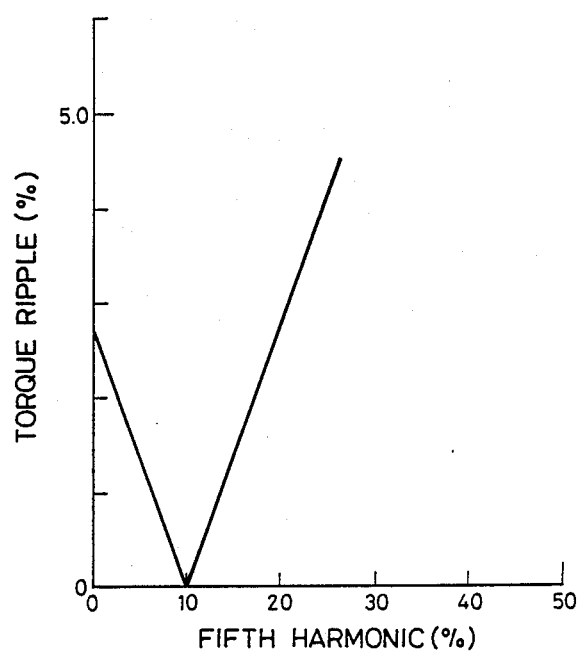
FIG. 35 is a graphic diagram showing the relation between the torque ripple and the fifth harmonic.
Figure 36F:
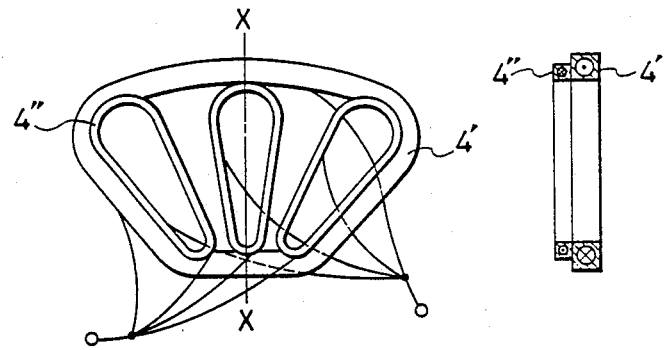
FIG. 36 shows examples of each drive coil for inclusion of the harmonic.
Figure 36G:
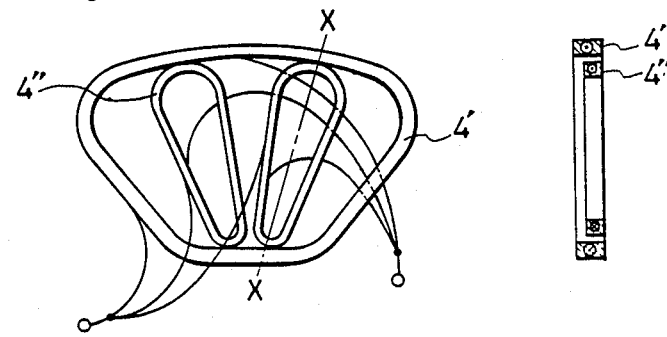
Figure 36H:
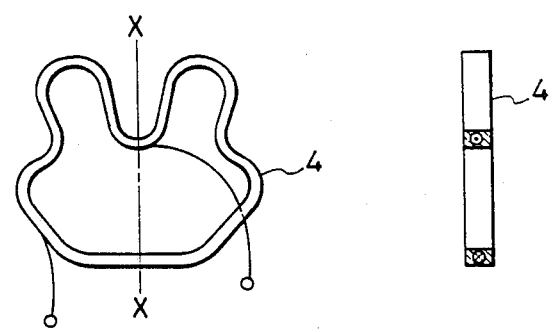

FIG. 35 is an illustration of the relation between the the inclusion rate of five-order harmonic and the torque ripple found by an experiment. In the case that an electrical angle between exciting currents to be supplied to drive coils is 51.4°, when the inclusion rate of the five-order harmonic whose phase is reverse to that of the basic wave is set to about 5 to 15%, the torque ripple is decreased to about half as compared with the prior cases. Here, although in the above description the demagnetization regions 22' are provided with respect to the rotor magnet 2 in order to substantially include the five-order harmonics in the magnetic flux interlinking the drive coils 4u to 4z', it is also appropriate that, as shown in (f) and (g) of FIG. 36, each of the drive coils 4 is arranged to have a principal coil 4' and auxiliary coils 4", or as shown in (h) it is arranged so as to have concaved or recessed portions. FIG. 36 shows the plan view and cross-sectional view (taken along X—X) of each, of the drive coils.

Magnetization of Rotor Magnet (Example 3)

Figure 37:
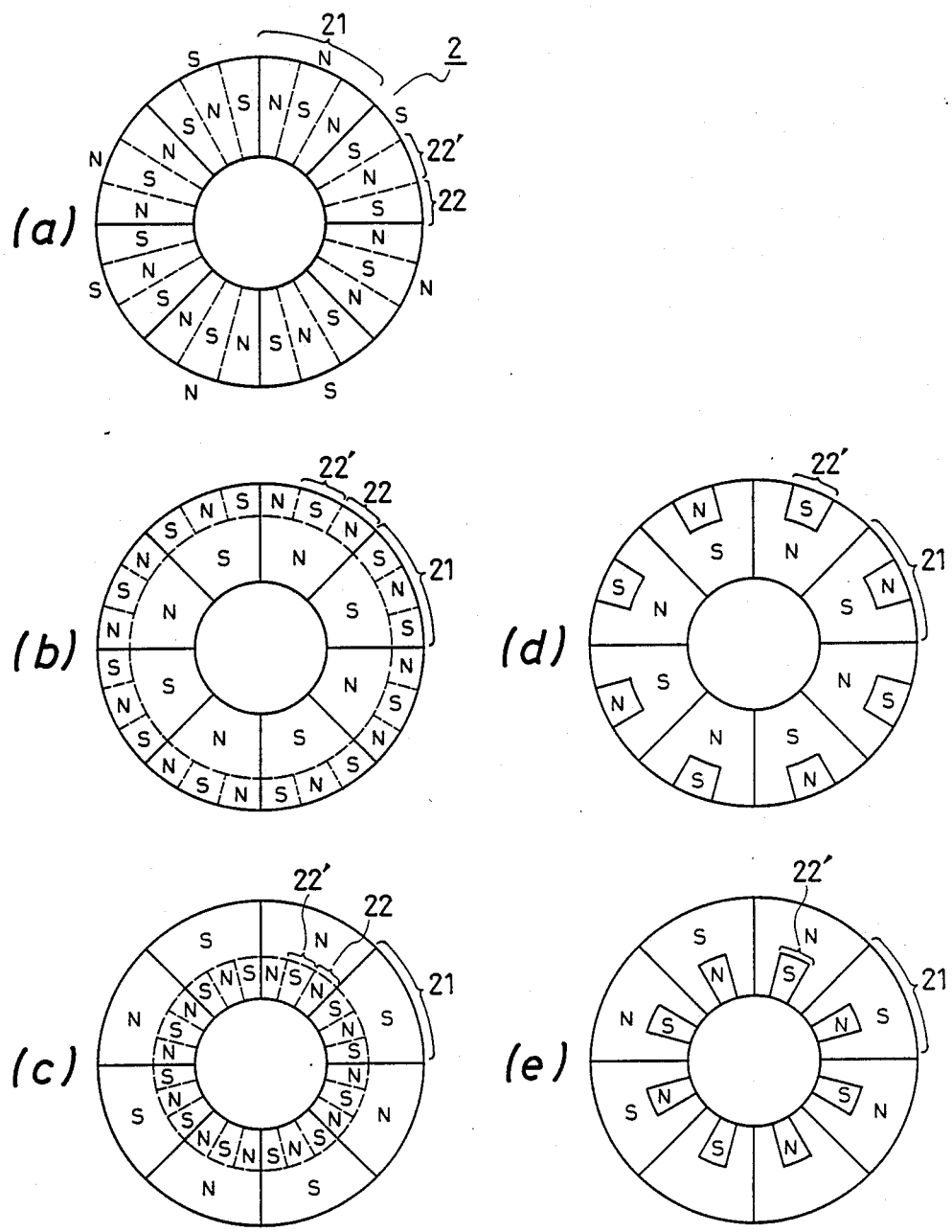
FIG. 37 shows further examples of magnetization of the rotor magnet.

FIG. 37 shows further examples of the magnetization of the rotor magnet 2. In the case of (a) of FIG. 37, the rotor magnet 2 is magnetized successively in the circumferential direction so as to have eight sectoral main regions 21 each of which is divided into three sub-regions 22. The main regions 21 are disposed so as to alternately arrange N-poles and S-poles. In each of the main regions 21, one of the sub-regions 22 which is centered is a demagnetization region 22' having a polarity reverse to the entire polarity of the main region 21. That is, taking into account only the main regions, the rotor magnet 2 is arranged to have eight poles and, taking into account the sub-regions 22, it results in having 24 poles which is three times as many as compared with the main regions. In the cases of rotor magnets 2 shown in (b) and (c) of FIG. 37, similarly, each has 8 main regions each of which is divided into 3 sub-regions 22 and two or three demagnetization regions 22' are provided therein by means of the so-called double magnetization technique. Furthermore, in the cases of the rotor magnets 2 shown in (d) and (e) of the same drawing, although each similarly has 8 main regions 21, the demagnetization region 22' is disposed at a center portion of each of the main regions 21.

With this arrangement, rotation of the rotor magnet 2 cause magnetic flux to interlink the drive coils 4u to 4z' so as to contain three-order harmonic t3 of 30 to 80% with respect to the basic wave T as shown in (a) of FIG. 38, the phase of the harmonic being equal to that of the basic wave T. A combination waveform To of the three-order harmonic t3 and the basic wave T is shown in (b) of FIG. 38. Here, the inclusion rate of the three-order harmonic t3 is defined as $(A3/A1) \cdot 100$ (%) where A1 is the amplitude of the basic wave T and A3 is the amplitude of the three-order harmonics t.

Figure 39:
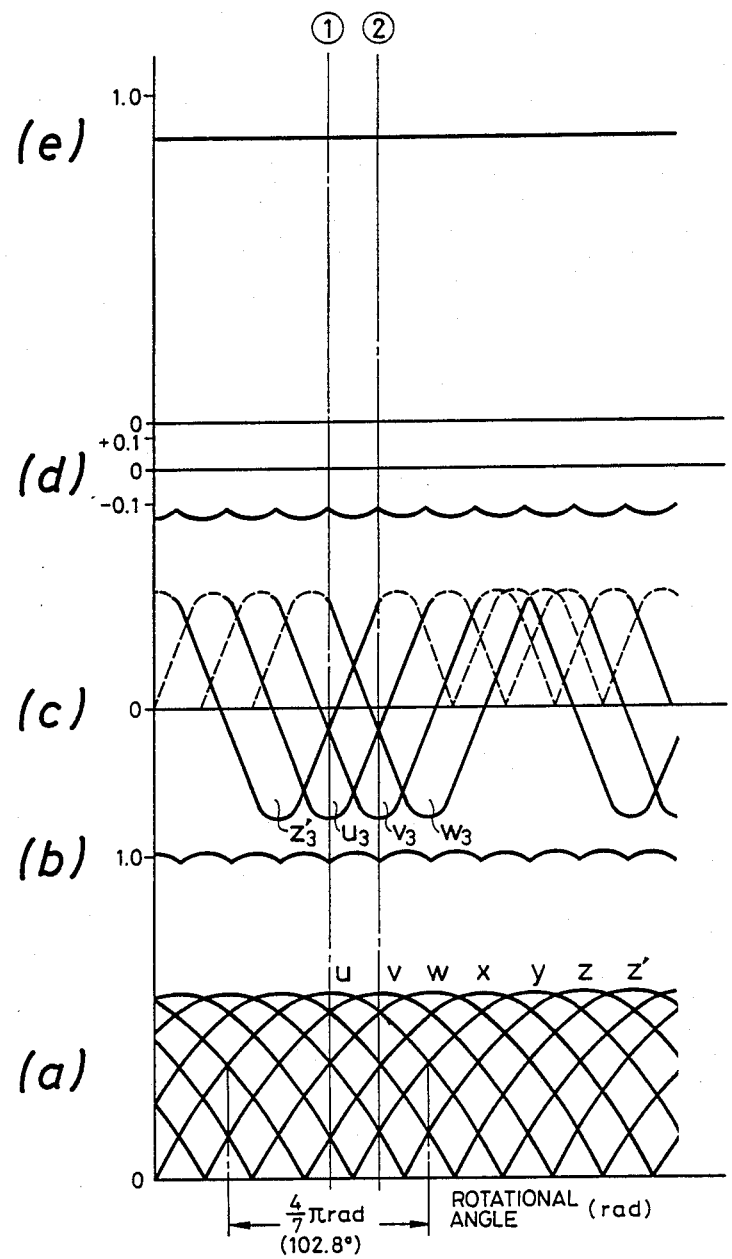
FIG. 39 is a graphic illustration showing torque waveforms.

A description of the principle that such harmonics reduces the torque ripple will be made hereinbelow with reference to FIG. 39 showing torque waveforms generated with respect to the brushless motor. In FIG. 39, (a) shows components of the torque waveforms due to the basic waves in the respective phases u to z' and the basic-wave components of a combined torque of the respective phase torques has a period of $\pi/7$ radian (51.4°) as shown in (b). Here, in a region between 1–2, the u, v, w and z' phases cause generation of torques and at this time the components of the generated torques due to the three-order harmonics are obtained as shown in (c) of FIG. 39, (d) showing a combined torque of the phase torques. It will be understood by comparison between (b) and (d) that the basic wave component and the three-order harmonic component of the combined torque waveforms are coincident in repeating period with each other and are reverse in polarity to each other and therefore of a combination thereof results in cancelling the ripple components each other. An excessive inclusion rate of the three-order harmonics results in increase in the torque ripple.

Figure 40:
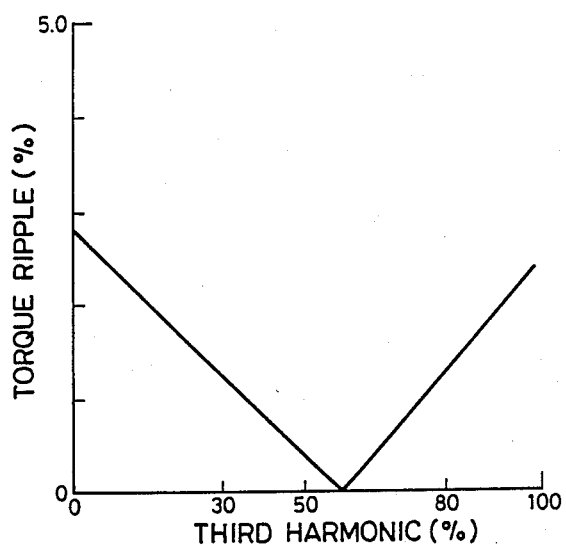
FIG. 40 is a graphic diagram showing the relation between the torque ripple and the third harmonic.

FIG. 40 is an illustration of the relation between the the inclusion rate of three-order harmonic and the torque ripple found by an experiment. In the case that an electrical angle between exciting currents to be supplied to drive coils is 102.8°, when the inclusion rate of the three-order harmonic whose phase is equal to that of the basic wave is set to about 30 to 80%, the torque ripple is decreased to about half as compared with the prior cases. Here, although in the above description the demagnetization regions are provided with respect to the rotor magnet in order to substantially include the three-order harmonics in the magnetic flux interlinking the drive coils, it is also appropriate that, as shown in FIG. 31, each of the drive coils 4 is arranged to have a principal coil 4' and an auxiliary coil 4'', or as shown in (h) and (i) it is partially concaved or recessed.

Magnetization of Rotor Magnet (Example 4)

Figure 41:
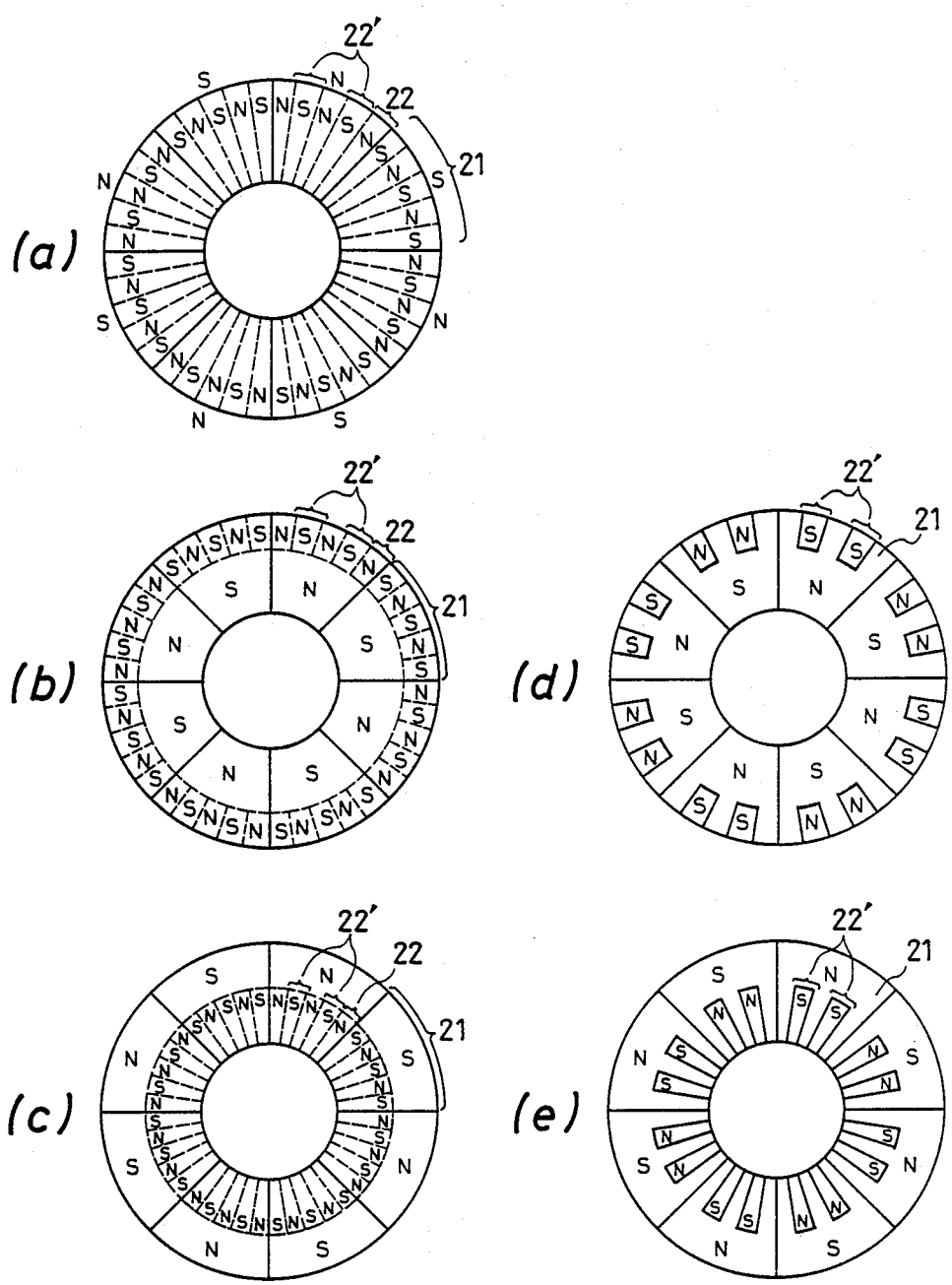
FIG. 41 shows further examples of magnetization of the rotor magnet.

FIG. 41 shows further examples of the magnetization of the rotor magnet 2. In (a) of FIG. 41, the rotor magnet 2 is magnetized to have 8 sectoral main regions 21 in the circumferential direction to alternately arrange the N-poles and S-poles and each of the 8 main regions 21 is divided into 5 sub-regions 22. Two of the sub-regions 22 of each of the main regions 21 are demagnetization regions 22' whose polarities are reverse to the entire polarity of the main region 21. Taking into account only the main regions 21, the rotor magnet 2 is of the 8-pole type, and taking into account the sub-regions 22, the number of poles of the rotor magnet 2 becomes 40 which is five times the number of the main regions 21.

In the cases of (b) and (c) of the same drawing, each of the rotor magnets is double-magnetized so as to have 8 main regions 21 each of which is divided into 5 sub-regions 22, two of the 5 sub-regions being demagnetization region 22'. Furthermore, in the cases of (d) and (e), each of the rotor magnets 2 is arranged so as to have two demagnetization regions 22' at two portions of each of 8 main regions 21.

Figure 42:
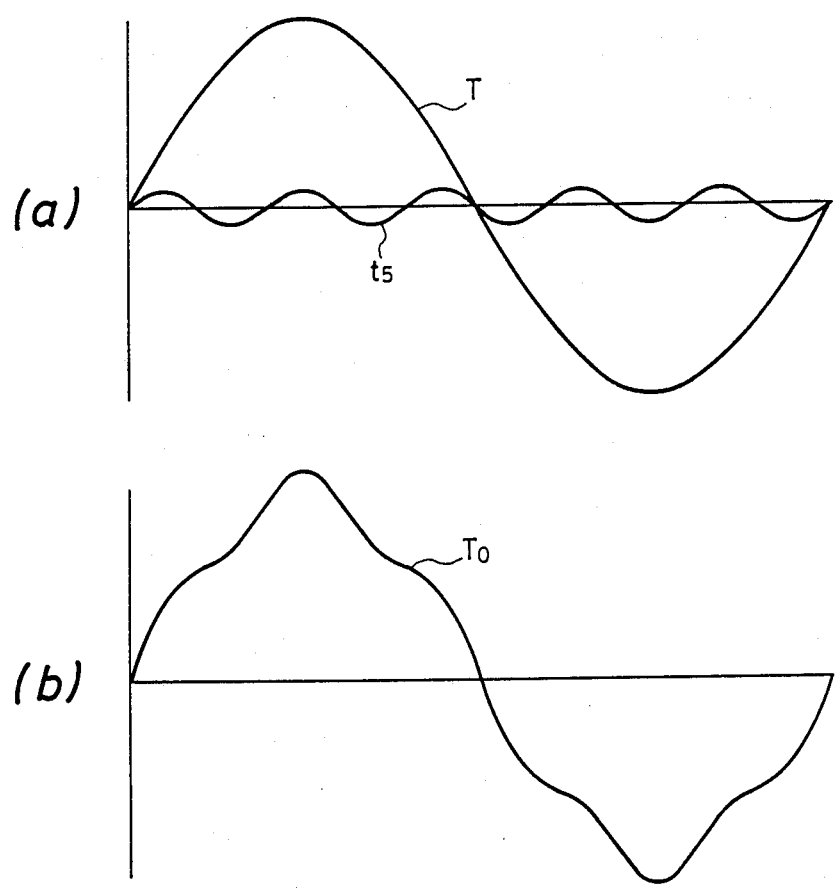
FIG. 42 shows magnetic flux waveforms for the drive coils.

With this arrangement, the rotation of the rotor magnet 2 causes the magnetic flux to interlink the drive coils 4u to 4z' so as to include a five-order harmonics t5 of about 10 to 20% with respect to the basic wave T as shown in (a) of FIG. 42, the phase of the five-order harmonics being equal to that of the basic wave T. Waveform (b) of the same drawing shows a conbined waveform To thereof. The inclusion rate of the five-order harmonics is defined as $(A5/A1) \cdot 100$ (%) where A1 represents the amplitude of the basic wave T and A5 designates the amplitude of the five-order harmonics.

Figure 43:
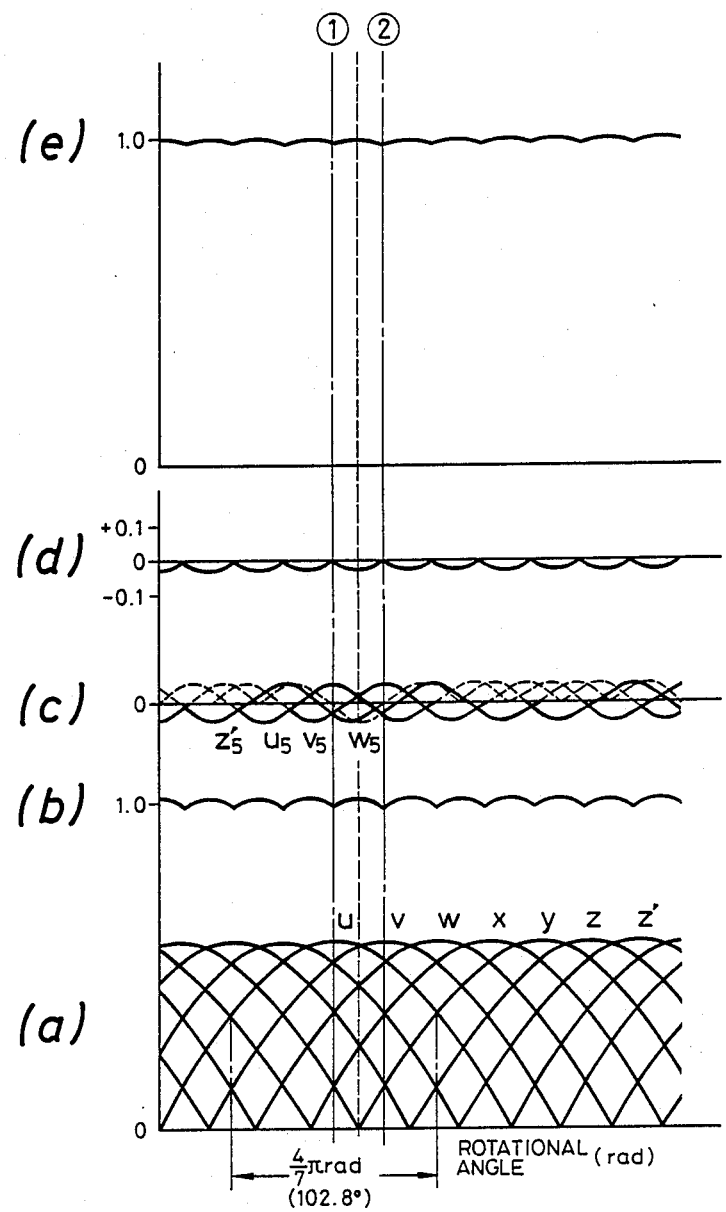
FIG. 43 is a graphic illustration of torque waveforms.

The principle that the harmonics decreases the torque ripple is as follows. In FIG. 43, (a) shows components of the torque waveforms due to the basic waves in the respective phases u to z' and the basic-wave components of a combined torque of the respective phase torques has a period of $\pi/7$ radian (51.4°) as indicated by (b). Here, in a region between 1–2, the u, v, w and z' phases cause generation of torques and at this time the components the generated torques due to the five-order harmonics are obtained as shown in (c) of FIG. 43, (d) showing a combined torque thereof. It will be understood by comparison between (b) and (d) that the basic wave component and the five-order harmonic component of the combined torque waveforms are coincident in repeating period with each other and are reverse in polarity to each other and therefore a combination thereof results in cancelling the ripple components of each other. However, an excessive inclusion rate of the five-order harmonics increases the torque ripple.

Figure 44:
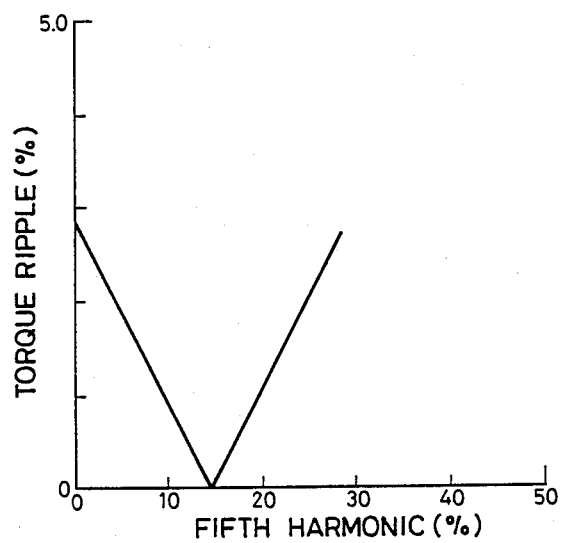
FIG. 44 illustrates the relation between the torque ripple and the fifth harmonic.
Figures 45F, 45G, 45H:
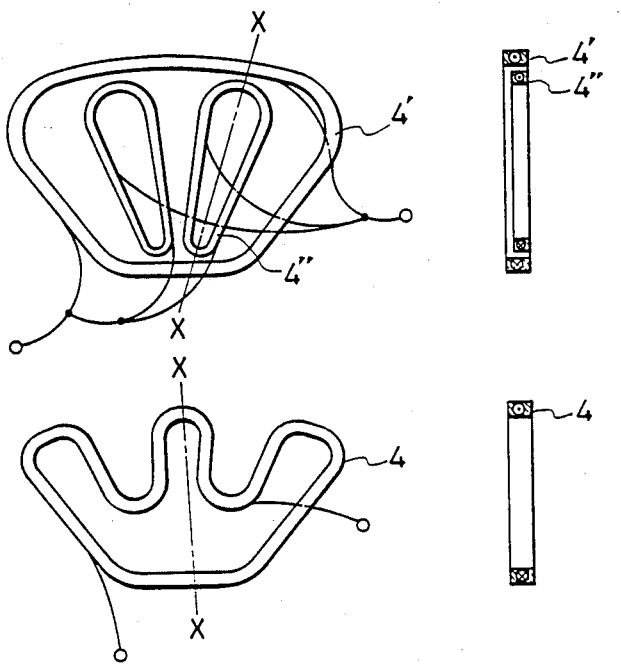
FIG. 45 shows examples of each drive coil for inclusion of the harmonic.

FIG. 44 is an illustration of the relation between the the inclusion rate of five-order harmonic and the torque ripple found by an experiment. In the case that an electrical angle between exciting currents to be supplied to drive coils is 102.8°, when the inclusion rate of the five-order harmonic whose phase is equal to that of the basic wave is set to about 10 to 20%, the torque ripple is decreased to about half as compared with the prior cases. Here, although in the above description the demagnetization regions 22' are provided with respect to the rotor magnet 2 in order to substantially include the five-order harmonics in the magnetic flux interlinking the drive coils 4u to 4z', it is also appropriate that, as shown in (f) and (g) of FIG. 45, each of the drive coils 4 is arranged to have a principal coil 4' and auxiliary coils 4'', or as shown in (h) it is arranged so as to have concaved or recessed portions.

Figure 46A:
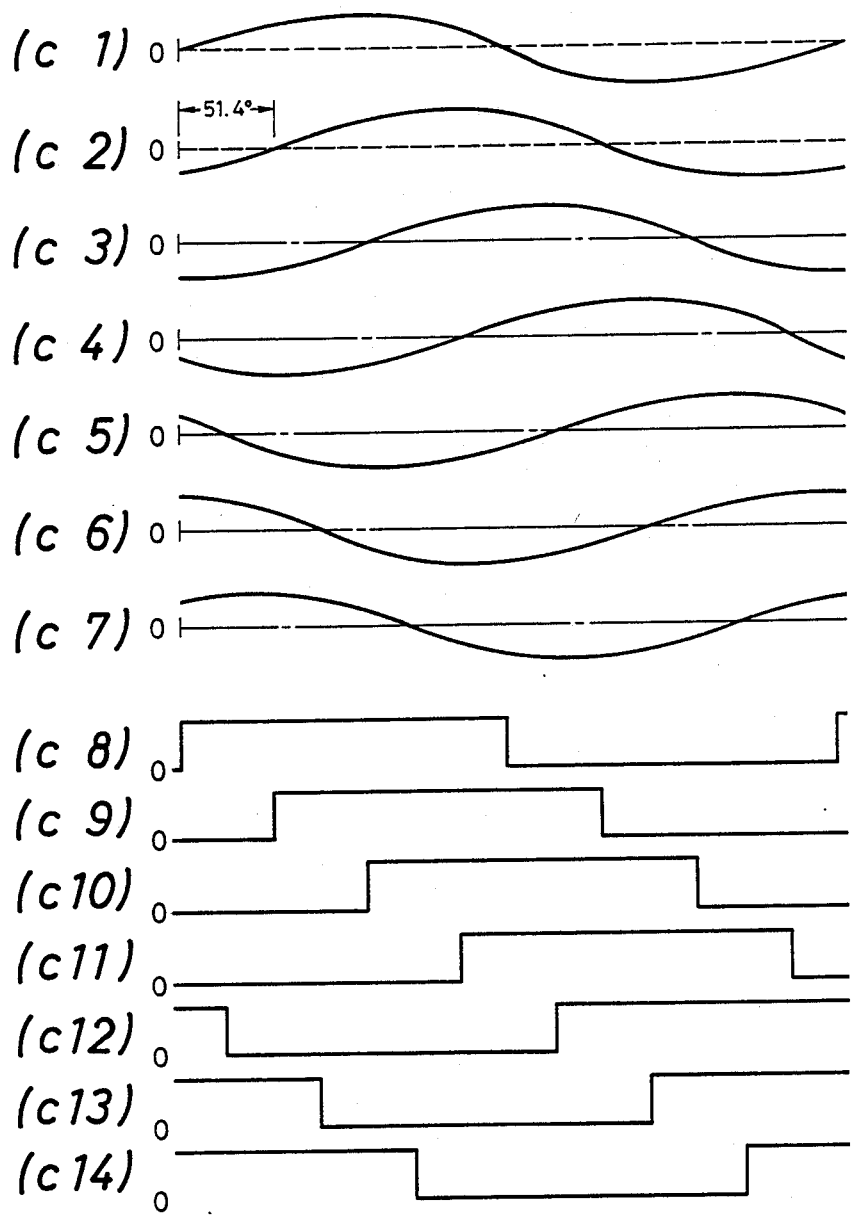
FIGS. 46A, 46B and 46C are timing charts showing another operation of the FIG. 23 motor.
Figure 46B:
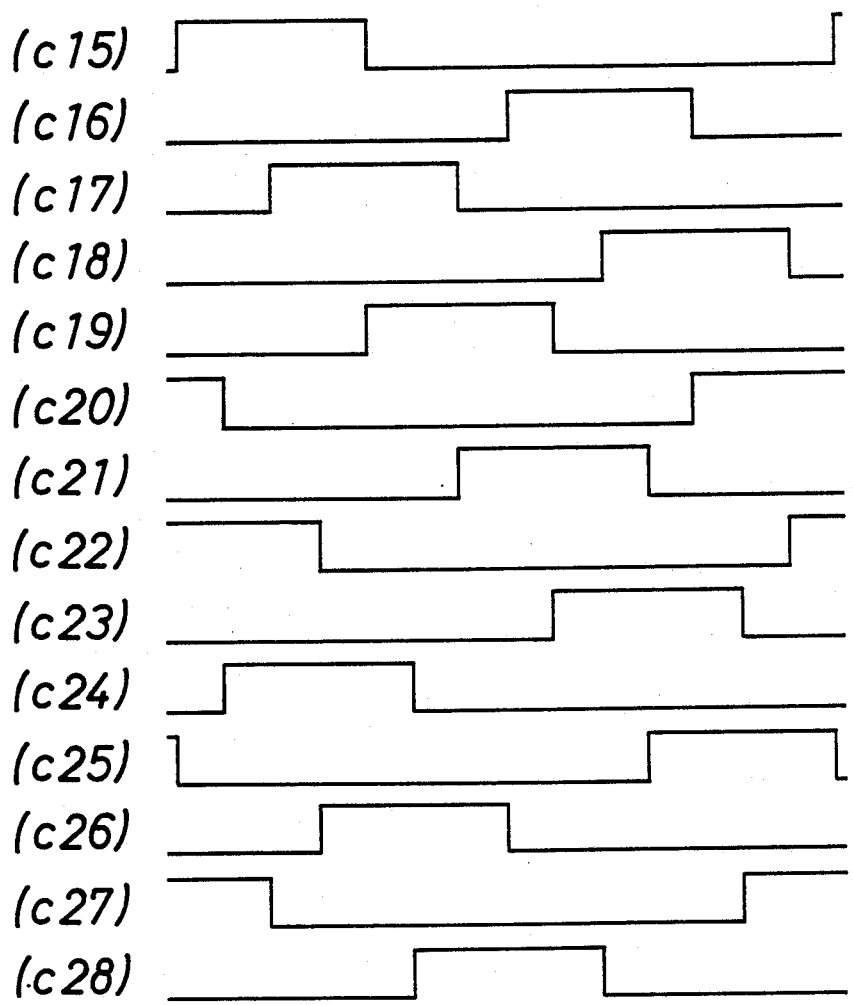
Figure 46C:
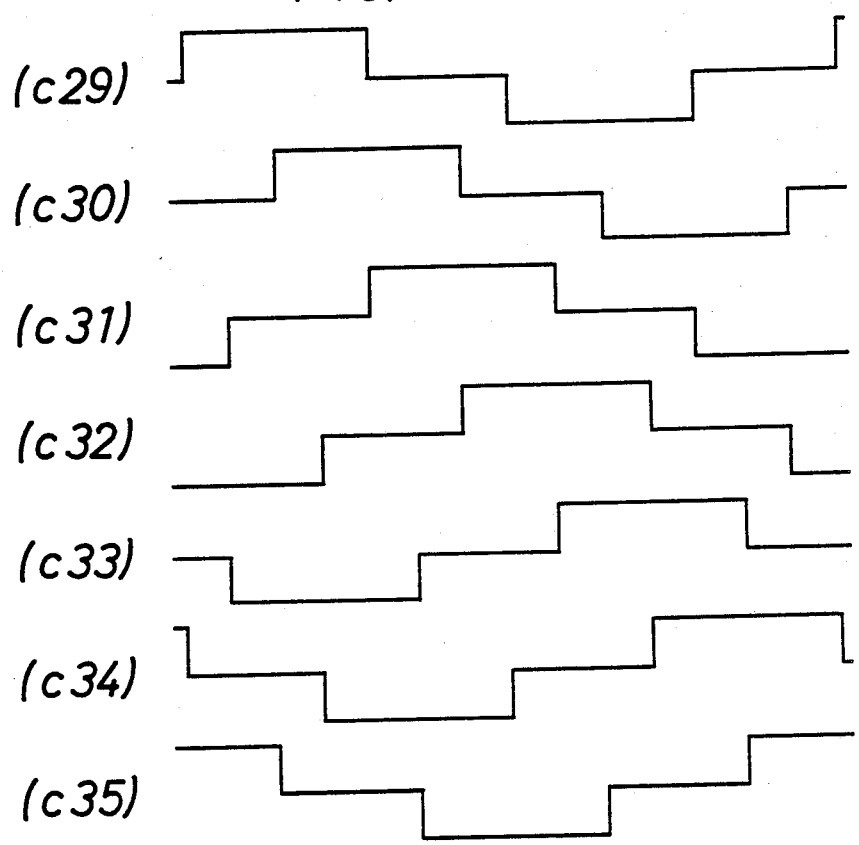

FIGS. 46A to 46C are illustrations for positions signals (c1) to (c7), shaped signals (c8) to (c17), exciting signals (c15) to (c28) and drive currents (c29) to (c35) in the case that the electrical angle between the drive currents is 102.8°. The description thereof will be omitted for brevity.

Magnetization of Rotor Magnet (Example 5)

Figure 47:
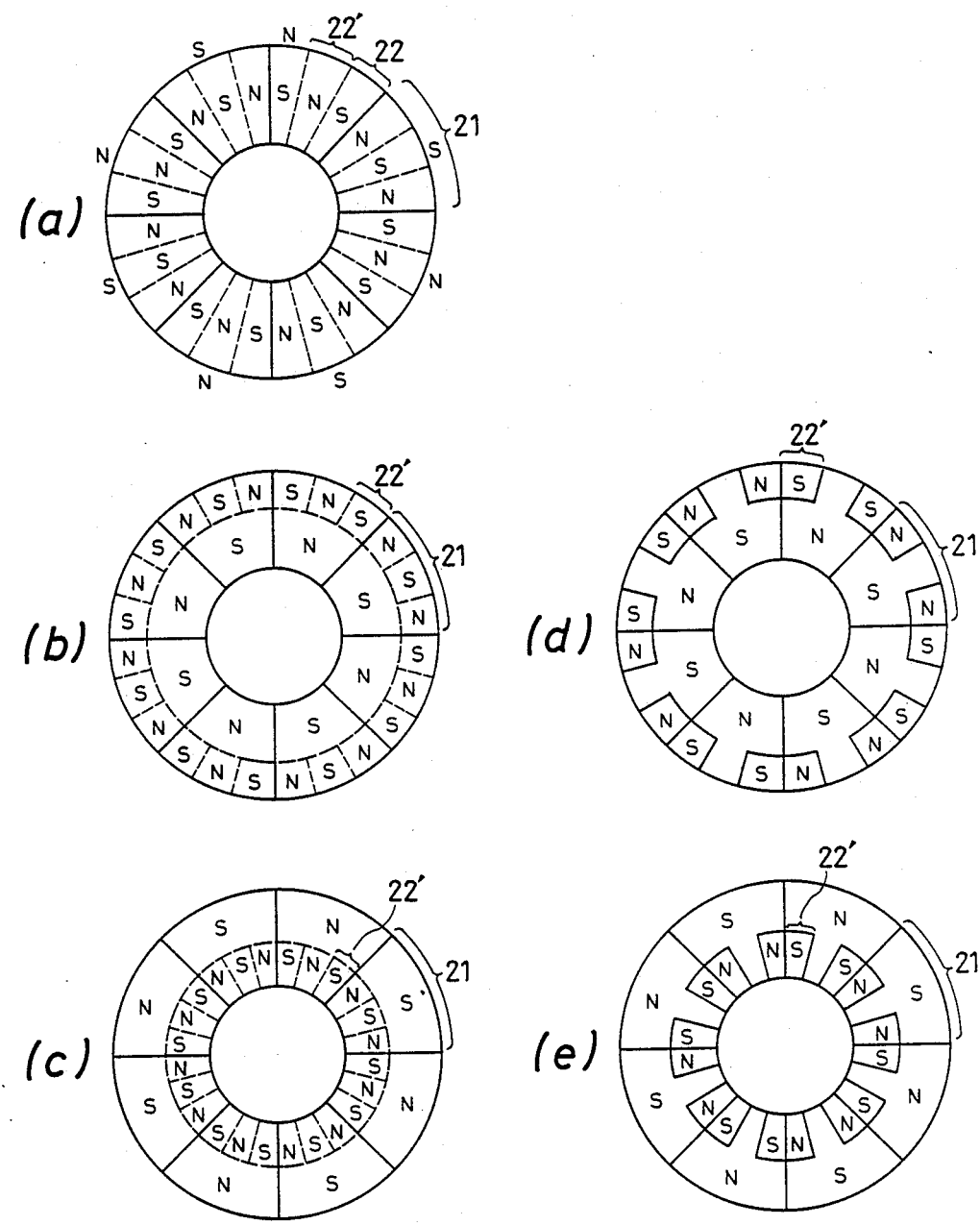
FIG. 47 shows further examples of magnetization of the rotor magnet.

FIG. 47 shows further examples of the magnetization of the rotor magnet 2. In the case of (a) of FIG. 47, the rotor magnet 2 is magnetized successively in the circumferential direction so as to have eight sectoral main regions 21 each of which is divided into three sub-regions 22. The main regions 21 are disposed so as to alternately arrange N-poles and S-poles. In each of the main regions 21, two of the sub-regions 22 which are at both sides are demagnetization regions 22' each having a polarity reverse to the entire polarity of the main region 21. That is, taking into account only the main regions, the rotor magnet 2 is arranged to have eight poles and, taking into account the sub-regions 22, it results in having 24 poles which is three times as many as compared with the main regions. In the cases of rotor magnets 2 shown in (b) and (c) of FIG. 47, similarly, each has 8 main regions each of which is divided into 3 sub-regions 22 and two demagnetization provided therein by means of the so-called double magnetization technique. Furthermore, in the cases of the rotor magnets 2 shown in (d) and (e) of the same drawing, although, each similarly has 8 main regions 21, two demagnetization regions 22′ are present at two portions of each of the main regions 21.

Figure 48:
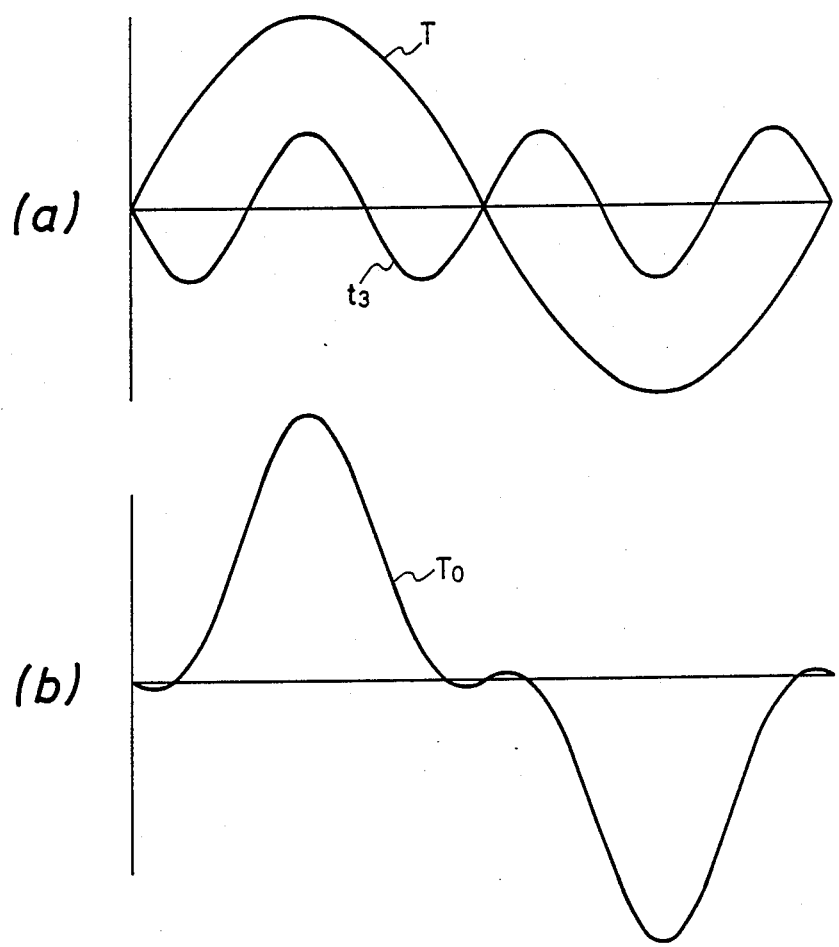
FIG. 48 is a graphic illustration of magnetic flux interlinking the drive coils.

With this arrangement, rotation of the rotor magnet 2 causes magnetic flux to interlink the drive coils $4u$ to $4z'$ so as to contain three-order harmonics t3 of 20 to 60% with respect to the basic wave T as shown in (a) of FIG. 48, the phase of the harmonics being reverse to that of the basic wave T. A combination waveform To of the three-order harmonic t3 and the basic wave T is shown in (b) of FIG. 48. Here, the inclusion rate of the three-order harmonic t3 is defined as $(A3/A1)\cdot 100$ (%) where A1 is the amplitude of the basic wave T and A3 is the amplitude of the three-order harminic t3.

Figure 49:
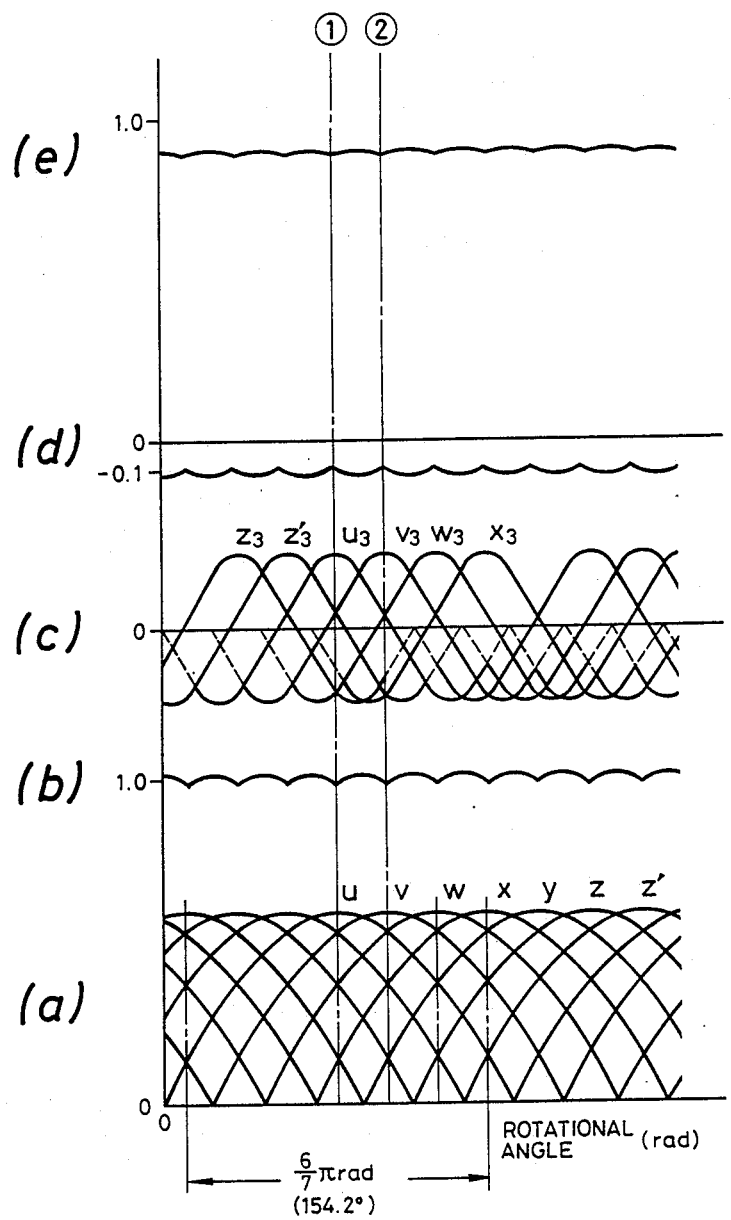
FIG. 49 is a graphic diagram showing torque waveforms.

A description of the principle that such harmonics reduces the torque ripple will be made hereinbelow with reference to FIG. 49 showing torque waveforms generated with respect to the brushless motor. In FIG. 49, (a) shows components of the torque waveforms due to the basic waves in the respective phases u to z′ and the basic-wave components of a combined torque of the respective phase torques has a period of $\pi/7$ radian (51.4°) as shown in (b). Here, in a region between 1–2, the u, v, w, x, z and z′ phases cause generation of torques and at this time the components of the generated torques due to the three-order harmonics are obtained as shown in (c) of FIG. 49, (d) showing a combined torque of the phase torques. It will be understood by comparison between (b) and (d) that the basic wave component and the three-order harmonics component of the combined torque waveforms are coincident in repeating period with each other and are reverse in polarity to each other and therefore a combination thereof results in cancelling of ripple components of each other. An excessive inclusion rate of the three-order harmonics results in increase in the torque ripple.

Figure 50:
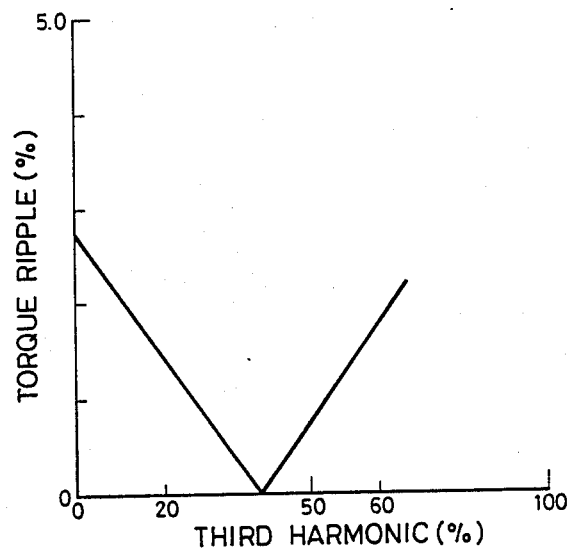
FIG. 50 shows the relation between the torque ripple and the third harmonic.
Figure 51:
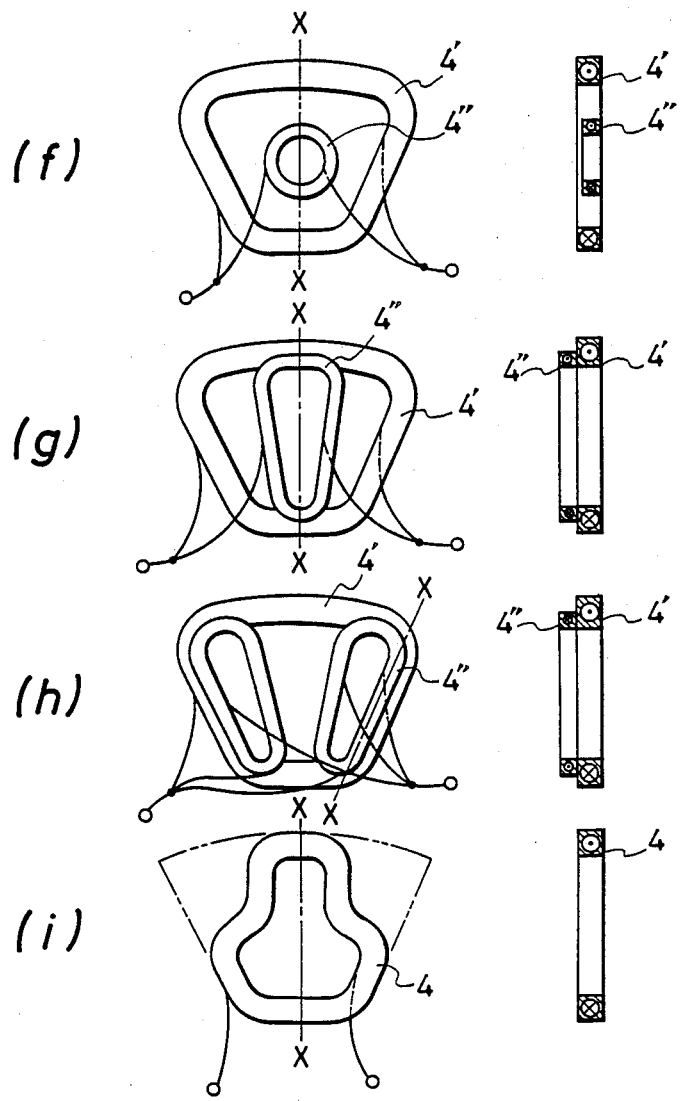
FIG. 51 illustrates examples of each drive coil.

FIG. 50 is an illustration of the relation between the the inclusion rate of three-order harmonic and the torque ripple found by an experiment. In the case that an electrical angle between exciting currents to be supplied to drive coils is 154.2°, when the inclusion rate of the three-order harmonic whose phase is reverse to that of the basic wave is set to about 20 to 60%, the torque ripple is decreased to about half as compared with the prior cases. Here, although in the above description the demagnetization regions are provided with respect to the rotor magnet in order to substantially include the three-order harmonics in the magnetic flux interlinking the drive coils, it is also appropriate that, as shown in (f) to (h) of FIG. 51, each of the drive coils 4 is arranged to have a principal coil 4′ and an auxiliary coil 4″, or as shown in (i) it is arrange so as to have concaved or recessed portions.

Magnetization of Rotor Magnet (Example 6)

Figure 52:
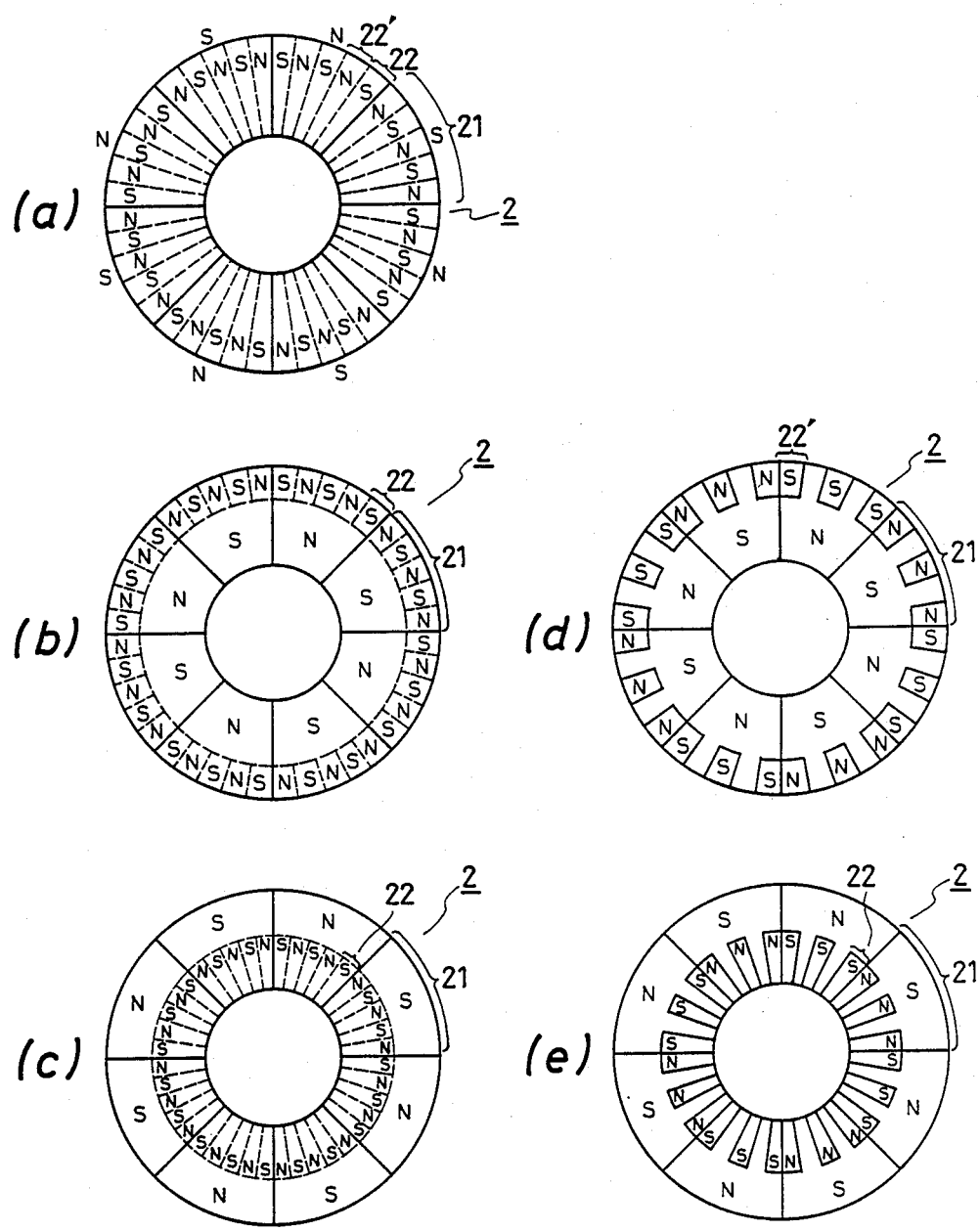
FIG. 52 shows still further examples of magnetization of the rotor magnet.

FIG. 52 shows still further examples of the magnetization of the rotor magnet 2. In (a) of FIG. 52, the rotor magnet 2 is magnetized to have 8 sectoral main regions 21 in the circumferential direction to alternately arrange the N-poles and S-poles and each of the 8 main regions 21 is divided into 5 sub-regions 22. Three of the sub-regions 22 of each of the main regions 21 are demagnetization regions 22′ whose polarities are reverse to the entire polarity of the main region 21. Taking into acount only the main regions 21, the rotor magnet 2 is of the 8-pole type, and taking into acount the sub-regions 22, the number of poles of the rotor magnet 2 becomes 40 which is five time of the number of the main regions 21.

In the cases of (b) and (c) of the same drawing, each of the rotor magnets is double-magnetized so as to have 8 main regions 21 each of which is divided into 5 sub-regions 22, two or three of the 5 sub-regions being demagnetization region 22′. Furthermore, in the cases of (d) and (e), each of the rotor magnets 2 is arranged so as to have three demagnetization regions 22′ at portions of each of 8 main regions 21.

Figure 53:
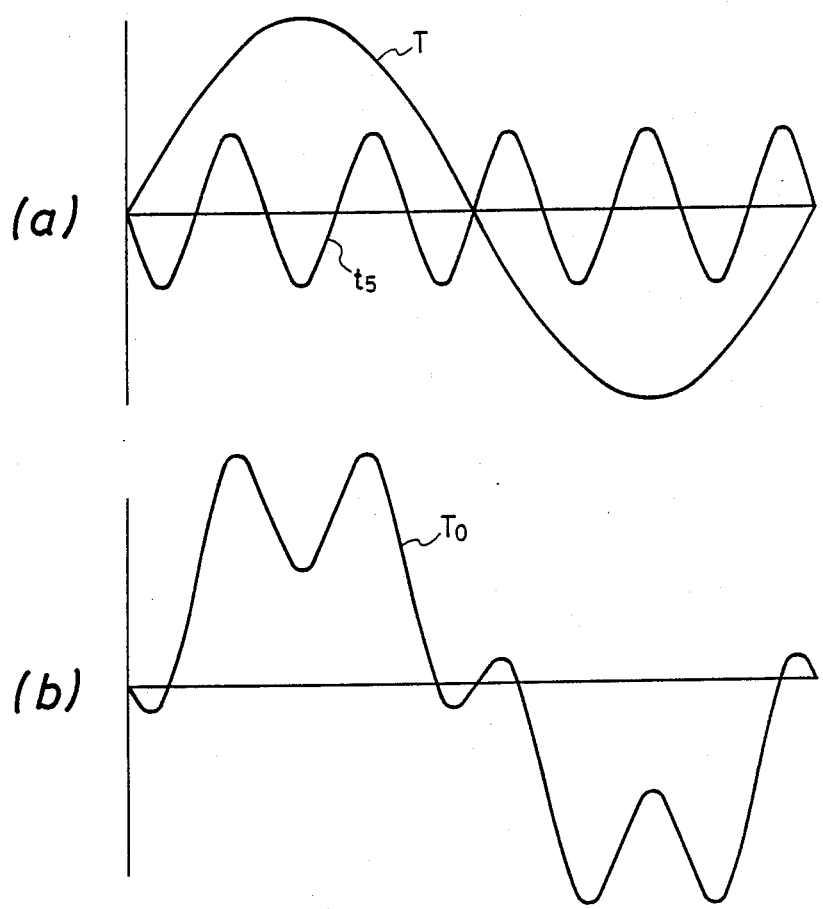
FIG. 53 shows magnetic flux waveforms including the fifth harmonic.

With this arrangement, the rotation of the rotor magnet 2 causes the magnetic flux to interlink the drive coils $4u$ to $4z'$ so as to include five-order harmonics t5 of about 20 to 60% with respect to the basic wave T as shown in (a) of FIG. 53, the phase of the five-order harmonics being reverse to that of the basic wave T. (b) of the same drawing shows a conbined waveform To thereof. The inclusion rate of the five-order harmonic is defined as $(A5/A1)\cdot 100$ (%) where A1 represents the amplitude of the basic wave T and A5 designates the amplitude of the five-order harmonic.

Figure 54:
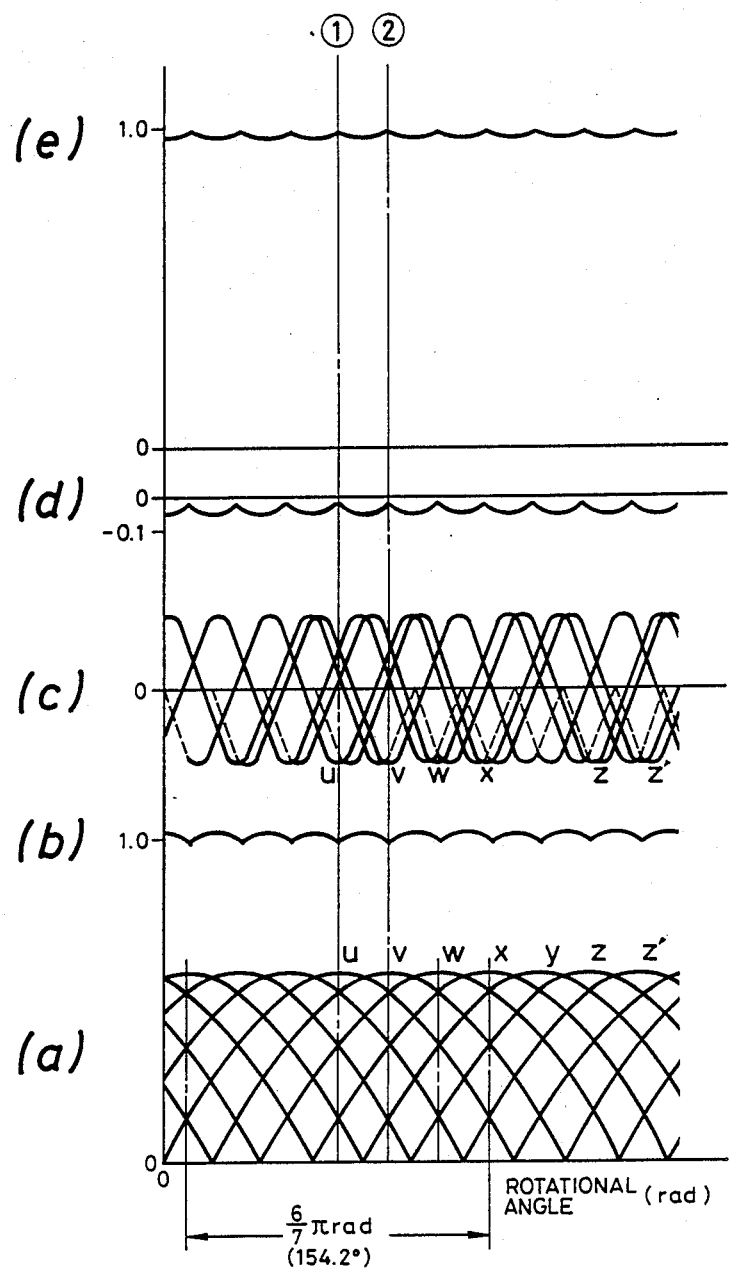
FIG. 54 is a graphic illustration of torque waveforms.

The principle that the harmonics decreases the torque ripple is as follows. In FIG. 54, (a) shows components of the torque waveforms due to the basic waves in the respective phases u to z′ and the basic-wave components of a combined torque of the respective phase torques has a period of $\pi/7$ radian (51.4°) as indicated by (b). Here, in a region between 1–2, the u, v, w and z′ phases cause generations of torques and at this time the components of the generated torques due to the five-order harmonics are obtained as shown in (c) of FIG. 54, (d) showing a combined torque thereof. It will be understood by comparison between (b) and (d) that the basic wave component and the five-order harmonic component of the combined torque waveforms are coincident in repeating period with each other and are reverse in polarity to each other and therefore a combination thereof results in cancelling ripple components each other. However, an excessive inclusion rate of the five-order harmonic increases the torque ripple.

Figure 55:
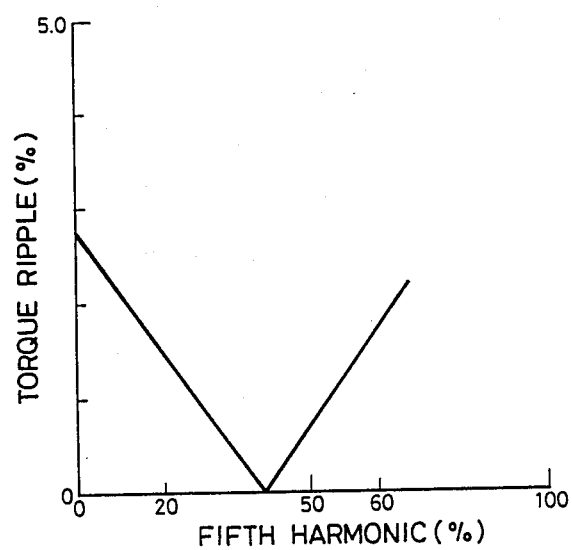
FIG. 55 is a graphic diagram showing the relation between the torque ripple and the fifth harmonic.

FIG. 55 is an illustration of the relation between the the inclusion rate of five-order harmonic and the torque ripple found by an experiment. In the case that an electrical angle between exciting currents to be supplied to drive coils is 154.2°, when the inclusion rate of the five-order harmonics whose phase is reverse to that of the basic wave is set to about 20 to 60%, the torque ripple is decreased to about half as compared with the prior cases. Here, although in the above description the demagnetization regions 22′ are provided with respect to the rotor magnet 2 in order to substantially include the five-order harmonics in the magnetic flux interlinking the drive coils $4u$ to $4z'$, it is also appropriate that, as shown in FIG. 36, each of the drive coils 4 is arranged to have a principal coil 4′ and auxiliary coils 4″, or to have concaved or recessed portions.

Figure 56A:
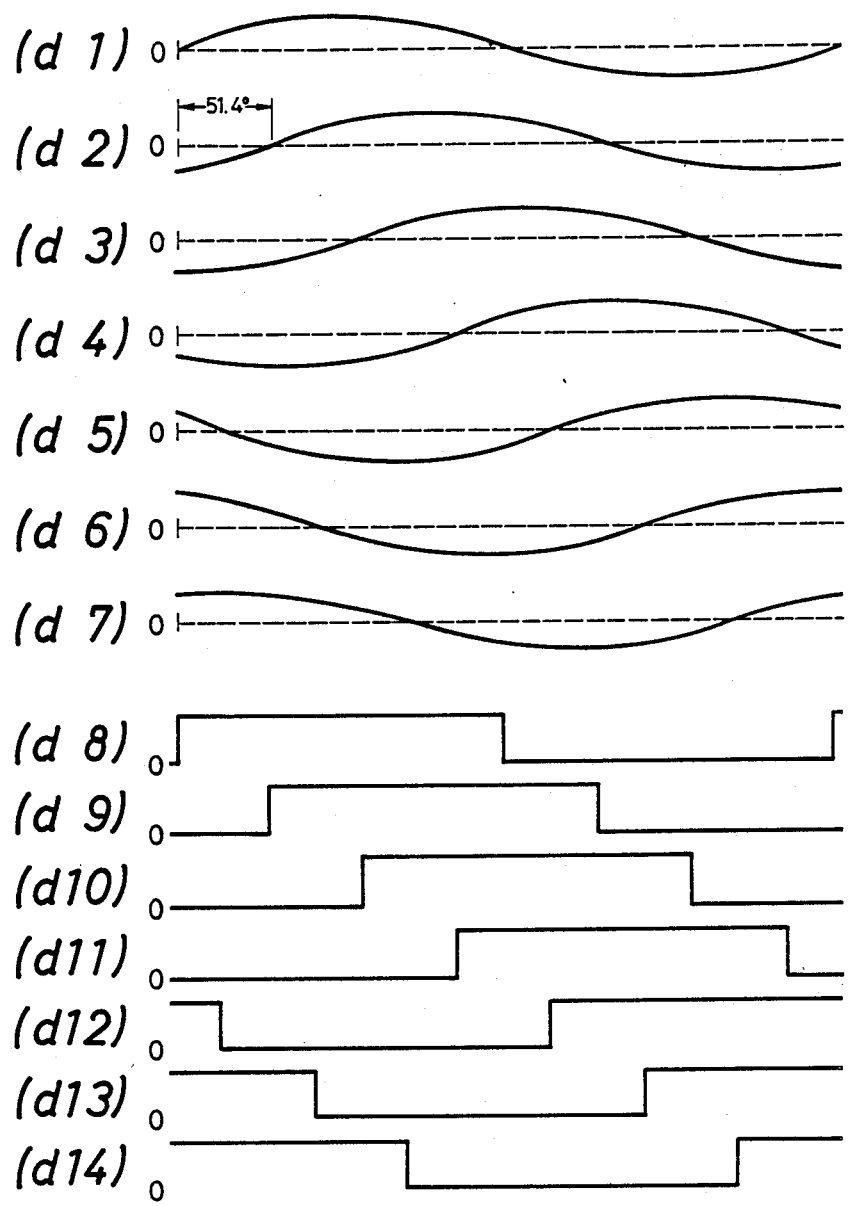
FIG. 56A, 56B and 56C are illustrations for describing further operation of the FIG. 23 motor.
Figure 56B:
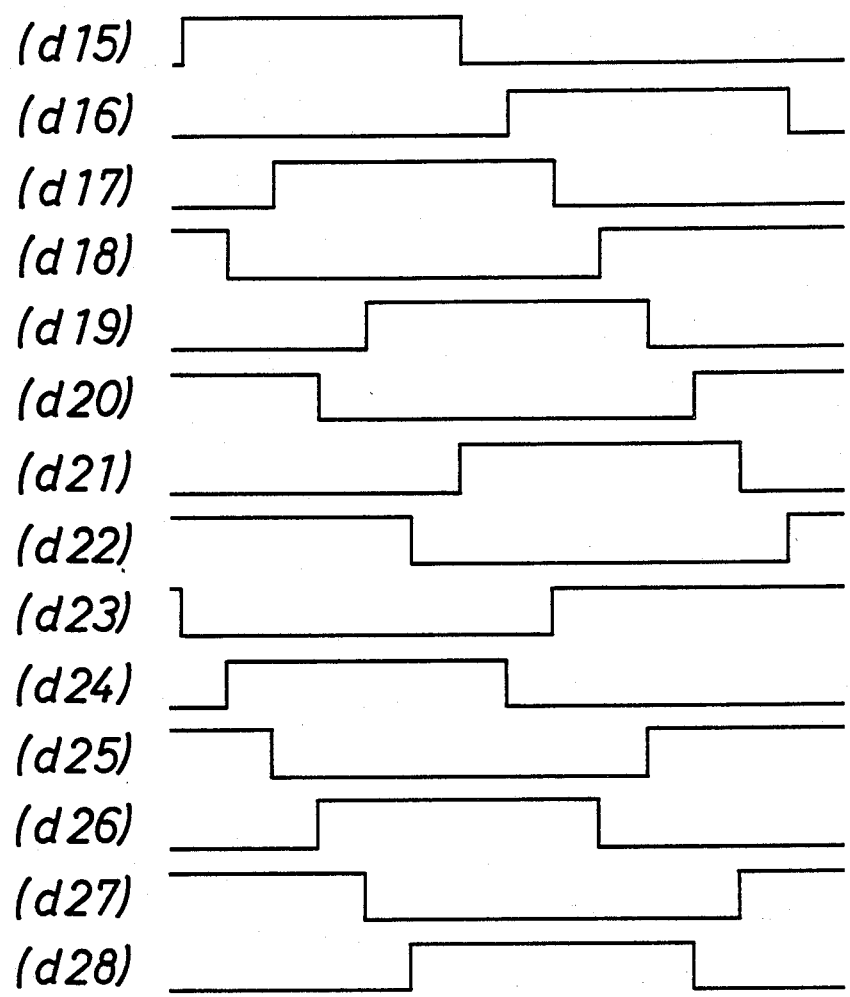
Figure 56C:
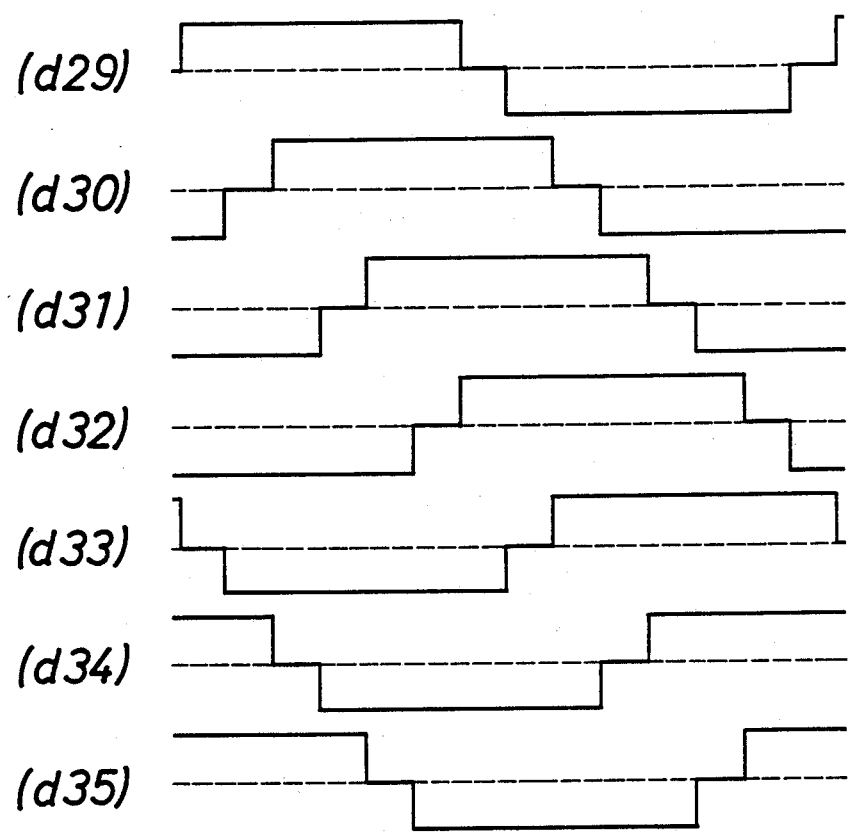

FIGS. 56A to 56C are illustrations for position signals (d1) to (d7), shaped signals (d8) to (d14), exciting signals (d15) to (d28) and exciting currents (d29) to (d35) in the case that the electrical angle between the exciting currents is 154.2°. The description thereof will be omitted.

Figure 58:
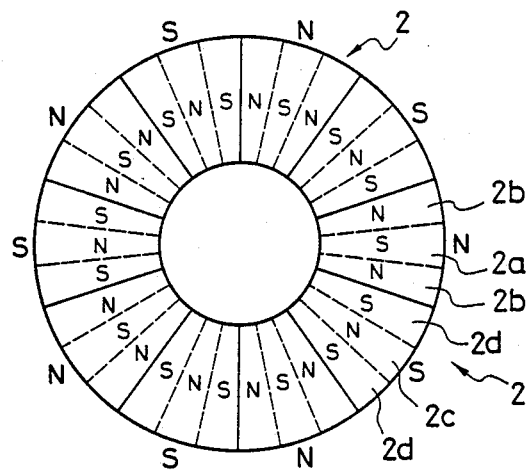
FIG. 58 showing an example of magnetization of a rotor magnet and FIG. 59B showing an example of a position signal processing circuit.
Figure 57:
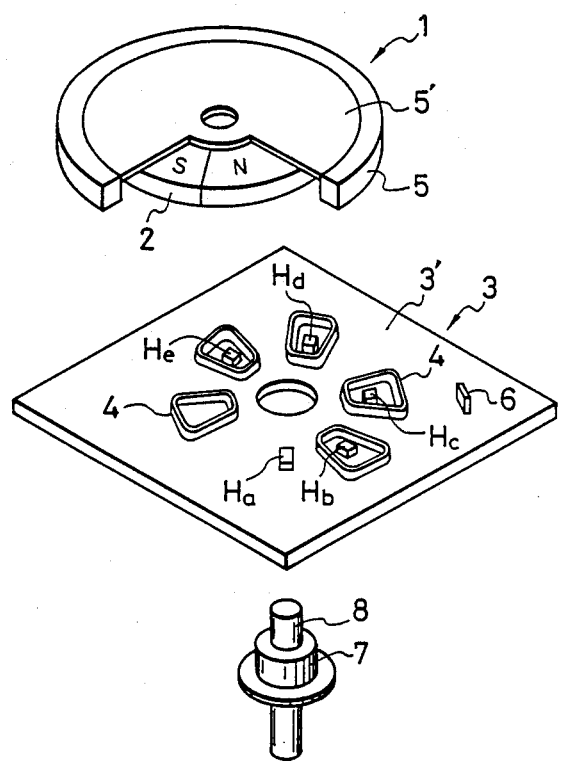
FIGS. 57 and 59A are illustrations of a fourth embodiment of a multi-phase brushless motor according to the present invention.

A fourth embodiment of a brushless motor according to the present invention will be described with reference to FIGS. 57 and 58 illustrating the brushless motor with five phases. The brushless motor includes rotor 1 and a stator 3, the description of the basic arrangement of the rotor 1 will be omitted because of being similar to that of the brushless motor shown in FIG. 8. On a base 3' of the stator 3 are attached a drive coil assemblage 4 comprising five phase coils U to Y which are circuilarly arranged at intervals of a mechanical angle of 50.4° so as to have an electrical angle of 252°. At center portions of the drive coils U to Y are placed Hall generators Hb to He for position detection. On the other hand, a further Hall generator Ha is disposed between the two drive coils positioned at both ends of the circularly arranged drive coils U to Y. The Hall generators Ha to He are arranged so as to have an electrical angle of 252°. Also provided on the base 3' thereof is a magnetic sensor 6 which is placed in opposed relation to a FG magnet 5 of the rotor 1 when assembling this brushless motor.

Furthermore, to the undersurface of the rotor 1 is attached a rotor magnet 2 magnetized as shown in FIG. 58 so as to have 10 poles where N-poles and S-poles are alternately arranged. Each of the 10 pole regions is divided into 3 sub-regions the polarity of one of which is reverse to the entire polarity of the region. More specifically, the centered one 2a of the 3 sub-region of each N-pole region is magnetized to be S-pole reverse to the entire polarity of the region and both side sub-regions 2b thereof are magnetized to be N-pole equal in polarity thereto and on the other hand the centered one 2c of the 3 sub-regions of each S-pole region is set to be reverse in polarity to the region and both side sub-regions 2d are set to be equal in polarity thereto. The centered sub-regions 2a and 2c of each region are formed by demagnetization.

Figure 59A:
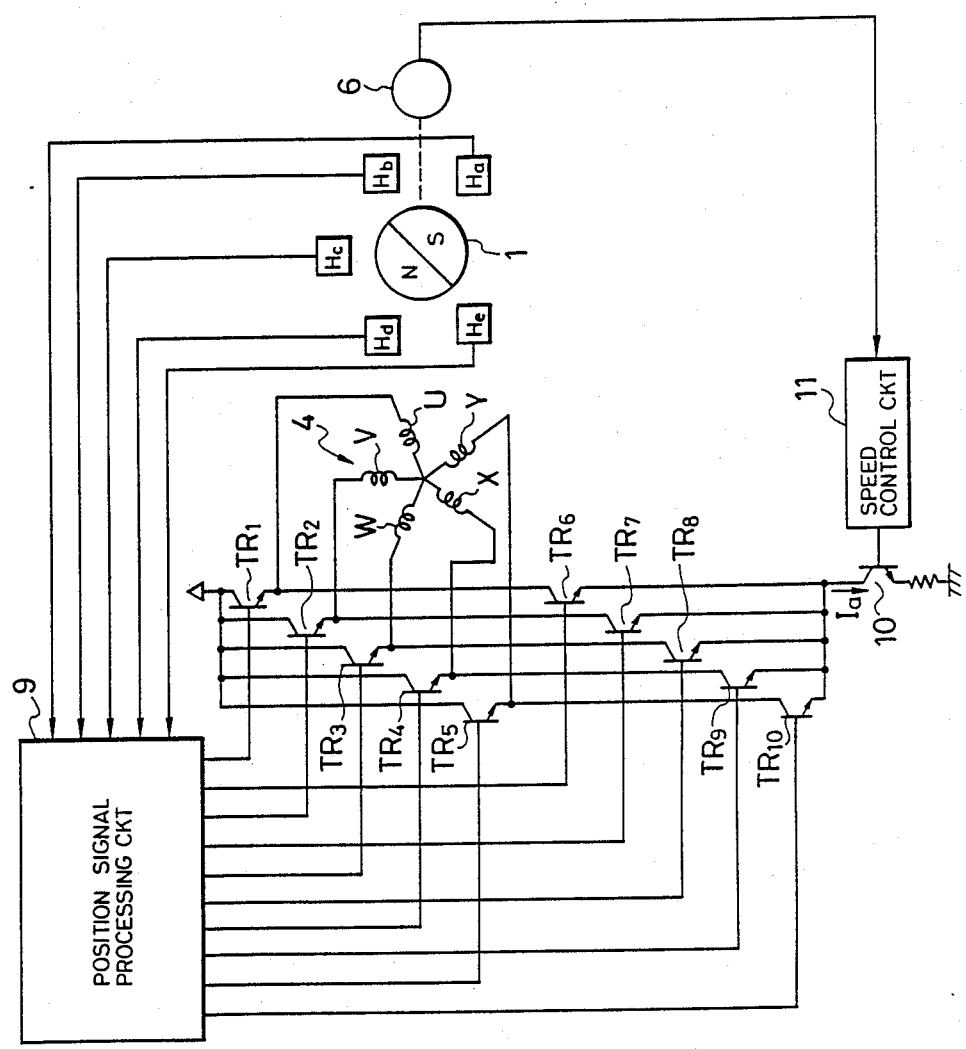
Figure 59B:
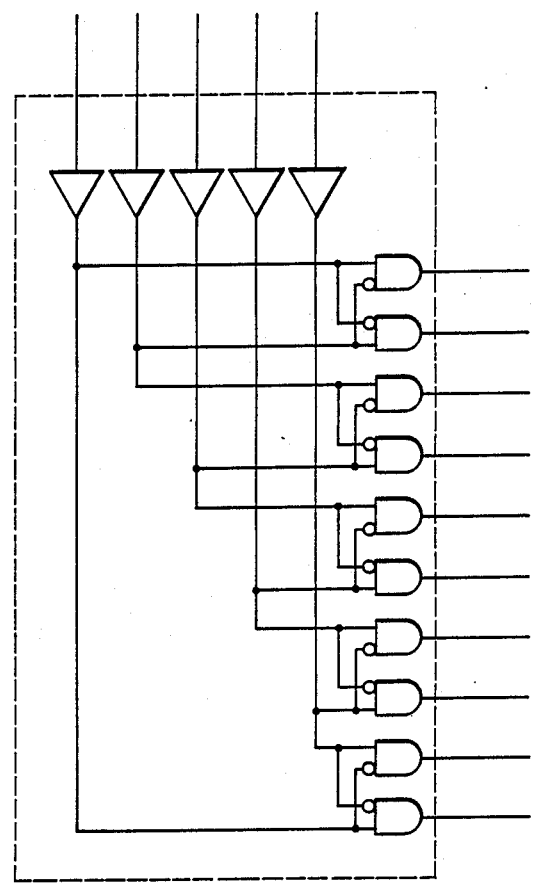
Figure 60A:
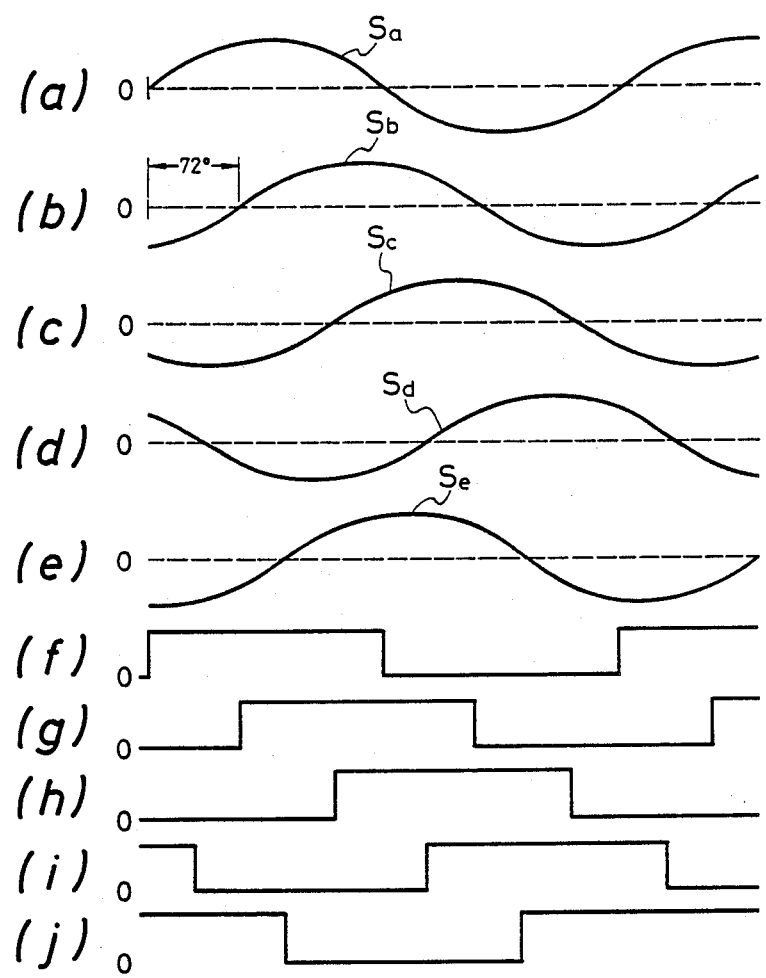
FIGS. 60A, 60B and 60C are illustrations for describing the operation of the FIG. 59A motor.
Figure 60B:
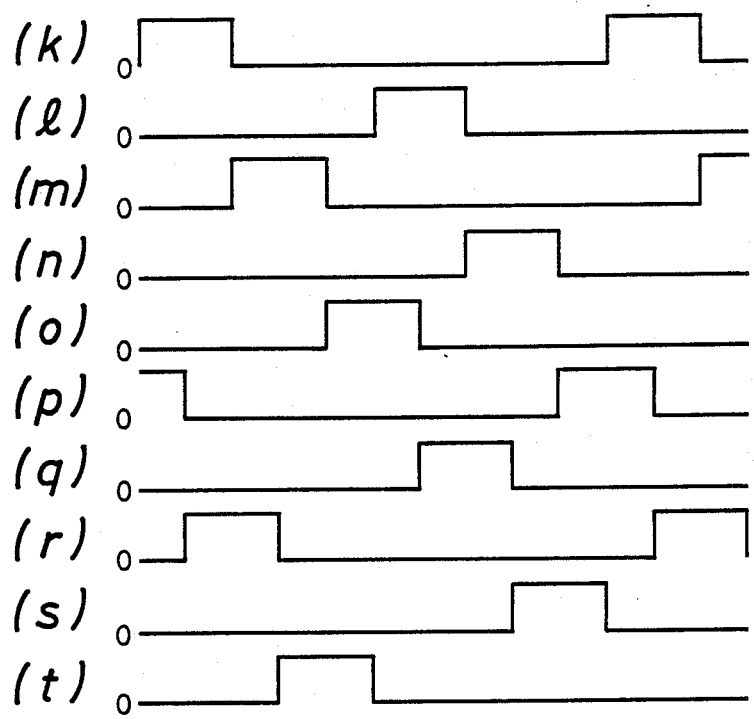
Figure 60C:
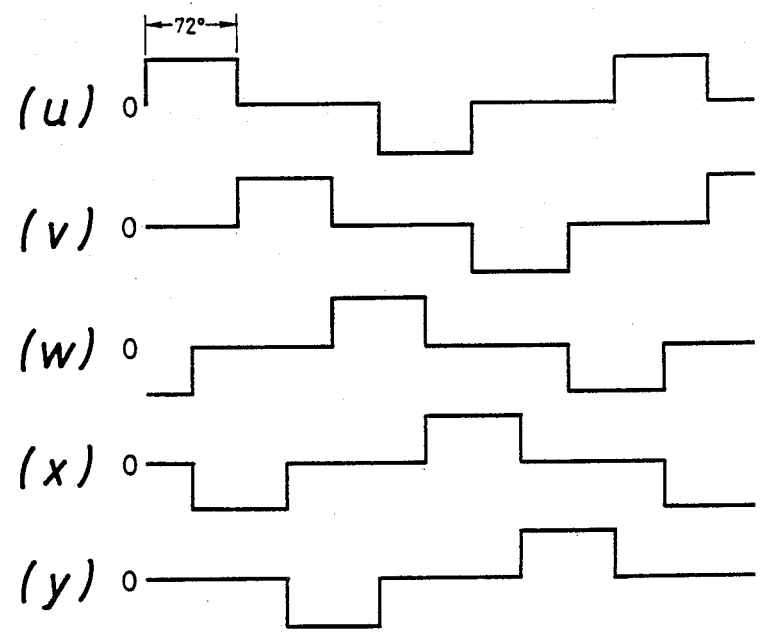

FIG. 59A is a circuit diagram of the fourth embodiment. In FIG. 59A, the Hall generators Ha to He are coupled to the input side of a position signal processing circuit 9 which, as shown in FIG. 59B, includes a logic circuit to output exciting signals with an electrical angle of 72°. The output side of the position signal processing circuit 9 are coupled to the bases of transistors TR1 to TR10 making up a drive circuit of this brushless motor. The collectors of the transistors TR1 to TR5 are connected to a power source, not shown, and the emitters thereof are respectively connected to the collectors of the transistors TR6 to TR10 and further to the drive coils U to Y which are star-connected to each other. Furthermore, the emitters of the transistors TR6 to TR10 are commonly connected to the collector of a control transistor 10, the base of which is in turn coupled to the output side of a speed control circuit 11. The speed control circuit 11 is coupled to the magnetic sensor 6 and, in response to a pulse signal from the magnetic sensor 6, outputs a control signal so as to control the level of a drive current Ia through the control transistor 10.

Operation of the five-phase brushless motor of the fourth embodiment according to this invention will be described hereinbelow with reference to FIGS. 60A to 60C and 61 to 65. The Hall generators Ha to He detect the magnetic fluxes generated from the rotor magnet 2 and then outputs position signals Sa to Se, whose phase difference is 72°, as shown in (a) to (e) of FIG. 60A. These position signals Sa to Se are amplified and shaped by operational amplifiers of the position signal processing circuit 9 (see FIG. 59B) so as to obtain rectangular-wave signals as shown in (f) to (j) of the same drawing. These rectangular-wave signals are processed by the logic circuits of the position signal processing circuit 9 so as to obtain exciting signals with an electrical angle of 72° as indicated by (k) to (t) of FIG. 60B, which are in turn supplied selectively to the transistors TR1 to TR10. That is, when the rectangular-wave signals indicated by (f) and (g) are respectively in the high level "H" state and the low level "L" state and the rectangular-wave signals indicated by (i) and (j) are respectively in the low level "L" state and the high level "H" state, the exciting signals indicated by (k) and (r) are supplied to the transistors TR1 and TR9, respectively. Therefore, as shown in (u) and (x) of FIG. 60C, a positive-direction drive current Ia flows through the drive coil U and a negative-direction drive current Ia flows through the drive coil X, resulting in generation of a combined torque so as to start rotation of the rotor 1. Furthermore, with the rectangular-wave signal of (g) being changed to "H" and with the rectangular-wave signal of (h) being kept to "L", the exciting signals of (r) and (m) are supplied to the transistors TR9 and TR2. Therefore, as shown in (v) and (x), a positive-direction drive current Ia flows through the drive coil V and a negative-direction drive current Ia passes through the drive coil X, thus causing generation of a combined torque for the rotor 1.

Furthermore, when the rectangular-wave signal of (j) is changed to "L" and the rectangular-wave signal of (f) is maintained to "H", the exciting signals are introduced into the transistors TR2 and TR10 as shown in (m) and (t). Therefore, as shown in (v) and (y), a positive-direction drive current Ia flows through the drive coil V and a negative-direction drive current Ia passes through the drive coil Y, thus resulting in generation of a combined torque with respect to the rotor 1. Thereafter, with the rectangular-wave signal of (h) being changed to "H" and the rectangular-wave signal of (i) being kept to "L", the exciting signals indicated by (t) and (o) are supplied to the transistors TR10 and TR3. Therefore, as shown in (w) and (y), a positive-direction drive current Ia flows through the drive coil W and a negative-direction drive current Ia passes through the drive coil Y, similarly resulting in generation of a combined torque for the rotor 1.

Still further, when the rectangular-wave signal of (f) is changed to "L" and the rectangular-wave signal of (g) is maintained to "H", the exciting signals are introduced into the transistors TR3 and TR6 as shown in (o) and (l). Therefore, as shown in (u) and (w), a positive-direction drive current Ia flows through the drive coil U and a negative-direction drive current Ia passes through the drive coil W, thus resulting in generation of a combined torque with respect to the rotor 1. Thereafter, with the rectangular-wave signal of (i) being changed to "H" and the rectangular-wave signal of (j) being kept to "L", the exciting signals indicated by (l) and (q) are supplied to the transistors TR6 and TR4. Therefore, as shown in (u) and (x), a positive-direction drive current Ia flows through the drive coul U and a negative-direction drive current Ia passes through the drive coil X, similarly resulting in generation of a combined torque for the rotor 1.

In addition, when the rectangular-wave signal of (g) is changed to "L" and the rectangular-wave signal of (h) is maintained to "H", the exciting signals of (q) and (n) are introduced into the transistors TR4 and TR7. Therefore, as shown in (x) and (v), a positive-direction drive current Ia flows through the drive coil X and a negative-direction drive current Ia passes through the drive coil V, thus resulting in generation of a combined torque with respect to the rotor 1. Then, with the rectangular-wave signal of (j) being changed to "H" and the rectangular-wave signal of (f) being kept to "L", the exciting signals indicated by (n) and (s) are supplied to the transistors TR7 and TR5, respectively. Therefore, as shown in (v) and (y), a positive-direction drive current Ia flows through the drive coil V and a negative-direction drive current Ia passes through the drive coil Y, similarly resulting in generation of a combined torque for the rotor 1. Still further, when the rectangular-wave signal of (h) is changed to "L" and the rectangular-wave signal of (i) is maintained to "H", the exciting signals of (s) and (p) are introduced into the transistors TR5 and TR8. Therefore, as shown in (y) and (w), a positive-direction drive current Ia flows through the drive coil Y and a negative-direction drive current Ia passes through the drive coil W, similarly resulting in generation of a combined torque with respect to the rotor 1.

The above-mentioned operations are repeatedly effected so as to supply drive current to the drive coils U to Y to ensure continuous generation of torques with respect to the rotor 1.

As described above, since the position signal processing circuit 9 outputs exciting signals with an electrical angle of 72°, the drive currents Ia are supplied with an electrical angle (flow angle) of 72° to the drive coils U to Y. On the other hand, since the rotor magnet 2 has demagnetization portions 2a and 2c at the center portions of each main pole section, as shown in (A) of FIG. 61, sine-wave-like basic field magnetic flux T and three-order harmonics magnetic flux t3 are generated, (B) of the same drawing showing a combined field magnetic flux To. Thus, in response to crossing between the magnetic fluxes due to the drive coils U to Y and the basic field magnetic flux T, as shown in (a) of FIG. 62, torques with an electrical angle of 72° are generated one after another with respect to the rotor 1. As a result, a combined torque with period of 36° is produced as indicated by (b) in connection with the basic field magnetic flux T.

Figure 61:
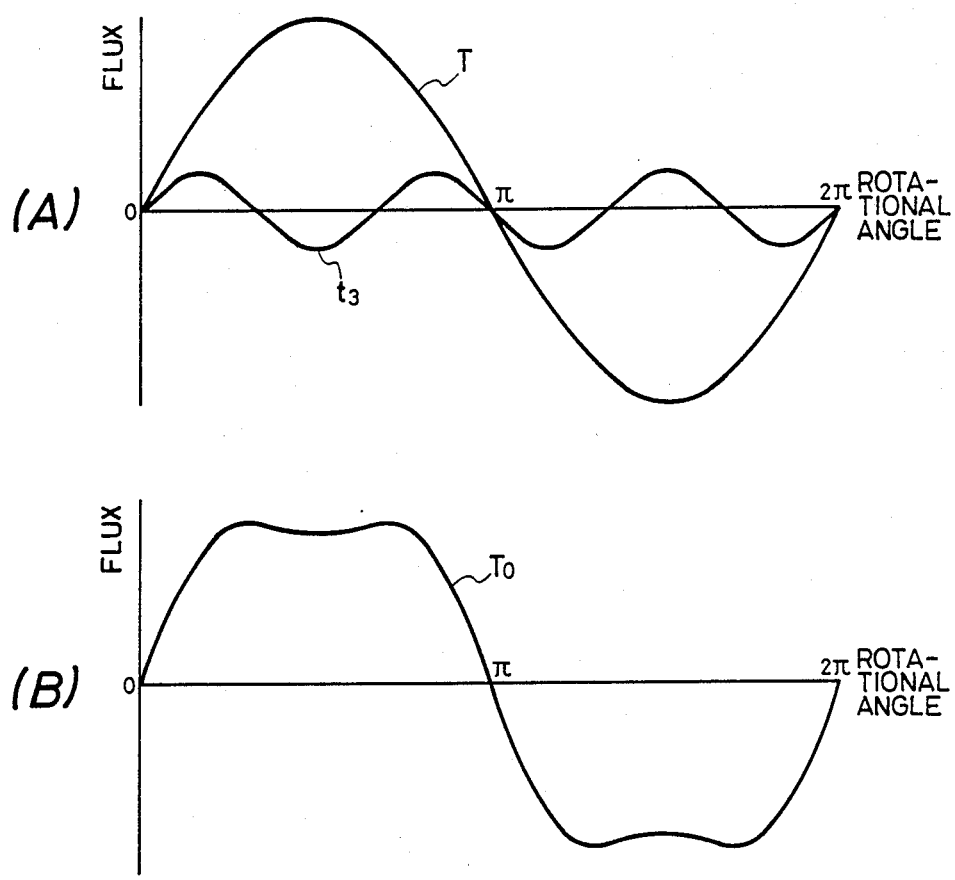
FIG. 61 shows magnetic flux waveforms including a third harmonic.
Figure 62:
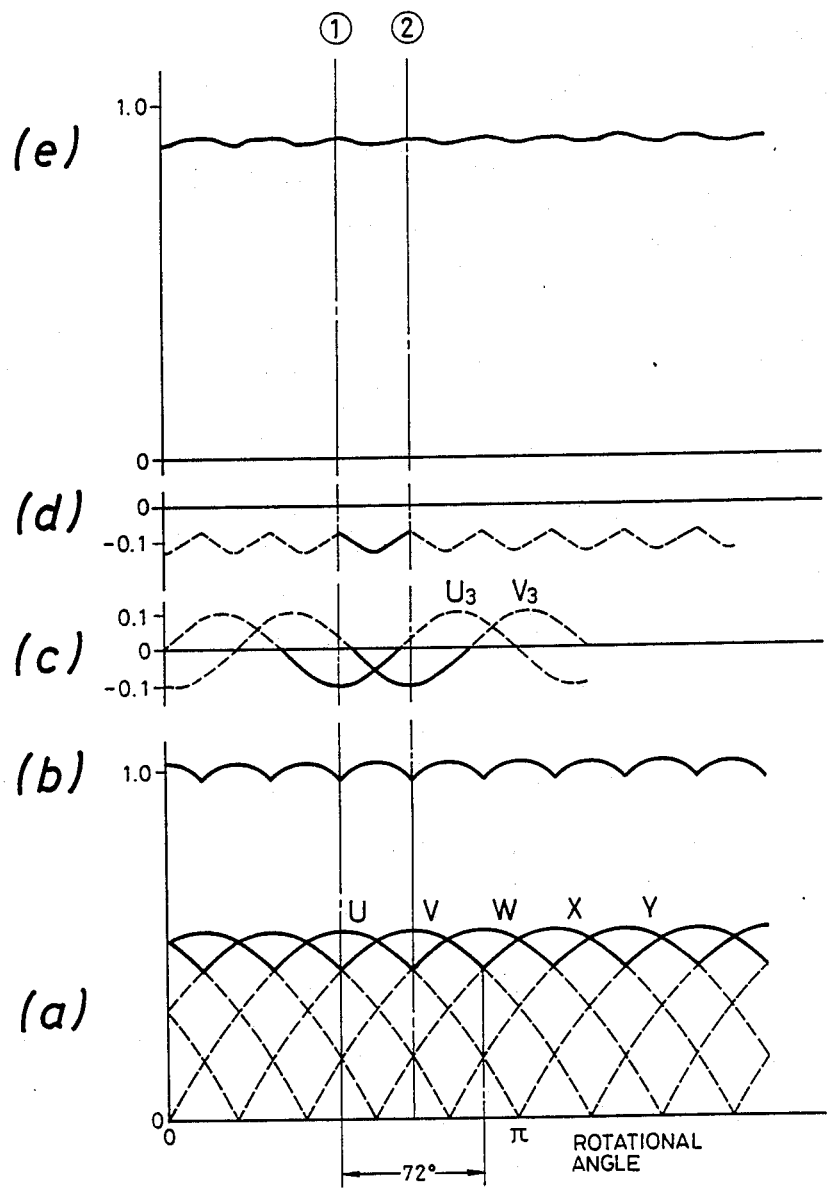
FIG. 62 is an illustration of torque waveforms.

On the other hand, in response to crossing between the three-order harmonics magnetic flux t3 due to the demagnetization portions 2a and 2c and the magnetic fluxes due to the drive coils U to Y, as shown in (c) of FIG. 62, torques due to three-order harmonics magnetic flux t3 which phases are shifted by 180° with respect to the torques shown in (a) are simultaneously generated for the rotor 1. That is, in a region between 1 to 2, while as shown in (a) the U and V phase torques are generated due to the fundamental magnetic field flux T, in this case torques U3 and V3 whose phases are shifted by 180° with respect to the U and V phases are simultaneously generated indicated by (c) due to the third harmonic magnetic flux t3, (d) showing a combination of third torques due to the third harmonic magnetic flux t3. Thus, as seen from (b) and (d), the combined torque due to the fundamental magnetic field flux T and the combined torque due to the third harmonic magnetic flux t3 are coincident in repeating period with each other and are equal in phase to each other, thereby resulting in substantially no torque ripple as shown in (e). That is, in response to generation of the combined magnetic field flux To as shown in (B) of FIG. 61, the combined torque as shown in (e) of FIG. 62 can be obtained so as to rotate the rotor without rotational irregularity.

Here, when, as shown in (A) of FIG. 61, the amplitude value of the third harmonic magnetic flux t3 is set to about 20% of that of the fundamental magnetic field flux T, the inclusion rate of the third harmonic becomes about 20%. That is, the inclusion rate of the third harmonic is defined as (A3/A1)·100 (%) where A3 represents the amplitude value of the third harmonic magnetic flux t3 and A1 designates the amplitude value of the fundamental magnetic field flux T.

Figure 63:
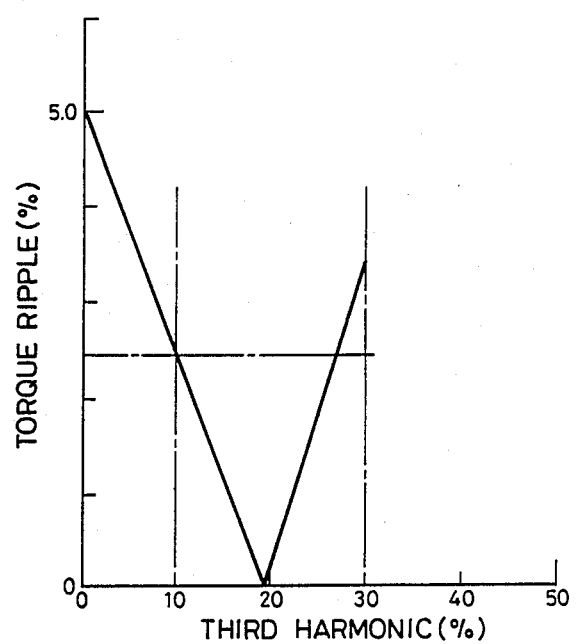
FIG. 63 is a graphic diagram showing the relation between the torque ripple and the third harmonic.
Figure 64:
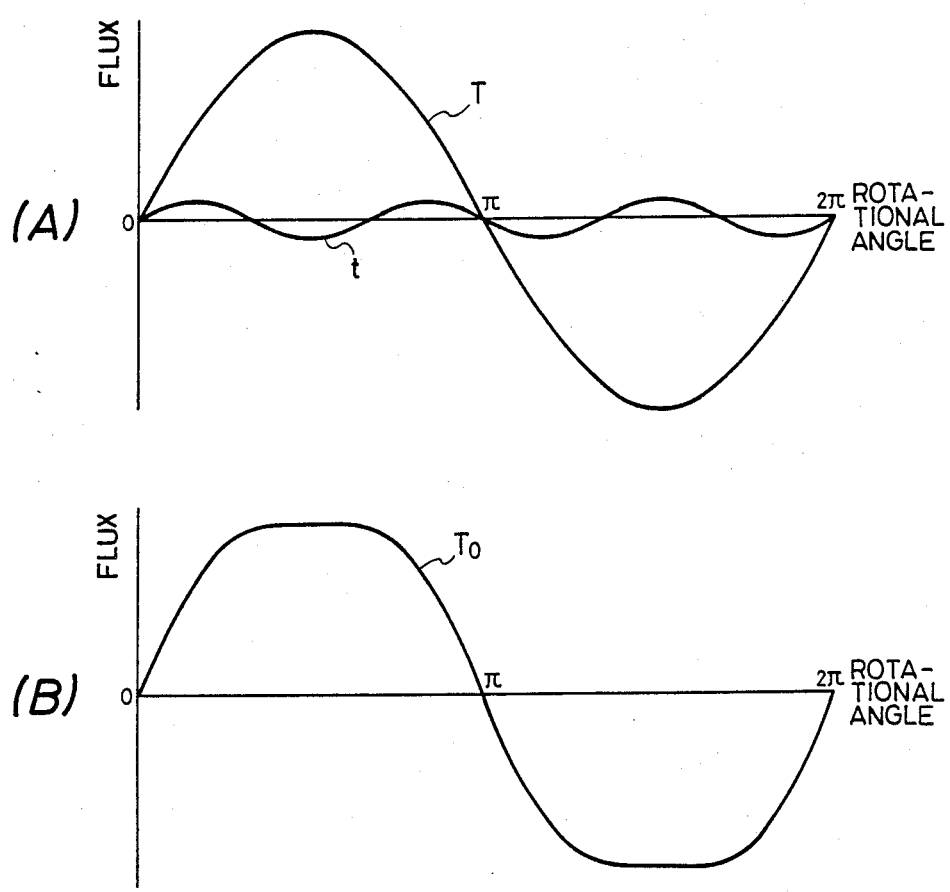
FIG. 64 shows magnetic flux waveforms including the third harmonic.
Figure 65:
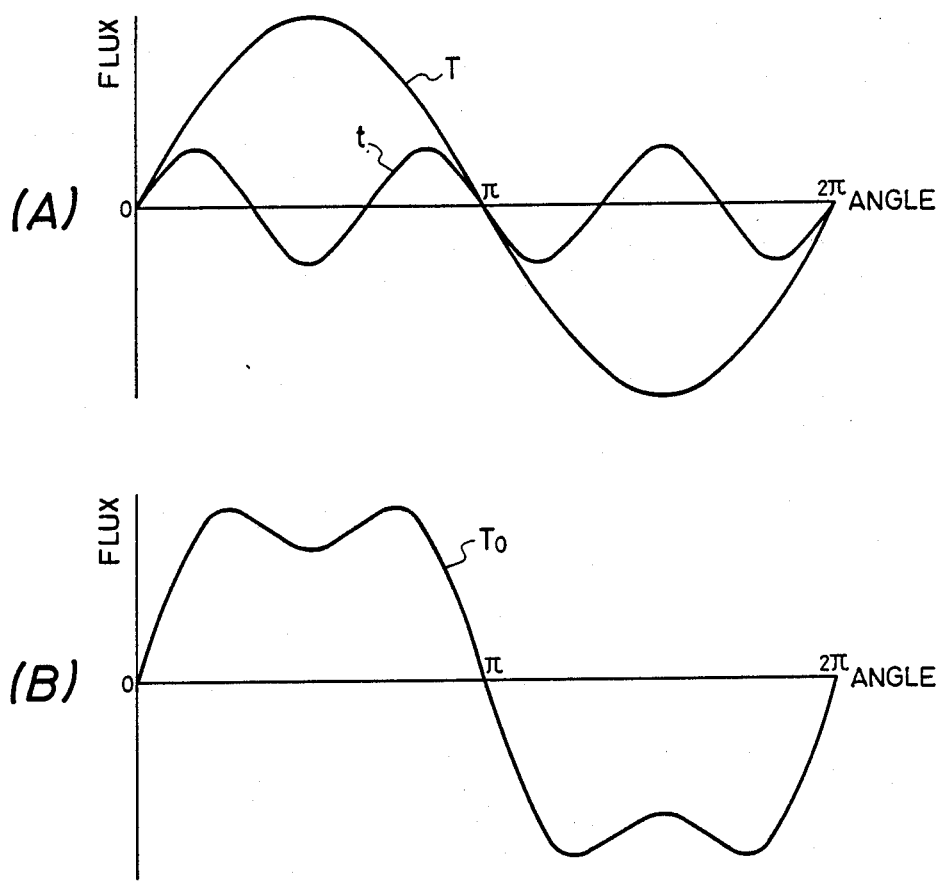
FIG. 65 shows further magnetic flux waveforms including the third harmonic.

In the case that the inclusion rate of the third harmonic is 20%, as shown in FIG. 63, it has been found from an examination that there is little torque ripple. In addition, when, as shown in (A) of FIG. 64, the third harmonic magnetic flux t3 is set so that the inclusion rate of the third harmonic becomes 10%, a combined magnetic field flux To can be obtained as shown in (B) of the same drawing. In this case, as seem from FIG. 63, the torque ripple is about 2.4% which is substantially half of a conventional five-phase brushless motor. Furthermore, when the third harmonic magnetic flux t3 is determined so that the inclusion rate of the third harmonic becomes 30% as shown in (A) of FIG. 65, a combined magnetic field flux To indicated in (B) can be obtained so as to reduce the torque ripple up to about 3.5%.

FIG. 66 shows other examples of magnetization of the rotor magnet 2 in this fourth embodiment of this invnetion. The description of these examples will be omitted for brevity because of being easily understood from the illustrations of FIG. 66 with reference to the description of the magnetization in the above-mentioned third embodiment. On the other hand, in order to include the third harmonics in the magnetic fluxes crossing the drive coils U to Y, it is also appropriate that the rotor magnet 2 is arranged to have the same magnetized arrangement, not having demagnetization regions, as the conventional one and each of the drive coils U to Y is arranged to comprise a main coil 4' and an auxiliary coil 4" or a recessed portion as being similar to the cases shown in (f) to (i) of FIG. 31. For example, in the case of (f), a current induced in the main coil 4' and a current induced in the auxiliary coil 4" are combined so that the crossing magnetic flux substantially includes a third harmonic magnetic flux.

Figure 67:
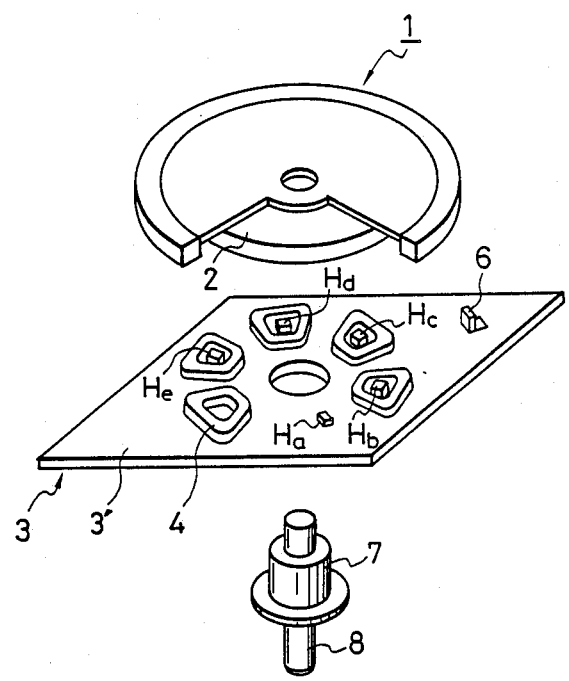
FIGS. 67 and 68 show a fifth embodiment of a multiphase brushless motor according to the present invention.
Figure 68:
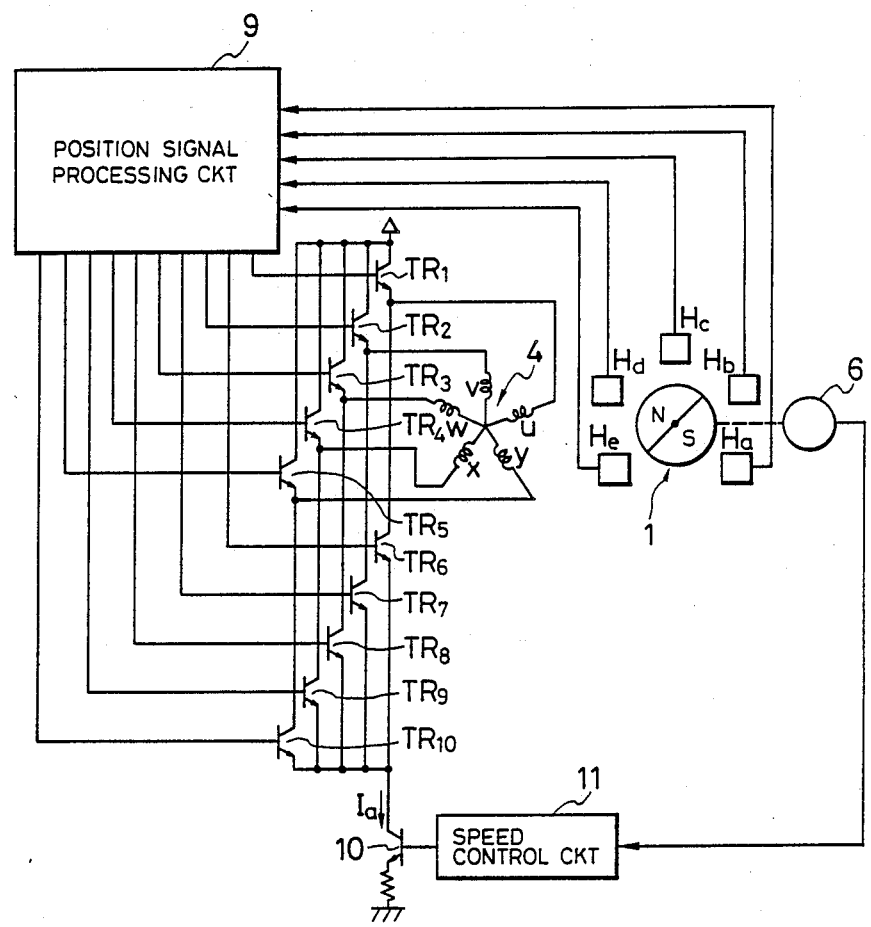
Figure 69:
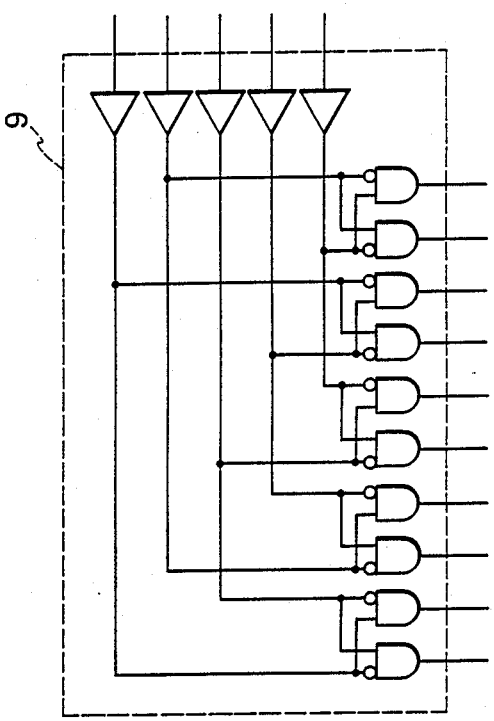
FIG. 69 shows one example of a position signal processing circuit of FIG. 68 motor.

A description of a fifth embodiment of the present invention will be made hereinbelow in accordance with comparison with the above-mentioned fourth embodiment. FIGS. 67 to 69 shows an arrangement of the fifth embodiment five-phase brushless motor, which is basically similar to that of the fourth embodiment as seen from FIGS. 67 and 68, the drive coils being arranged at intervals of a mechanical angle of 50.4° to have an electrical angle (flow angle) of 252° (72°+360°) and the Hall generators Ha to He for position detection being respectively positioned so as to have an electrical angle of 72°. In this case, the position signal processing circuit 9 may be arranged as shown in FIG. 69.

Figure 70A:
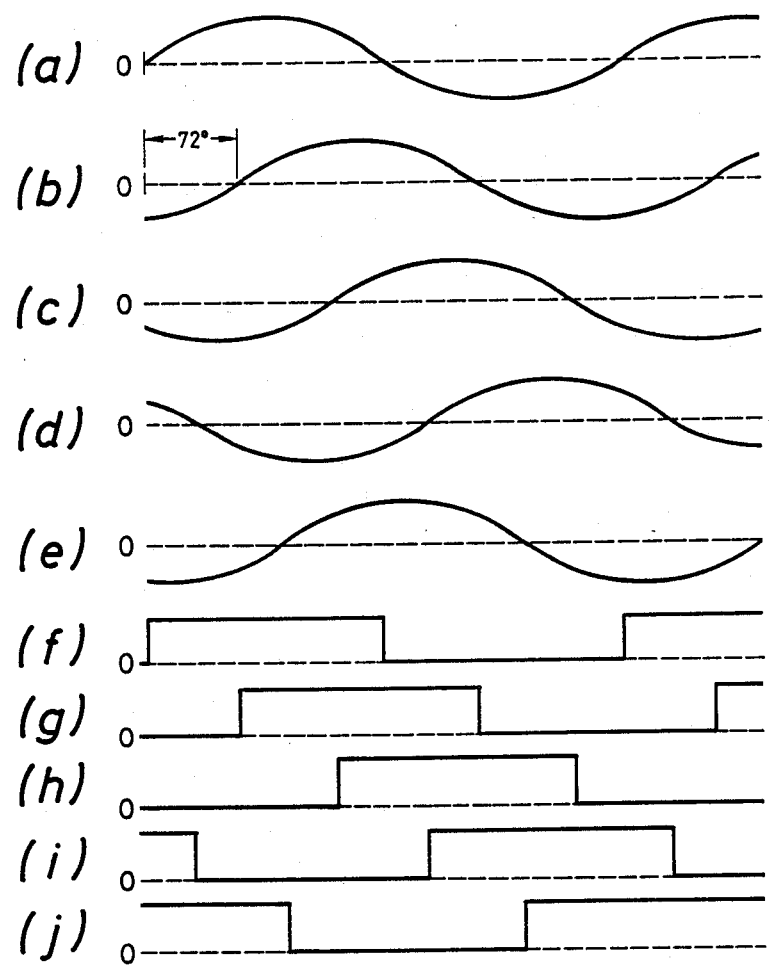
FIGS. 70A, 70B and 70C are illustrations for describing the operation of the FIG. 68 motor.
Figure 70B:
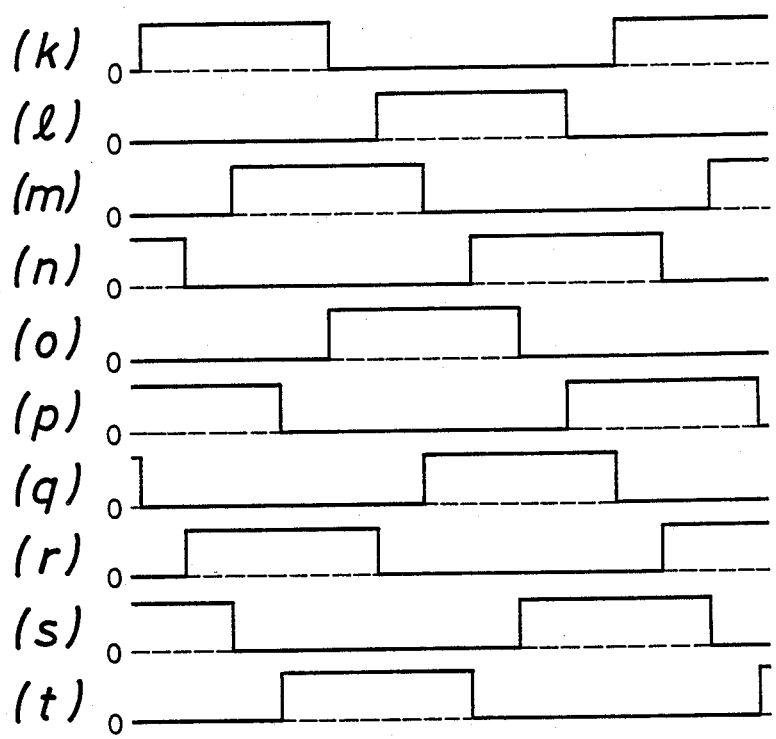
Figure 70C:
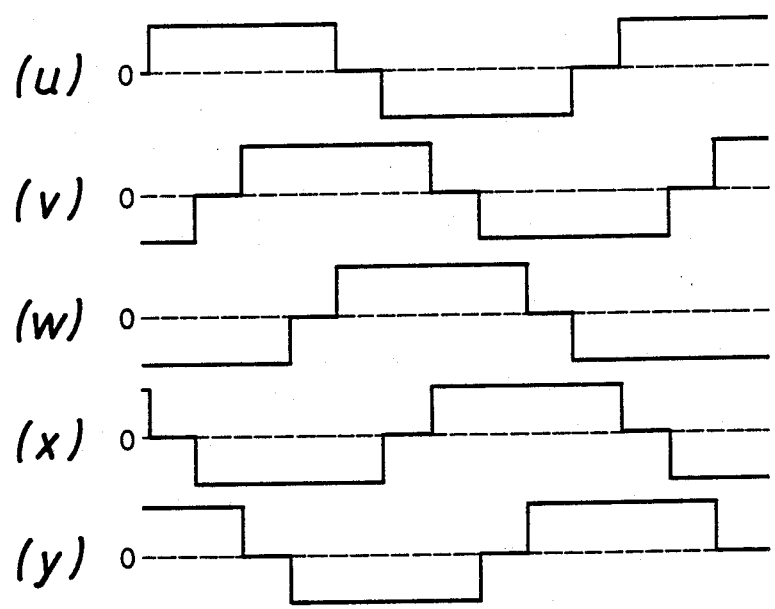

With the above-mentioned arrangement, in response to rotation of the rotor magnet 2, the FG sensor 6 generates a pulse signal proportional to the rotational speed thereof and supplies it to the speed control circuit 11 which controls drive currents flowing through the drive coils 4. On the other hand, in response to rotation of the rotor 1, the Hall generators Ha to He output position signals, the phases of which are shifted by 72° from each other, as indicated by (a) to (e) of FIG. 70A. These position signals are inputted in the position signal procesing circuit 9 of FIG. 69 which in turn forms rectangular-wave signals of (f) to (j) and outputs exciting signals of (k) to (t) of FIG. 70B, the exciting signals being supplied to transistors TR1 to TR10 so that exciting currents as shown in (u) to (y) of FIG. 70C are introduced into the drive coils U to Y to rotate the rotor 1. Here, one important feature of this fifth embodiment is that the exciting currents (u) to (y) are supplied thereto with an electrical angle (flow angle) of 144°.

Figure 71:
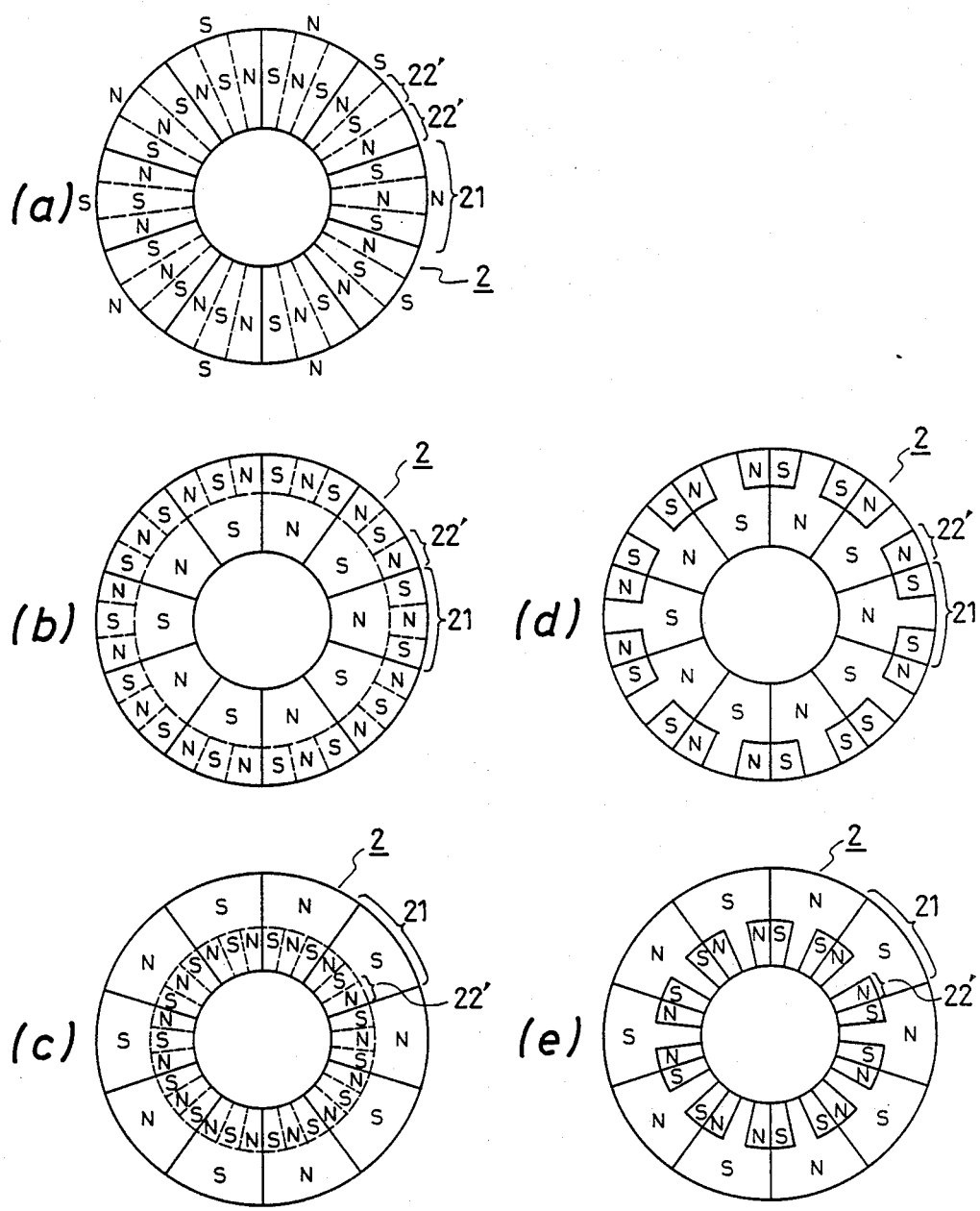
FIG. 71 shows examples of magnetization of the rotor magnet.
Figure 72F:
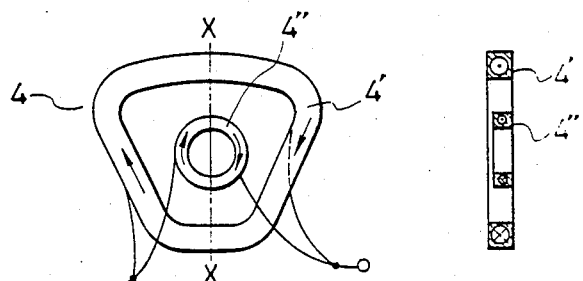
FIG. 72 shows examples of each drive coils.
Figure 72G:
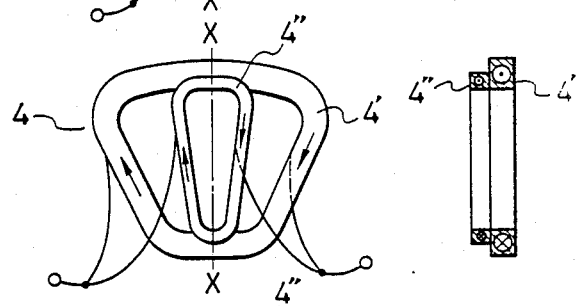
Figure 72H:
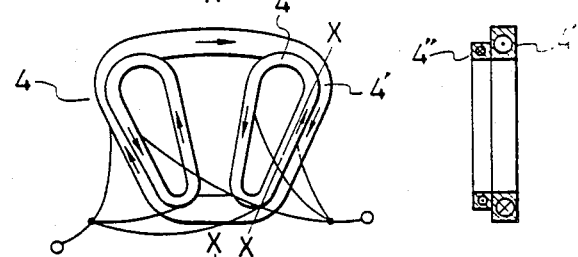
Figure 72I:
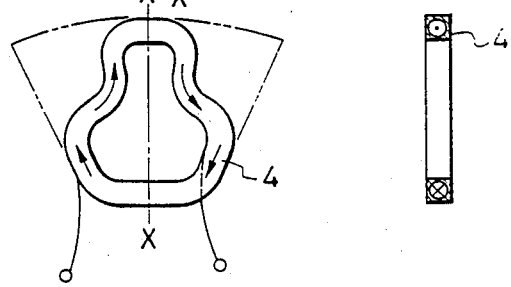

The rotor magnet 2 is magnetized so as to, as seen in (a) of FIG. 71, have 10 sectoral main regions 21 each of which is divided into 3 sub-regions 22, where N-poles and S-poles are alternately arranged in the circumferential direction. Two of both sides of the three sub-regions 22 are used as demagnetization regions 22' for inclusion of third harmonics. The magnetization of each of the rotor magnets 2 of (b) to (e) is made to correspond to the magnetization of (a) so as to obtain the same function. Similarly, it is also appropriate to form the drive coils U to Y as shown in (f) to (i) of FIG. 72. The detail description will be omitted because of being easily understood from the illustrations.

Figure 73A:
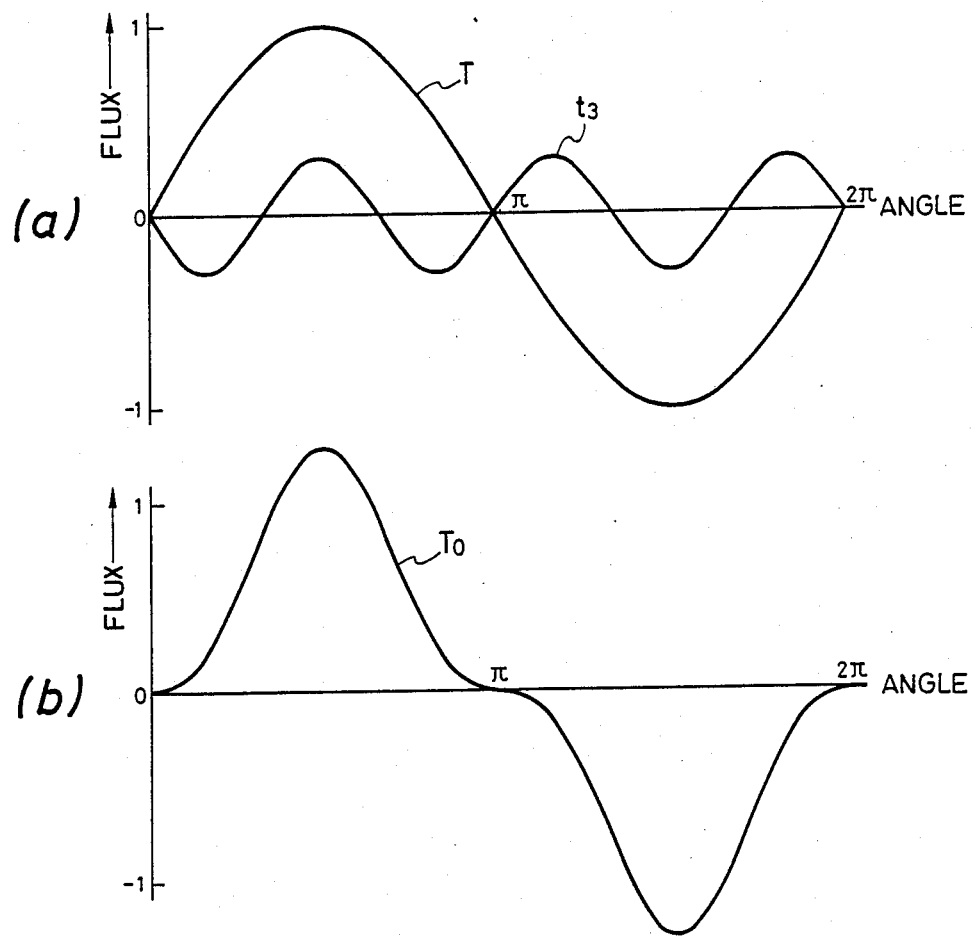
FIGS. 73A, 73B and 73C are illustrations of magnetic fluxes each including the harmonic.
Figure 73B:
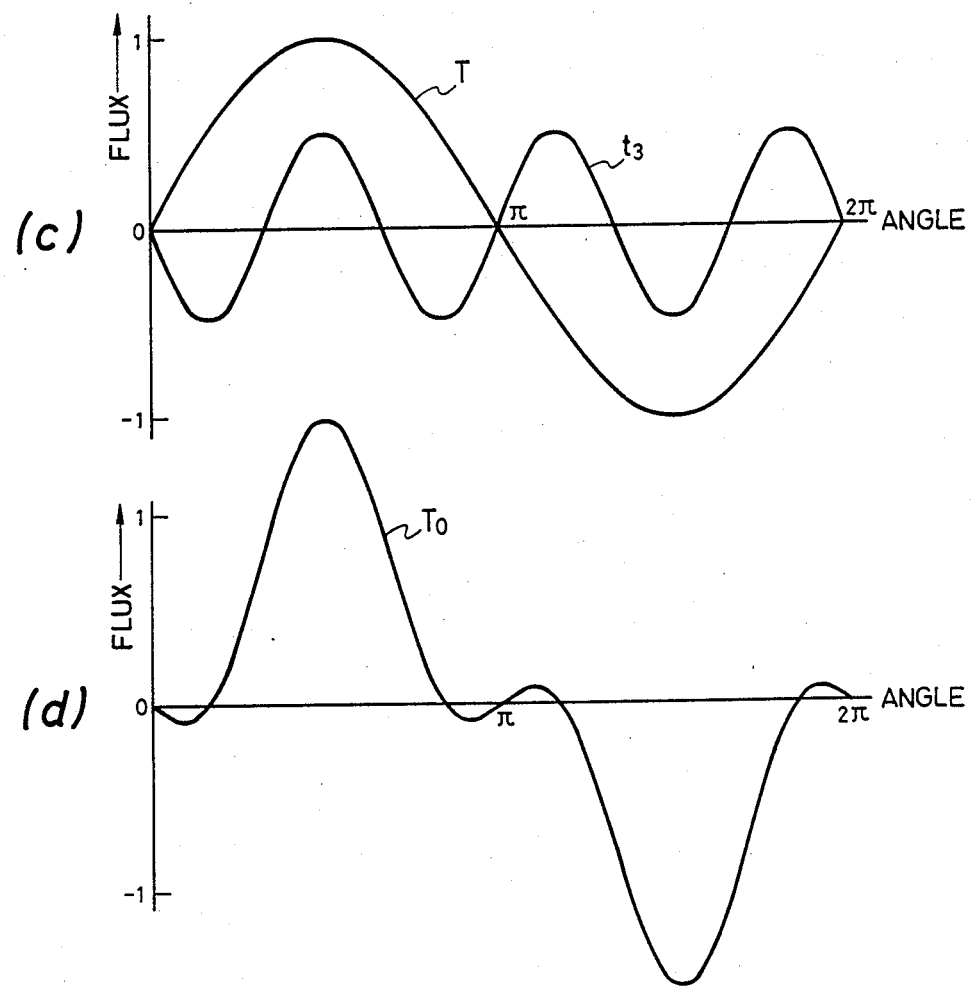
Figure 73C:
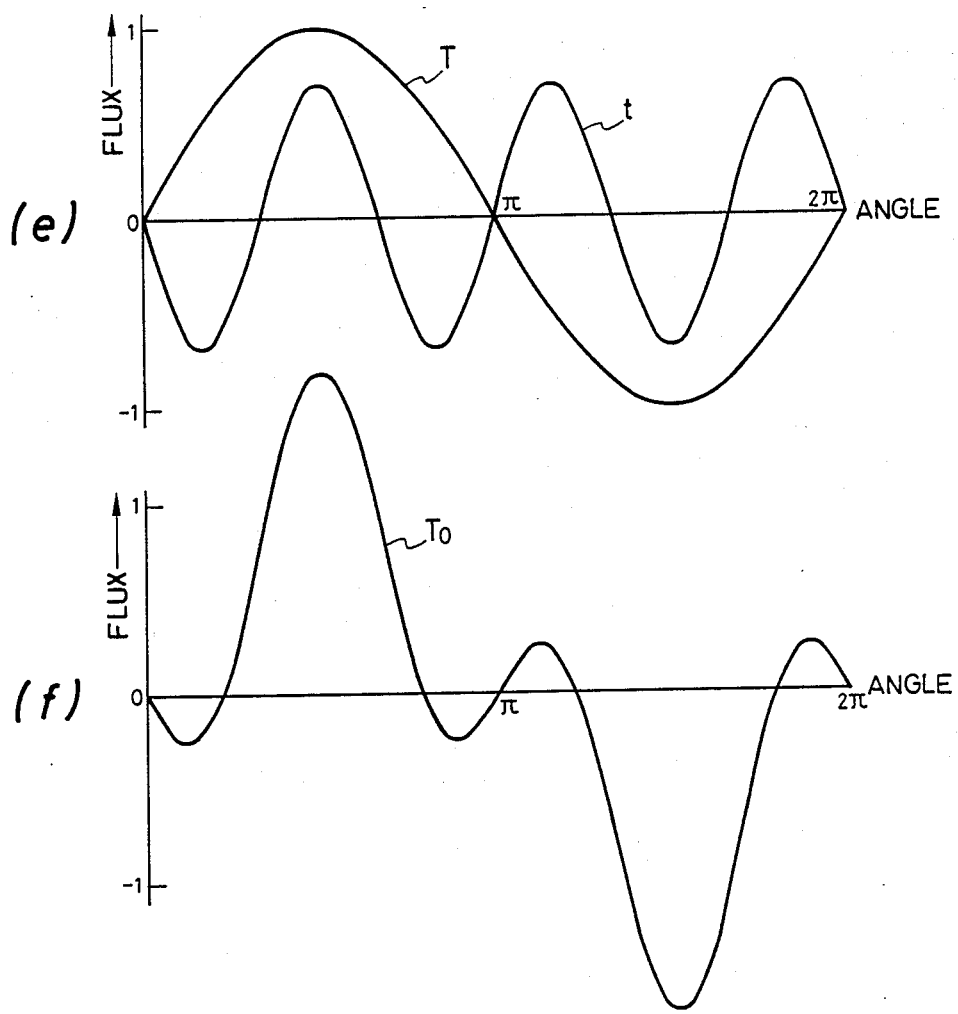
Figure 74:
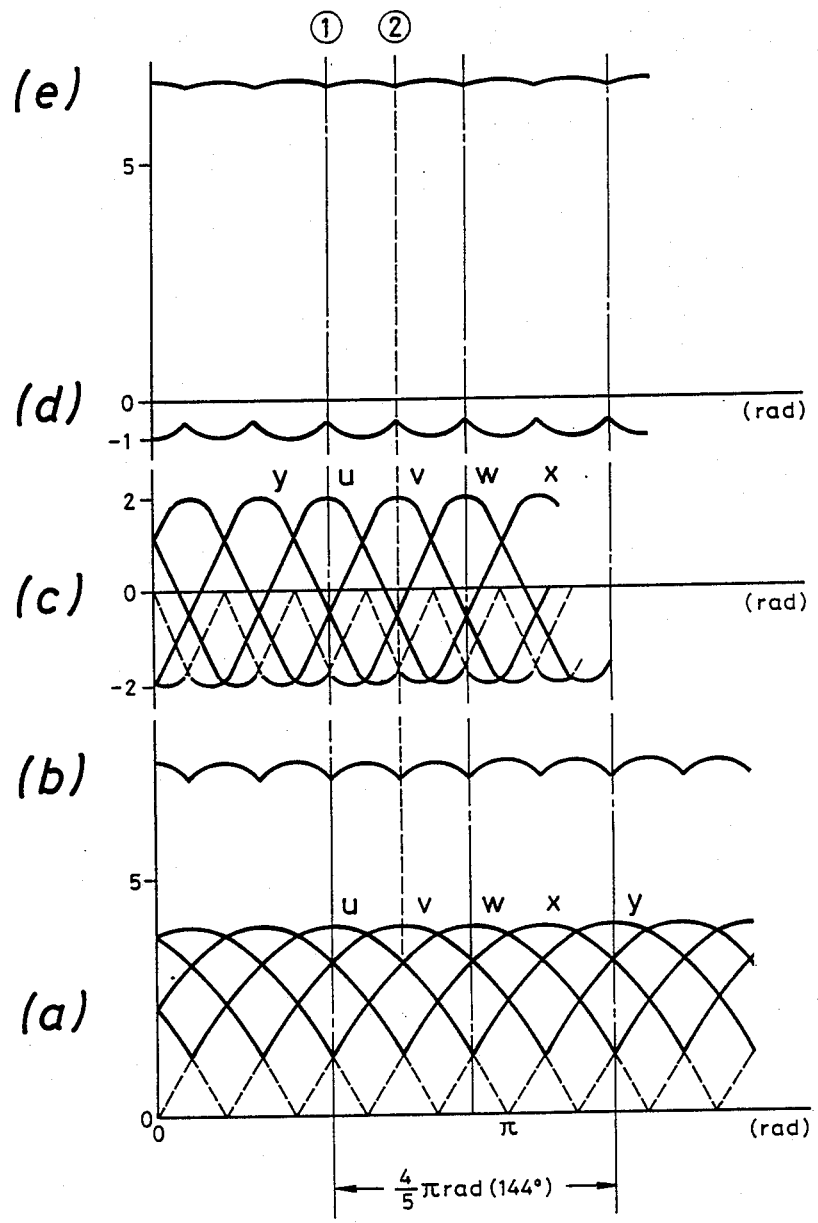
FIG. 74 shows torque waveforms generated in the motor.
Figure 75:
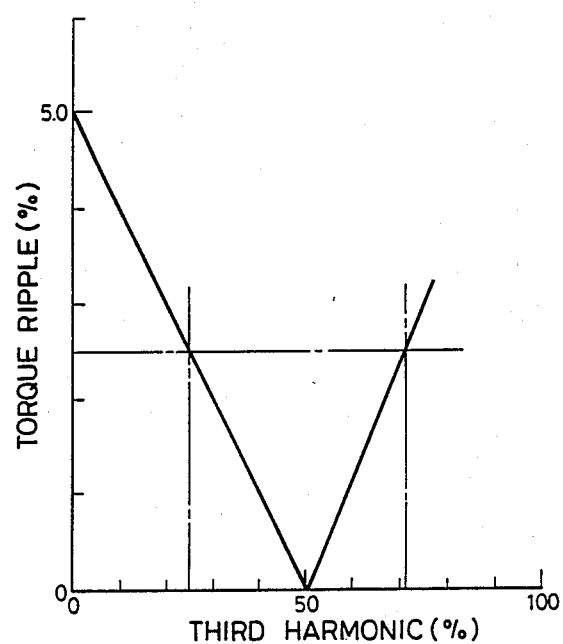
FIG. 75 is a graphic diagram showing the relation between the torque ripple and the third harmonic.

The brushless motor is arranged such that the magnetic fluxes crossing the drive coils U to Y include third harmonics t3 of about 30% as shown in (a) of FIG. 73A. (b) of the same drawing shows a combined wave To of the third harmonic wave t3 and the fundamental wave T. FIG. 73B shows the case that the third harmonic is included by 50% and FIG. 73C illustrates the case that the third harmonic is included by 70%. FIG. 74 shows torque waveforms, (a) being torque components of the respective phases due to the fundamental waves T. A combined torque has a repeating period of $\pi/5$ radians as shown in (b). Here, in a region between 1 to 2, the u, v, w and y phases generate torques. The torque components due to the third harmonics are obtained as shown in (c) and a combined torque thereof is obtained as shown in (d). The combined torques as indicated in (b) and (d) are coincident in period with each other and reverse in polarity to each other, whereby a combination, thereof results in cancelling the torque ripples of each other. FIG. 74 illustrates the relation between the inclusion rate of the third harmonic and the inclusion of the torque ripple which has been found by an examination. As will be understood from FIG. 75, with the third harmonic t3 whose phase is reverse to that of the fundamental wave T being included by about 25 to 70%, as shown in FIGS. 73A to 73C, the torque ripple can be reduced considerably.

The following table shows the relation between the drive electrical angle and harmonic included in the magnetic flux interlinking the drive coils.

| N | 2N + 1 | Angle | Kind | Harmonic Phase (°) | Rate (%) |
|---|---|---|---|---|---|
| 2 | 5 | 72 | third | 0 | 10 to 30 |
| 2 | 5 | 144 | third | 180 | 25 to 75 |
| 3 | 7 | 51.4 | third | 0 | 10 to 20 |
| 3 | 7 | 51.4 | fifth | 180 | 5 to 15 |
| 3 | 7 | 102.8 | third | 0 | 30 to 80 |
| 3 | 7 | 102.8 | fifth | 0 | 10 to 20 |
| 3 | 7 | 154.2 | third | 180 | 20 to 60 |
| 3 | 7 | 154.2 | fifth | 180 | 20 to 60 |

It should be understood that the foregoing relates to only preferred embodiments of the present invention, and that it is intended to cover all changes and modifications of the embodiments of this invention herein used for the purposes of the disclosures, which do not constitutue departures from the spirit and scope of this invention. For example, although in the above description the brushless motor is of the flat type, this invention is applicable to other types of brushless motors.

What is claimed is:

1. A more-than-four phase brushless motor including a stator having a plurality of drive coils each corresponding to a specific phase of said motor and a rotor having a plurality of field magnet poles of successively alternating polarity, comprising:

position detecting means consisting of two Hall generators magnetically coupled to the field magnet poles for detecting the positions of said rotor and generating position signals corresponding to the positions thereof;

speed detecting means for detecting the rotational speed of said rotor and generating a signal corresponding to the detected speed thereof;

drive circuit means for supplying drive currents to said drive coils of said stator so as to generate torques for rotation of said rotor;

first processing circuit means responsive to the position signals from said position detecting means for outputting first exciting signals to said drive circuit means so that in response to the first exciting signals said drive circuit means supplies the drive currents to said drive coils thereof;

second processing circuit means responsive to the speed signal from said speed detecting means and one of said position signals from said position detecting means for outputting second exciting signals to said drive circuit means so that in response to the second exciting signals said drive circuit means supplies the drive currents thereof;

startup detecting means for detecting the driving condition of said motor and generating a signal indicative of the driving condition; and switching circuit means coupled to said first and second processing circuit means for performing a switching operation between said first and second processing circuit means in response to the condition-indicative signal from said startup detecting means so that said first processing circuit means outputs the first exciting signals to said drive circuit means at startup of said motor and said second processing circuit means outputs the second exciting signals thereto after the startup.

2. A more-than-four-phase brushless motor including a stator having a plurality of drive coils each corresponding to a specific phase of said motor and a rotor having a plurality of field magnet poles of successively alternating polarity, comprising:

position detecting means consisting of two Hall generators magnetically coupled to the field magnet poles for detecting the positions of said rotor and generating position signals corresponding to the position thereof;

drive circuit means for supplying drive current to said drive coils of said stator so as to generate torques for rotation of said rotor;

first processing circuit means responsive to the position signals from said position detecting means for outputting first exciting signals to said drive circuit means so that in response to the first exciting signals said drive circuit means supplies the drive currents to said drive coils thereof;

second processing circuit means responsive to the speed signal from said speed detecting means and one of said position signals from said position detecting means for outputting second exciting signals to said drive circuit means so that in response to the second exciting signals said drive circuit means supplies the drive currents thereto;

startup detecting means for detecting the driving condition of said multi-phase motor and generating a signal indicative of the driving condition; and switching circuit means coupled to said first and second processing circuit means for performing a switching operation between said first and second processing circuit means in response to the condition-indicative signal from said startup detecting means so that said first processing circuit means outputs the first exciting signals to said drive circuit means at startup of said motor and said second processing circuit means outputs the second exciting signals thereto after the startup.

3. A multi-phase brushless motor including a stator having a plurality of drive coils each corresponding to a specific phase of said multi-phase motor and a rotor having a plurality of field magnet poles of successively alternating polarity, comprising:

position detecting means magnetically coupled to the field magnet poles for detecting the positions of said rotor and generating position signals corresponding to the position thereof;

speed detecting means for detecting the rotational speed of said rotor and generating a signal corresponding to the detected speed thereof;

drive circuit means for supplying drive currents to said drive coils of said stator so as to generate torques for rotation of said rotor;

first processing circuit means responsive to the position signals from said position detecting means for outputting first exciting signals to said drive circuit means so that in response to the first exciting signals said drive circuit means supplies the drive currents to said drive coils thereof;

second processing circuit means responsive to the speed signal from said speed detecting means and one of said position signals from said position detecting means for outputting second exciting signals to said drive circuit means to that in response to the second exciting signals said drive circuit means supplies the drive currents thereto;

startup detecting means for detecting the driving condition of said multi-phase motor and generating a signal indicative of the driving condition; and switching circuit means coupled to said first and second processing circuit means for performing a switching operation between said first and second processing circuit means in response to the condition-indicative signal from said startup detecting means so that said first processing circuit means outputs the first exciting signals to said drive circuit means at startup of said motor and said second processing circuit means outputs the second exciting signals thereto after the startup, at least either of the magnetization of said rotor or each of said drive coils is arranged so that the magnetic flux interlinking each said drive coil includes a predetermined harmonic by a predetermined amount.

4. A multi-phase brushless motor as claimed in claim 3, wherein each of said drive coils has at last one main coil and at least one auxiliary coil.

5. A multi-phase brushless motor as claimed in claim 3, wherein each of said drive coils has a loop configuration and at least one portion of said loop configuration is bent inwardly.

6. A multi-phase brushless motor as claimed in claim 3, wherein said predetermined harmonic is a third harmonic whose inclusion rate is 10 to 20% with respect to a fundamental wave when an electrical angle between the drive currents is 51.4 degrees, the phase of the third harmonic being equal to that of the fundamental wave.

7. A multi-phase brushless motor as claimed in claim 3, wherein said predetermined harmonic is a fifth harmonic whose inclusion rate is 5 to 15% with respect to a fundamental wave when an electrical angle between the drive currents is 51.4 degrees, the phase of the fifth harmonic being reverse to that of the fundamental wave.

8. A multi-phase brushless motor as claimed in claim 3, wherein said predetermined harmonic is a third harmonic whose inclusion rate is 30 to 80% with respect to a fundamental wave when an electrical angle between the drive currents is 102.8 degrees, the phase of the third harmonic being equal to that of the fundamental wave.

9. A multi-phase brushless motor as claimed in claim 3, wherein said predetermined harmonic is a fifth harmonic whose inclusion rate is 10 to 20% with respect to a fundamental wave when an electrical angle between the drive currents is 102.8 degrees, the phase of the fifth harmonic being equal to that of the fundamental wave.

10. A multi-phase brushless motor as claimed in claim 3, wherein said predetermined harmonic is a third harmonic whose inclusion rate is 20 to 60% with respect to a fundamental wave when an electrical angle between the drive currents is 154.2 degrees, the phase of the third harmonic being reverse to that of the fundamental wave.

11. A multi-phase brushless motor as claimed in claim 3, wherein said predetermined harmonic is a fifth harmonic whose inclusion rate is 20 to 60% with respect to a fundamental wave when an electrical angle between the drive currents is 154.2 degrees, the phase of the fifth harmonic being reverse to that of the fundamental wave.

12. A multi-phase brushless motor as claimed in claim 3, wherein said predetermined harmonic is a third harmonic whose inclusion rate is 10 to 30% with respect to a fundamental wave when an electrical angle between the drive currents is 72 degrees, the phase of the third harmonic being equal to that of the fundamental wave.

13. A multi-phase brushless motor as claimed in claim 3, wherein said predetermined harmonic is a third harmonic whose inclusion rate is 25 to 75% with respect to a fundamental wave when an electrical angle between the drive currents is 144 degrees, the phase of the third harmonic being reverse to that of the fundamental wave.

14. A multi-phase brushless motor including a stator having a plurality of drive coils each corresponding to a specific phase of said multi-phase motor and a rotor having a plurality of field magnet poles of successively alternating polarity, comprising:

position detecting means magnetically coupled to the field magnet poles for detecting the positions of said rotor and generating position signals corresponding to the position thereof;

drive curcuit means for supplying drive currents to said drive coils of said stator so as to generate torques for rotation of said rotor;

first processing circuit means responsive to the position signals from said position detecting means for outputting first exciting signals to said drive circuit means so that in response to the first exciting signals said drive circuits means supplies the drive currents to said drive coils thereof;

second processing circuit means coupled to said drive coils of said stator so as to be responsive to voltages induced in said drive coils thereof for outputting second exciting signals to said drive circuit means so that in response to the second exciting signals said drive circuit means supplies the drive currents thereto;

startup detecting means for detecting the driving condition of said multi-phase motor and generating a signal indicative of the driving condition; and switching circuit means coupled to said first and second processing circuit means for performing a switching operation between said first and second processing circuit means in response to the condition-indicative signal from said startup detecting means so that said first processing circuit means outputs the first exciting signals to said drive circuit means at startup of said motor and said second processing circuit means outputs the second exciting signals thereto after the startup, wherein at least either of the magnetization of said rotor or each of said drive coils is arranged so that the magnetic flux interlinking each said drive coil includes a predetermined harmonic by a predetermined amount.

15. A multi-phase brushless motor as claimed in claim 14, wherein each of said drive coils has at least one main coil and at least one auxiliary coil.

16. A multi-phase brushless motor as claimed in claim 14, wherein each of said drive coils has a loop configuration and at least one portion of said loop configuration is bent inwardly.

17. A multi-phase brushless motor as claimed in claim 14, wherein said predetermined harmonic is a third harmonic whose inclusion rate is 10 to 20% with respect to a fundamental wave when an electrical angle between the drive currents is 51.4 degrees, the phase of the third harmonic being equal to that of the fundamental wave.

18. A multi-phase brushless motor as claimed in claim 14, wherin said predetermined harmonic is a fifth harmonic whose inclusion rate is 5 to 15% with respect to a fundamental wave when an electrical angle between the drive currents is 51.4 degrees, the phase of the fifth harmonic being reverses to that of the fundamental wave.

19. A multi-phase brushless motor as claimed in clain 14, wherein said predetermined harmonic is a third harmonic whose inclusion rate is b 30 to 80% with respect to a fundamental wave when an electrical angle between the drive currents is 102.8 degrees, the phase of the third harmonic being equal to that of the fundamental wave.

20. A multi-phase brushless motor as claimed in claim 14, wherein said predetermined harmonic is a fifth harmonic whose inclusion rate is 10 to 20% with respect to a fundamental wave when an electrical angle between the drive currents is 102.8 degrees, the phase of the fifth harmonic being equal to that of the fundamental wave.

21. A multi-phase brushless motor as claimed in claim 14, wherein said predetermined harmonic is a third harmonic whose inclusion rate is 20 to 60% with respect to a fundamental wave when an electrical angle between the drive currents is 154.2 degrees, the phase of the third harmonic being reverse to that of the fundamental wave.

22. A multi-phase brushless motor as claimed in claim 14, wherein said predetermined harmonic is a fifth harmonic whose inclusion rate is 20 to 60% with respect to a fundamental wave when an electrical angle between the drive currents is 154.2 degrees, the phase of the fifth harmonic being reverse to that of the fundamental wave.

23. A multi-phase brushless motor as claimed in claim 14, wherein said predetermined harmonic is a third harmonic whose inclusion rate is 10 to 30% with respect to a fundamental wave when an electrical angle between the drive currents is 72 degrees, the phase of the third harmonic being equal to that of the fundamental wave.

24. A multi-phase brushless motor as claimed in claim 14, wherein said predetermined harmonic is a third harmonic whose inclusion rate ib 25 to 75% with respect to a fundamental wave when an electrical angle between the drive currents is 144 degrees, the phase of the third harmonic being reverse to that of the fundamental wave.

* * * * *